United States Patent [19]
Fan et al.

[11] Patent Number: 5,815,126
[45] Date of Patent: Sep. 29, 1998

[54] MONOCULAR PORTABLE COMMUNICATION AND DISPLAY SYSTEM

[75] Inventors: John C. C. Fan, Chestnut Hill, Mass.; Jeffrey Jacobsen, Hollister, Calif.; Peter A. Ronzani, Los Gatos, Calif.; Stephen Pombo, Sunnyvale, Calif.

[73] Assignee: Kopin Corporation, Taunton, Mass.

[21] Appl. No.: 652,625

[22] Filed: May 21, 1996

Related U.S. Application Data

[63] Continuation of Ser. No. 288,062, Aug. 9, 1994, abandoned, which is a continuation-in-part of Ser. No. 220,042, Mar. 30, 1994, abandoned, which is a continuation-in-part of Ser. No. 141,133, Oct. 22, 1993, abandoned.

[51] Int. Cl.⁶ ...................................................... G09G 5/00
[52] U.S. Cl. ...................................... 345/8; 345/7; 345/87
[58] Field of Search .................................. 345/8, 7, 4, 5, 345/6, 87, 102, 76, 82, 905, 903; 348/794, 790, 800, 801, 51, 53, 54; 351/158; 359/630, 631

[56] References Cited

U.S. PATENT DOCUMENTS

| | | | |
|---|---|---|---|
| 3,375,375 | 3/1968 | Abbey et al. | 250/216 |
| 3,712,714 | 1/1973 | Uyeda et al. | |
| 3,816,005 | 6/1974 | Kirschner | 356/251 |

(List continued on next page.)

FOREIGN PATENT DOCUMENTS

| | | |
|---|---|---|
| 2123461 | 11/1994 | Canada . |
| 344 881 A2 | 6/1989 | European Pat. Off. . |
| 0 352 914 A2 | 1/1990 | European Pat. Off. . |
| 0 424 880 A2 | 5/1991 | European Pat. Off. . |
| 438 362 A1 | 7/1991 | European Pat. Off. . |
| 454 443 A3 | 10/1991 | European Pat. Off. . |
| 0 472 361 A3 | 2/1992 | European Pat. Off. . |
| 0 491 639 A1 | 6/1992 | European Pat. Off. . |
| 0 526 802 A2 | 2/1993 | European Pat. Off. . |
| 0 539 699 A2 | 5/1993 | European Pat. Off. . |
| 539 907 A3 | 5/1993 | European Pat. Off. . |
| 547 493 A1 | 6/1993 | European Pat. Off. . |
| 551 781 A1 | 7/1993 | European Pat. Off. . |
| 0 626 773 A1 | 11/1994 | European Pat. Off. . |
| 2522804 | 9/1983 | France . |
| 2612351 | 9/1988 | France . |
| 27 15 446 | 10/1978 | Germany . |
| 2715446 | 10/1978 | Germany . |
| 54-093378 | 7/1979 | Japan . |
| 60-045019 | 3/1985 | Japan . |
| 1259580 | 10/1989 | Japan . |
| 2-113656 | 4/1990 | Japan . |
| 3-105383 | 5/1991 | Japan . |
| 6-123852 | 5/1994 | Japan . |
| 94-123852 | 5/1994 | Japan . |
| 7-235892 | 9/1995 | Japan . |
| 1438789 | 6/1973 | United Kingdom . |
| 2149140 | 10/1984 | United Kingdom . |
| 2 206 421 | 1/1989 | United Kingdom . |

(List continued on next page.)

OTHER PUBLICATIONS

Katz, W., "Low Cost Helmet Mounted Display and Eye Tracking Concepts," *MaK Technologies, Inc.* Prensentation, May, 15, 1991.
"Hand–held Videophone," *Popular Science* (1992, Feb.).
"Videophone price cut to $1,000," *USA Today*.
"SA620 Integrated Front–End," *Philips Electronics North America Corp.* (1993).

*Primary Examiner*—Xiao Wu
*Attorney, Agent, or Firm*—Hamilton, Brook, Smith & Reynolds, P.C.

[57] ABSTRACT

A monocular head mounted display system in which a matrix display element is mounted within a housing that is positioned relative to one eye of the user to display information. The display is connected to a video or information source such that the user can view information or images shown on the display. The display can be mounted to a frame so that the user can move the display in and out of the user's filed of view without adjusting the supporting harness that holds the display on the user's head.

27 Claims, 59 Drawing Sheets

U.S. PATENT DOCUMENTS

| | | | |
|---|---|---|---|
| 3,923,370 | 12/1975 | Mostrom | 350/55 |
| 4,010,322 | 3/1977 | Nathanson | 358/233 |
| 4,028,725 | 6/1977 | Lewis | 358/103 |
| 4,034,401 | 7/1977 | Mann | 358/93 |
| 4,081,209 | 3/1978 | Heller et al. | 350/174 |
| 4,109,145 | 8/1978 | Graf | 25/201 |
| 4,181,405 | 1/1980 | Cohen | 350/331 |
| 4,254,451 | 3/1981 | Cochram, Jr. | 362/103 |
| 4,287,809 | 9/1981 | Egli et al. | 89/41 EA |
| 4,361,384 | 11/1982 | Bosserman | 350/174 |
| 4,414,431 | 11/1983 | McCartney | 381/48 |
| 4,636,866 | 1/1987 | Hattori | 358/236 |
| 4,695,129 | 9/1987 | Faessen et al. | 350/96 |
| 4,704,740 | 11/1987 | McKee et al. | 455/348 |
| 4,735,473 | 4/1988 | Migozzi et al. | 350/3.7 |
| 4,737,972 | 4/1988 | Schoolman | 378/41 |
| 4,751,691 | 6/1988 | Perera | 368/10 |
| 4,753,514 | 6/1988 | Kubik | 350/174 |
| 4,755,023 | 7/1988 | Evans et al. | 350/174 |
| 4,757,714 | 7/1988 | Purdy et al. | 73/597 |
| 4,761,056 | 8/1988 | Evans et al. | 350/174 |
| 4,806,011 | 2/1989 | Bettinger | 351/158 |
| 4,814,876 | 3/1989 | Horio et al. | 358/160 |
| 4,837,817 | 6/1989 | Maemori | 358/224 |
| 4,856,088 | 8/1989 | Oliwa et al. | 455/349 |
| 4,928,300 | 5/1990 | Ogawa et al. | 379/53 |
| 4,934,773 | 6/1990 | Becker | 350/6.6 |
| 4,952,024 | 8/1990 | Gale | 350/143 |
| 4,977,456 | 12/1990 | Furuya | 358/213.13 |
| 4,997,263 | 3/1991 | Cohen et al. | 350/345 |
| 5,003,300 | 3/1991 | Wells | 340/705 |
| 5,023,931 | 6/1991 | Streck et al. | 455/21 |
| 5,034,809 | 7/1991 | Katoh | 358/88 |
| 5,050,966 | 9/1991 | Berman | 359/38 |
| 5,077,784 | 12/1991 | Fujita et al. | 379/53 |
| 5,079,627 | 1/1992 | Filo | 358/85 |
| 5,093,567 | 3/1992 | Staveley | 250/221 |
| 5,106,179 | 4/1992 | kamaya | 351/158 |
| 5,111,498 | 5/1992 | Guichard et al. | 379/53 |
| 5,122,880 | 6/1992 | Nagano | 358/209 |
| 5,138,312 | 8/1992 | Tsukamoto et al. | 340/825.44 |
| 5,153,569 | 10/1992 | Kawamura et al. | 340/705 |
| 5,162,828 | 11/1992 | Furness et al. | 353/122 |
| 5,164,833 | 11/1992 | Aoki | 358/224 |
| 5,164,980 | 11/1992 | Bush et al. | 379/53 |
| 5,189,632 | 2/1993 | Paajanen et al. | 364/705.05 |
| 5,220,366 | 6/1993 | King | 354/76 |
| 5,224,198 | 6/1993 | Jachimowicz et al. | 385/133 |
| 5,233,458 | 8/1993 | Moffitt et al. | 359/227 |
| 5,281,957 | 1/1994 | Schoolman | 345/8 |
| 5,321,416 | 6/1994 | Bassett et al. | 345/8 |
| 5,323,189 | 6/1994 | Contrearas | 351/118 |
| 5,347,400 | 9/1994 | Hunter | 359/742 |
| 5,381,179 | 1/1995 | Kashimura | 348/376 |
| 5,485,318 | 1/1996 | Lebby et al. | 359/811 |
| 5,485,504 | 1/1996 | Ohnsorge | 379/58 |
| 5,584,070 | 12/1996 | Harris et al. | 455/346 |

FOREIGN PATENT DOCUMENTS

| | | |
|---|---|---|
| 88/02494 | 4/1988 | WIPO . |
| 91/04508 | 4/1991 | WIPO . |
| 93/01583 | 1/1993 | WIPO . |
| 93/16550 | 8/1993 | WIPO . |
| 93/18428 | 9/1993 | WIPO . |
| 93/23783 | 11/1993 | WIPO . |
| 94/01798 | 1/1994 | WIPO . |
| 94/01958 | 6/1994 | WIPO . |
| 94/14152 | 6/1994 | WIPO . |
| 94/18595 | 8/1994 | WIPO . |
| 96/21173 | 7/1996 | WIPO . |
| 96/21205 | 7/1996 | WIPO . |

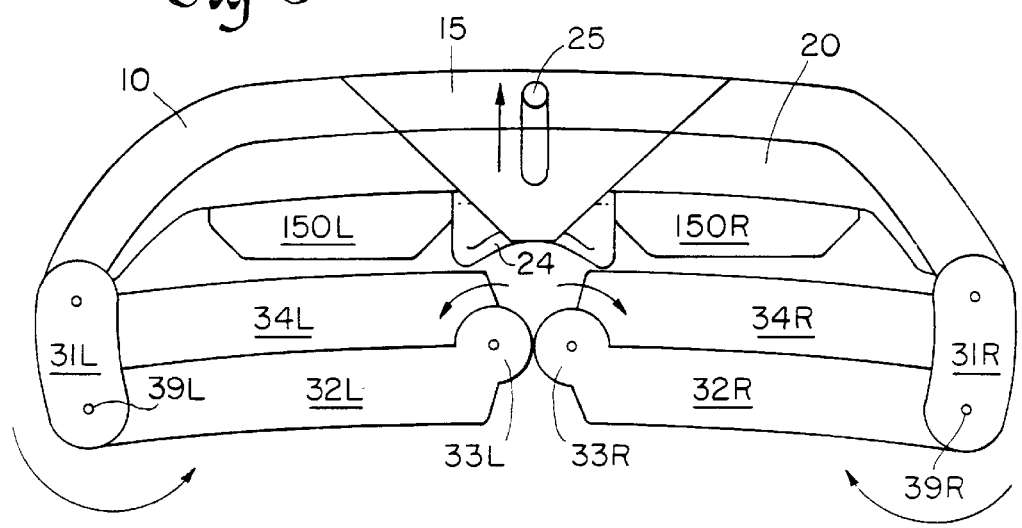
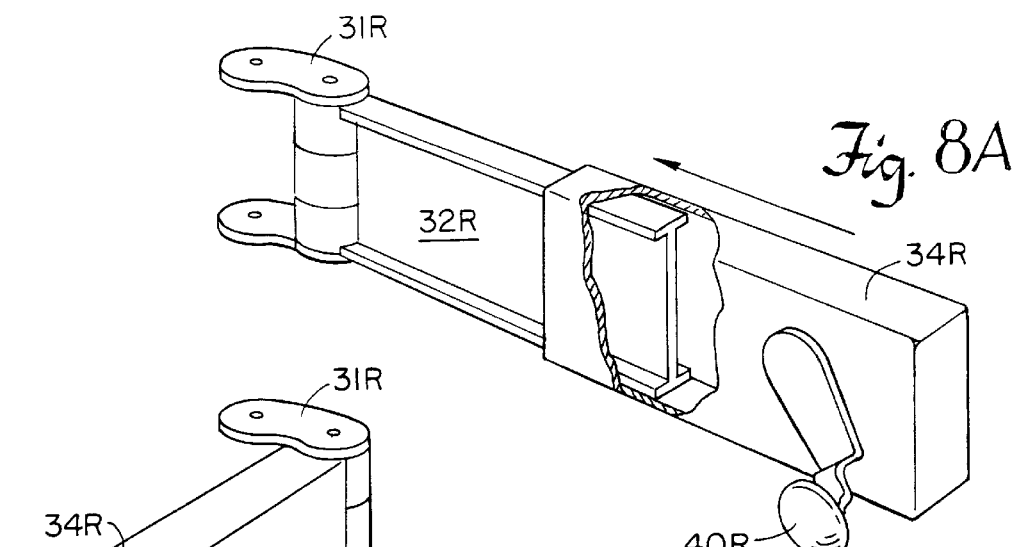
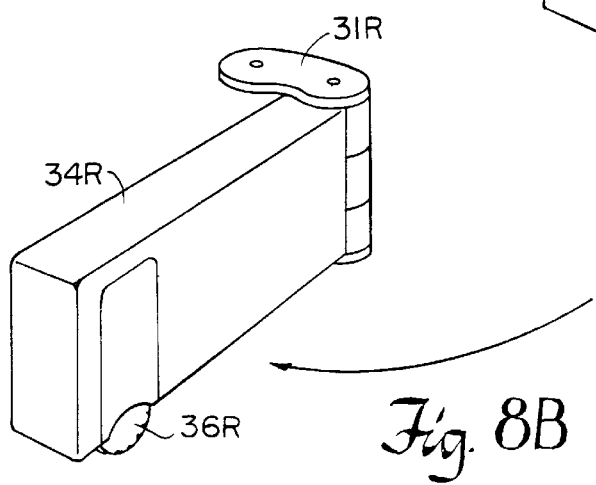

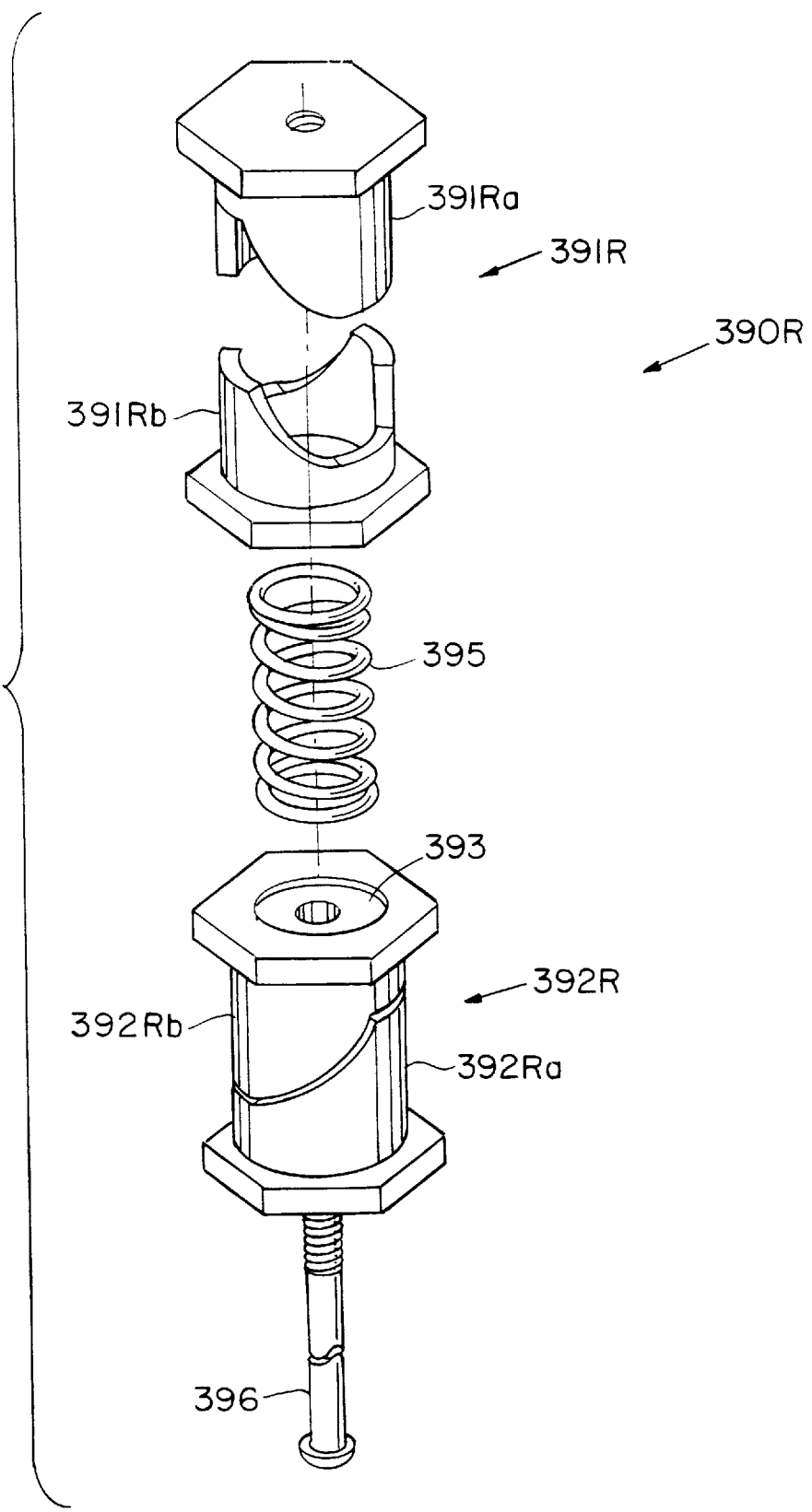

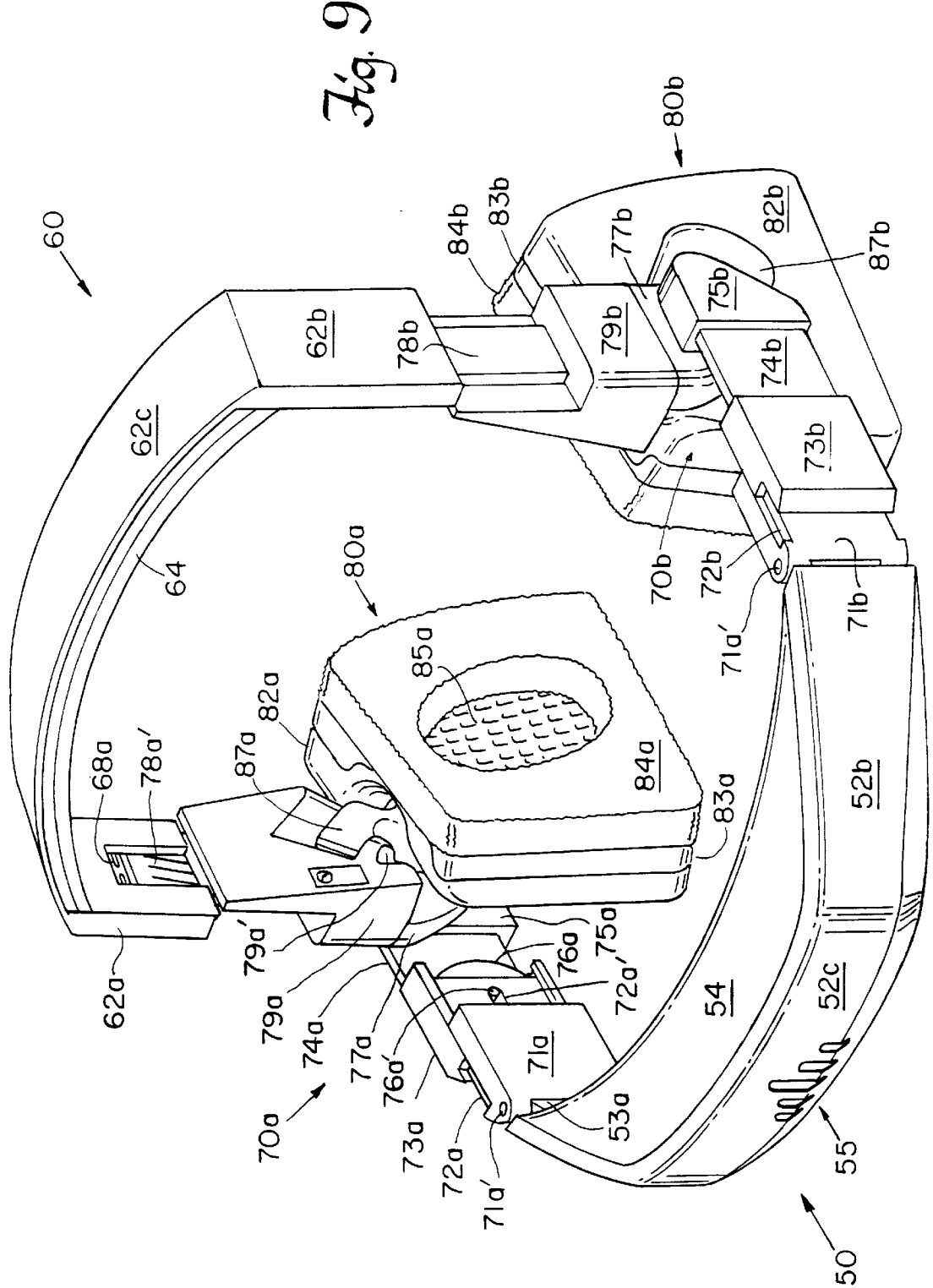

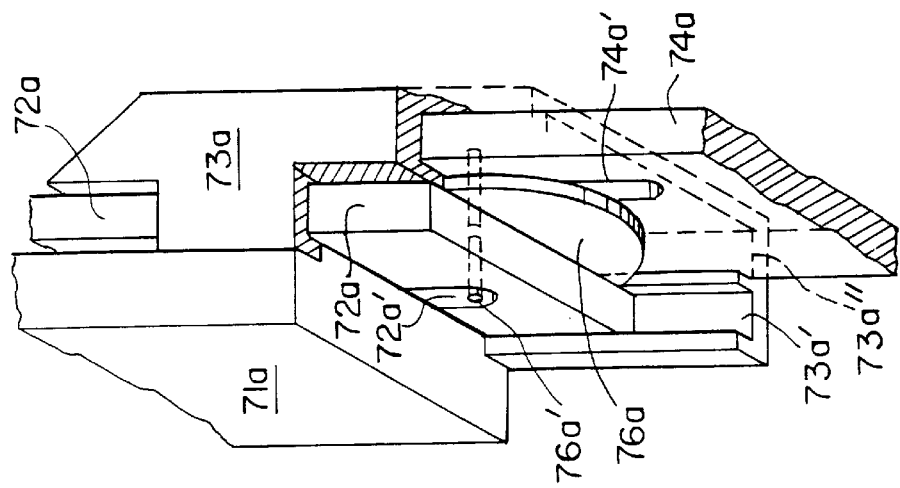
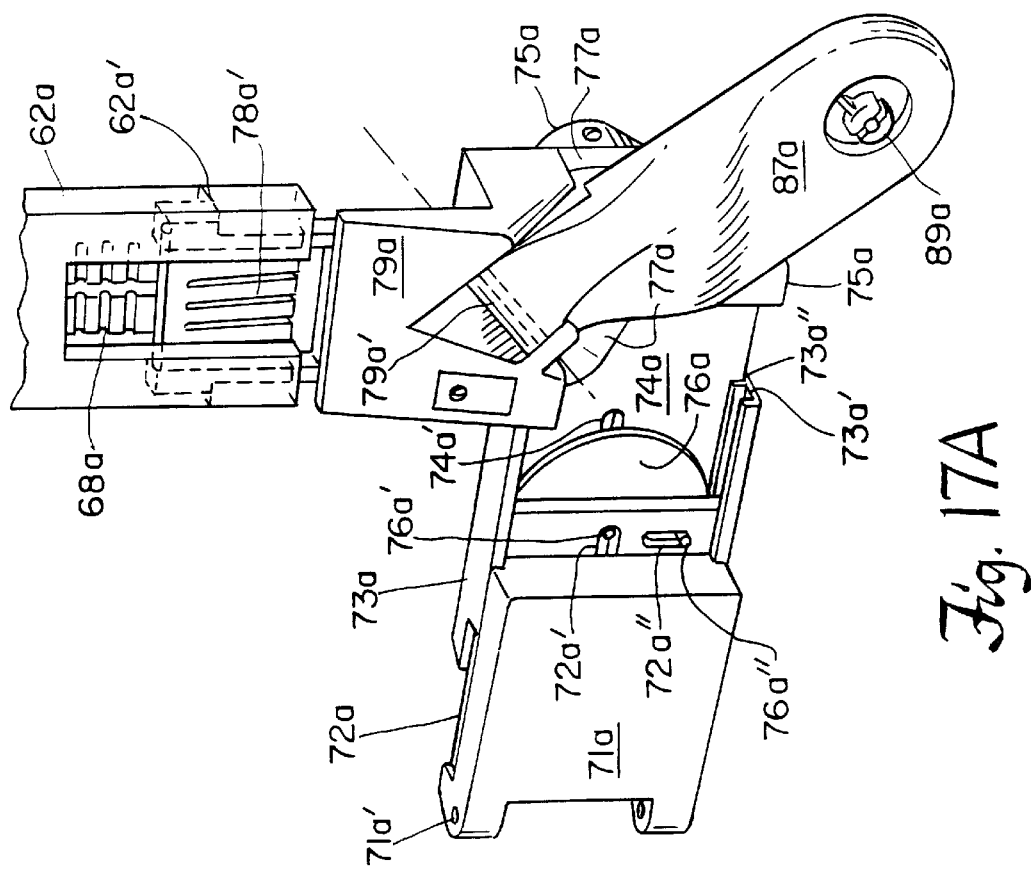
Fig. 17B
Fig. 17A

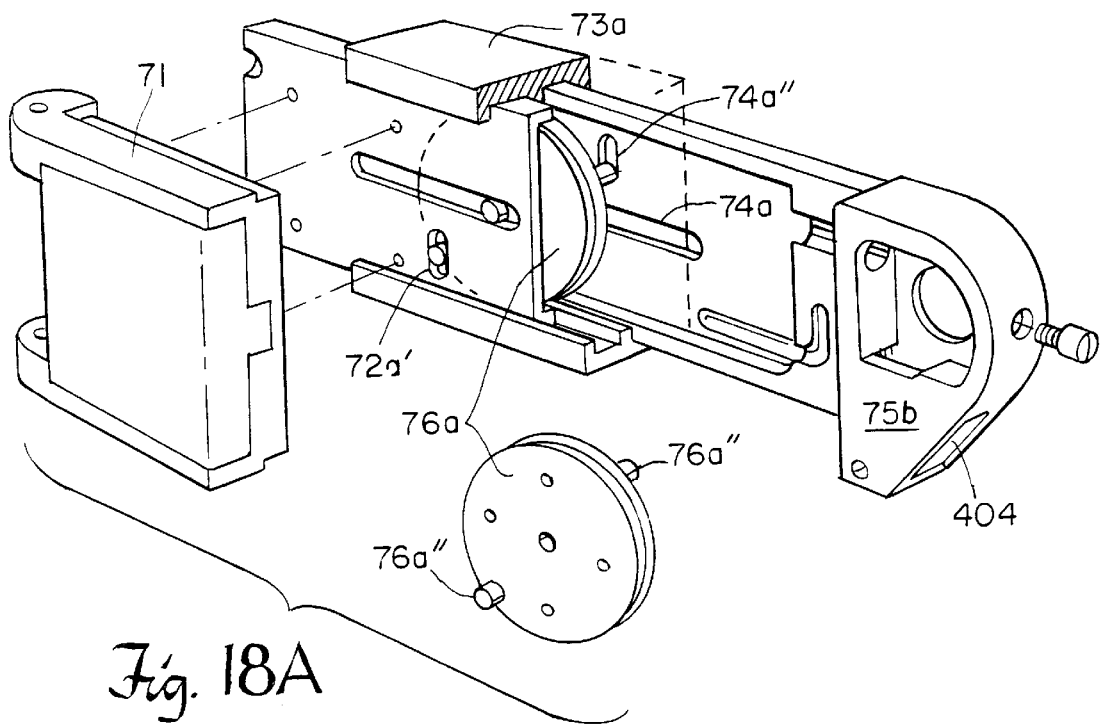
Fig. 18A
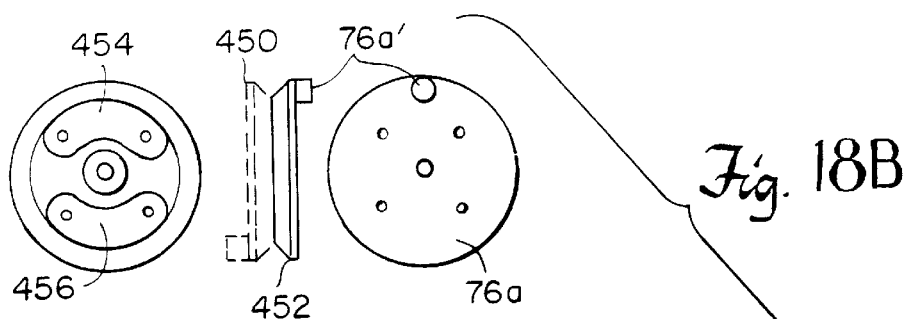
Fig. 18B
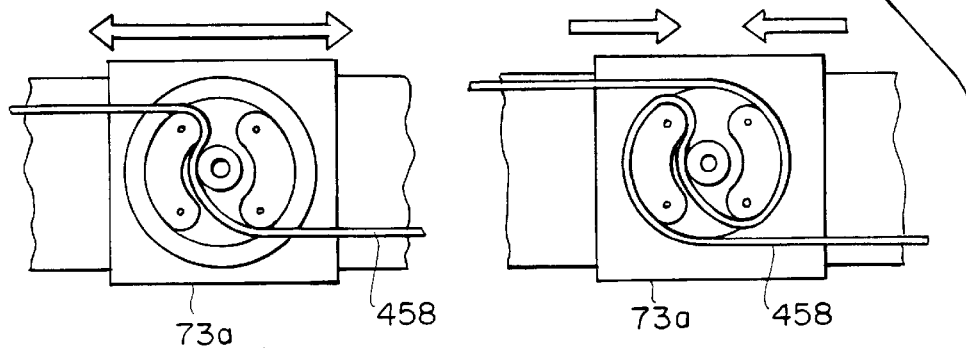

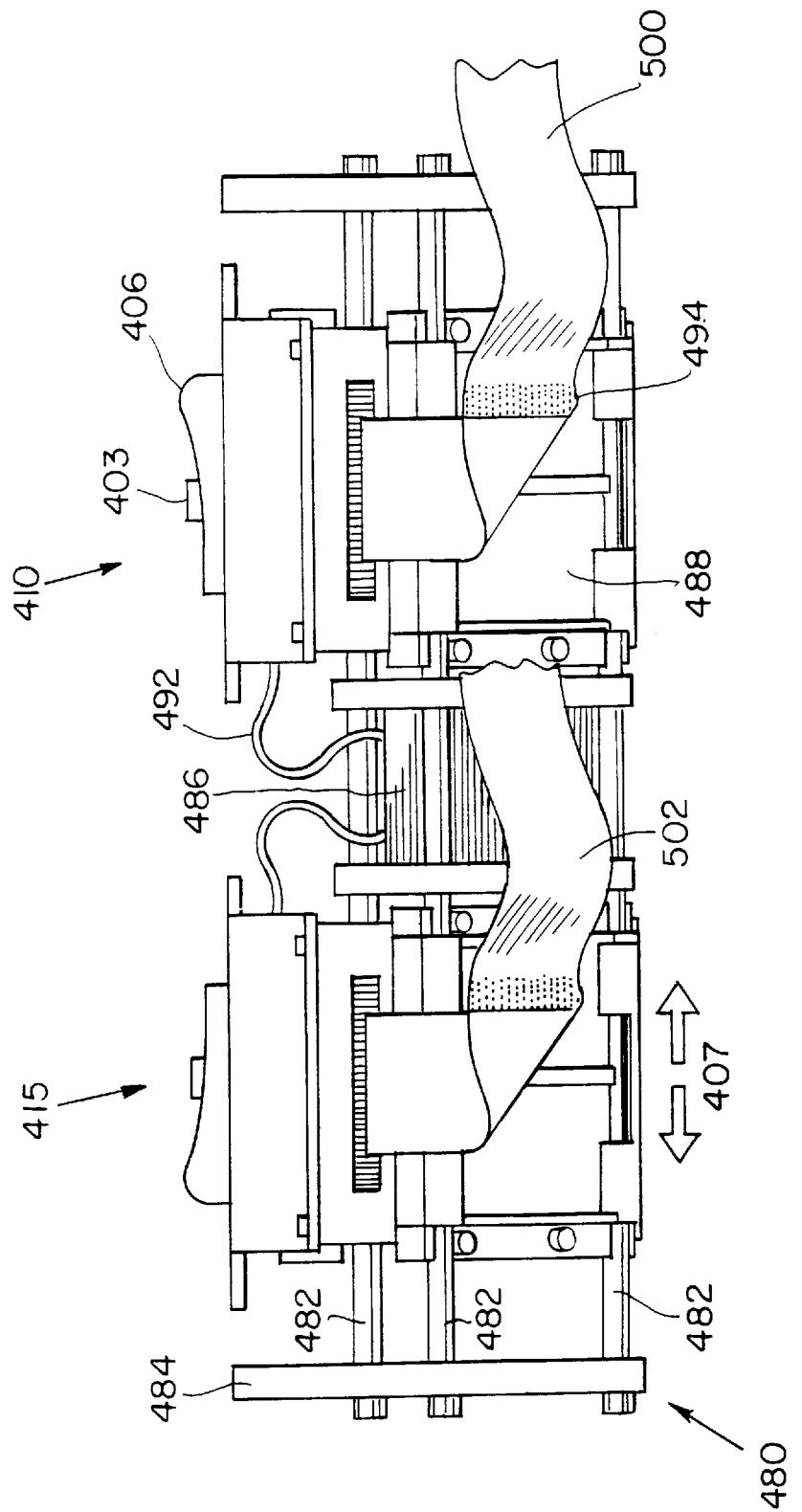

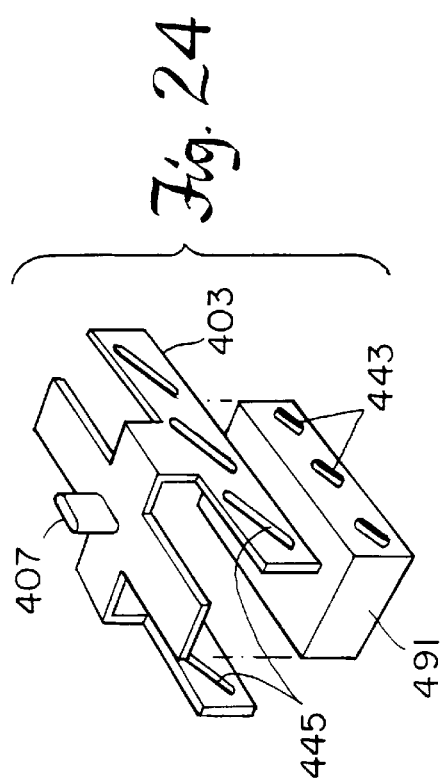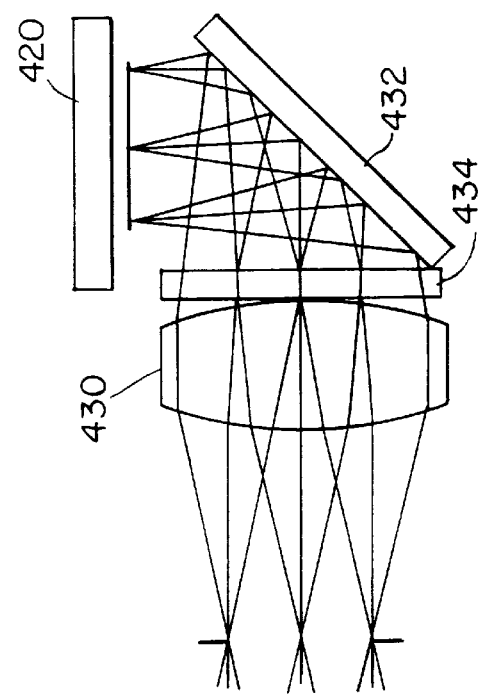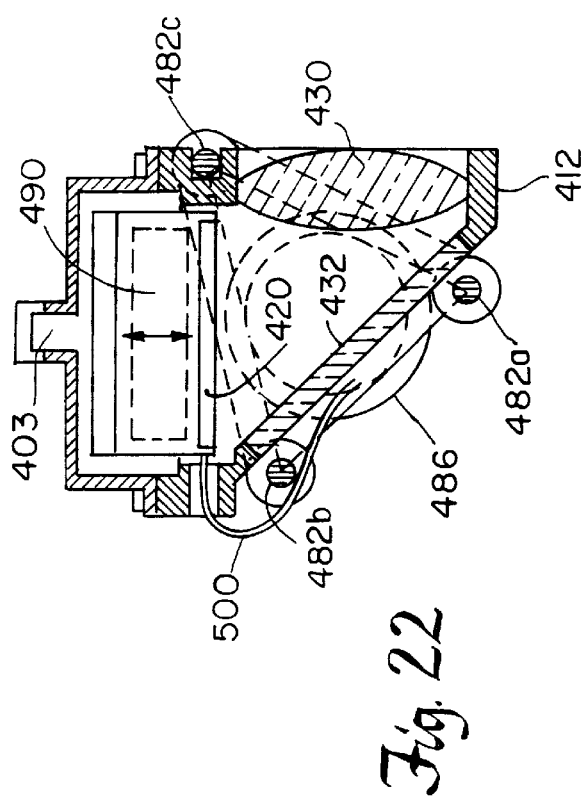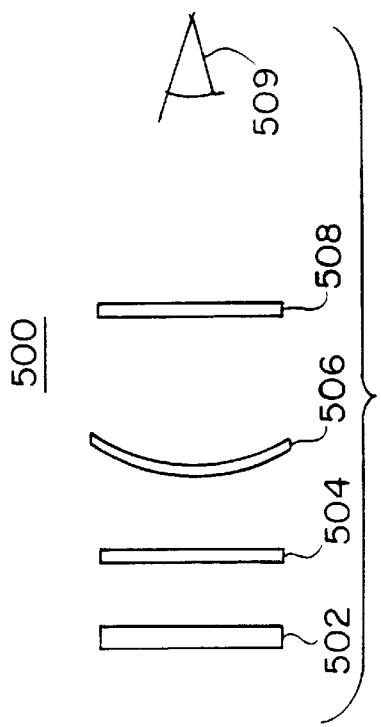

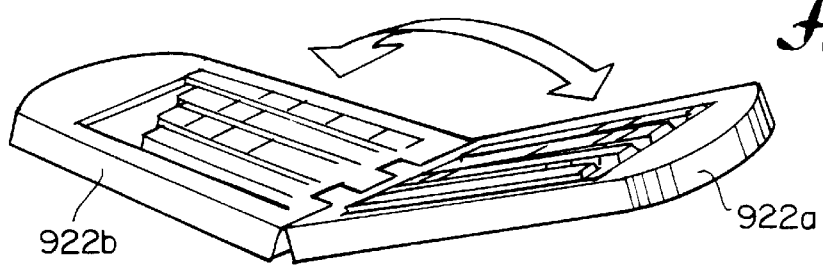
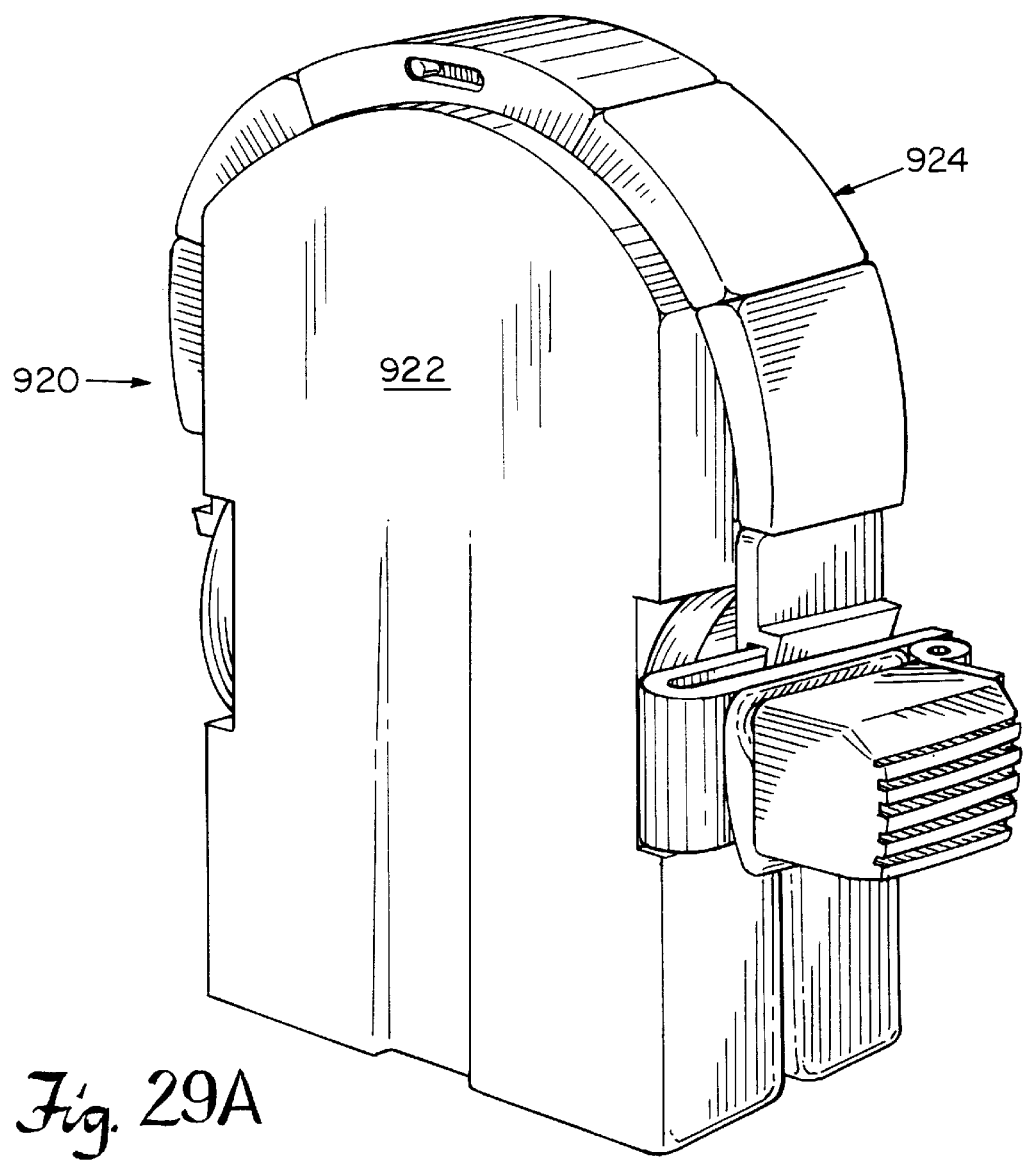

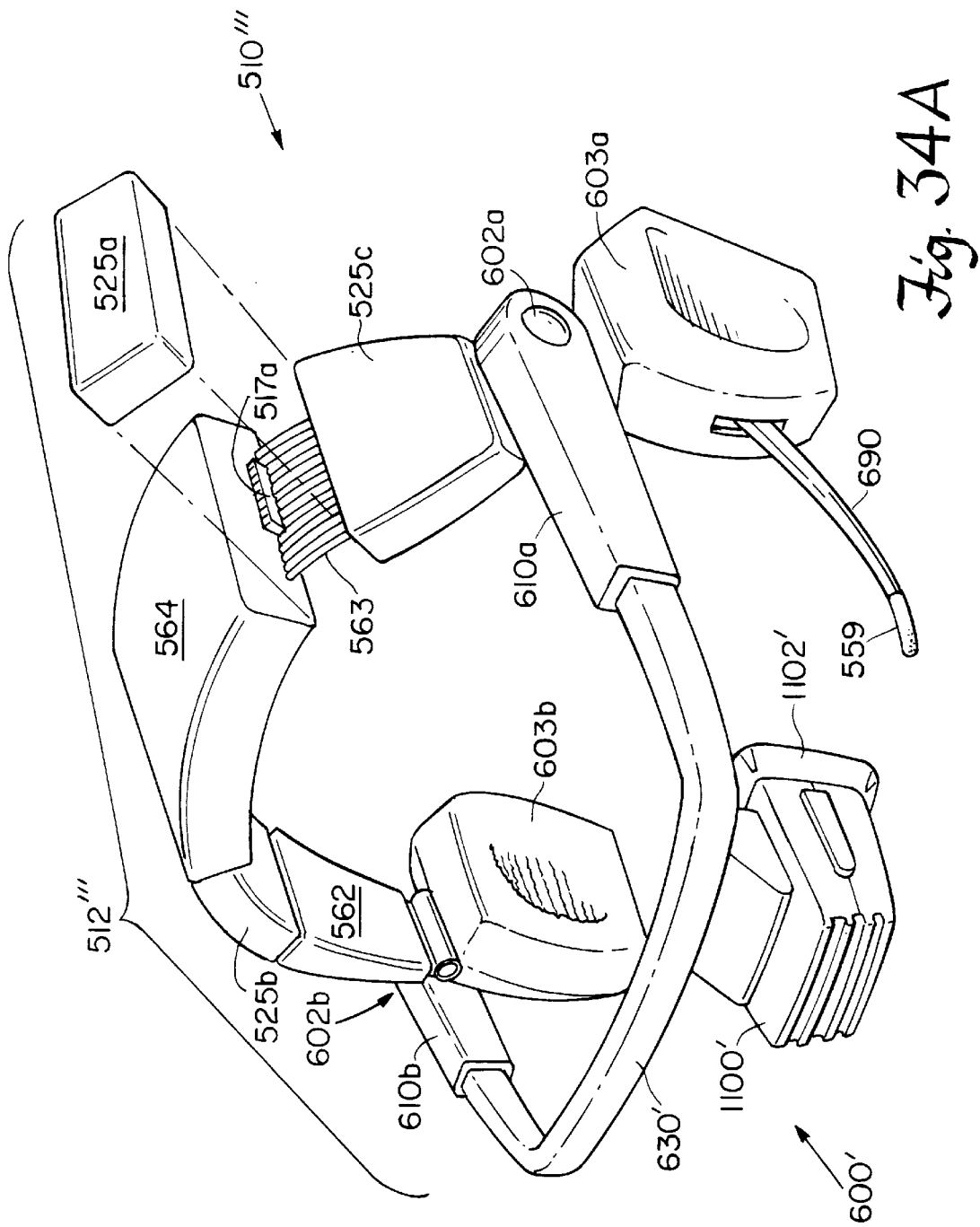

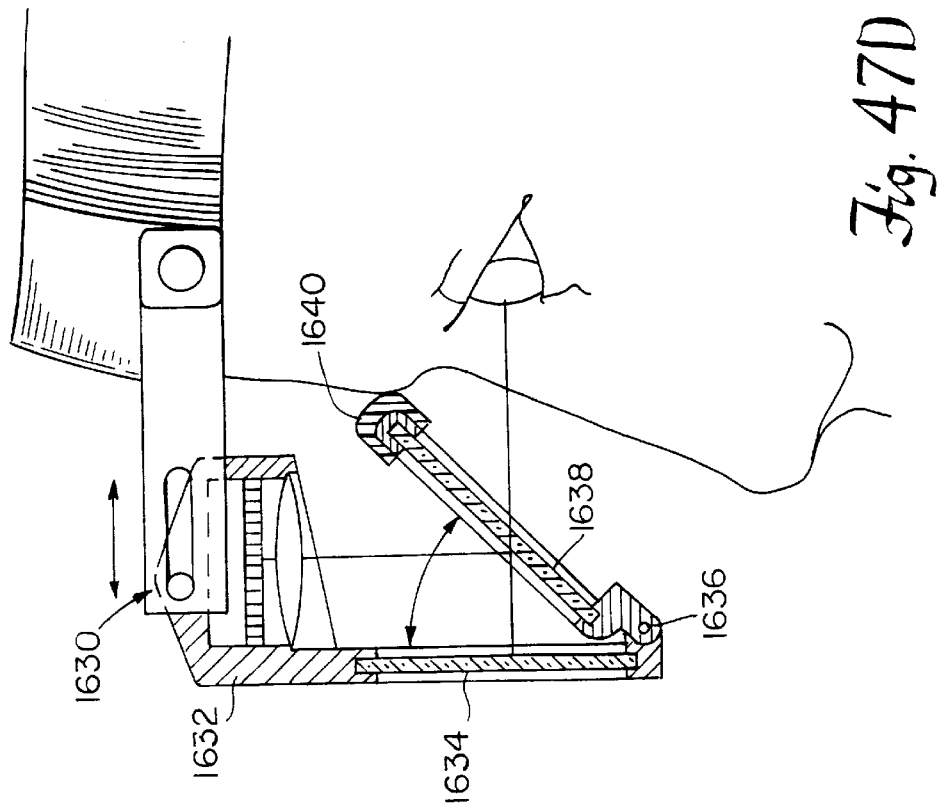
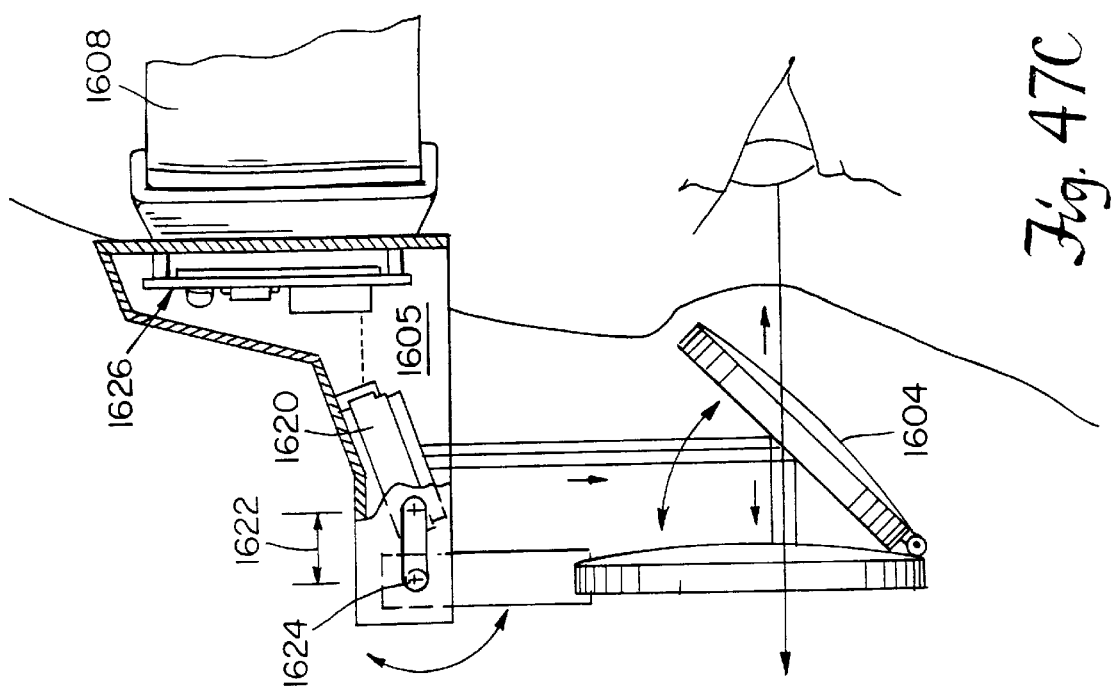
Fig. 47D
Fig. 47C

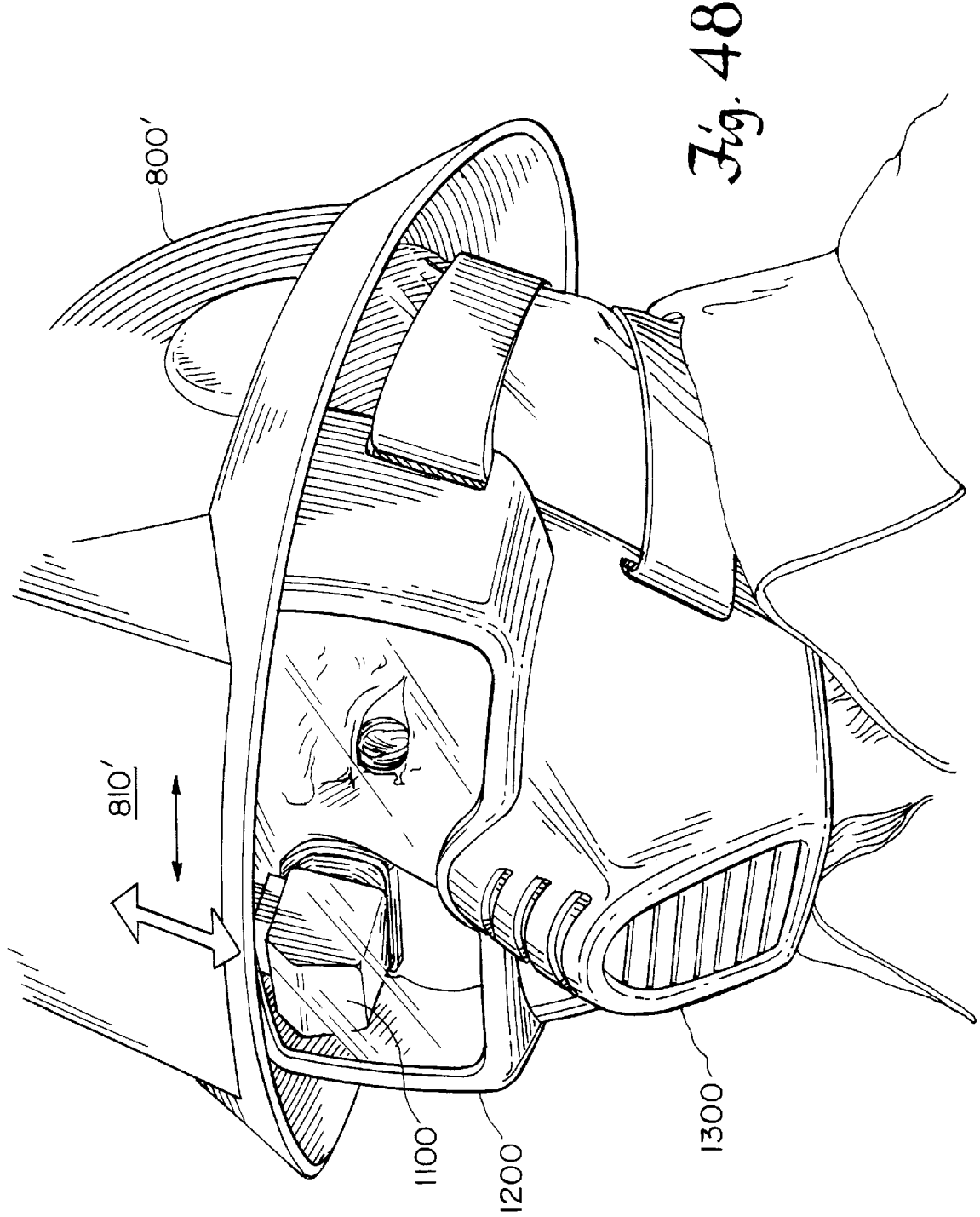

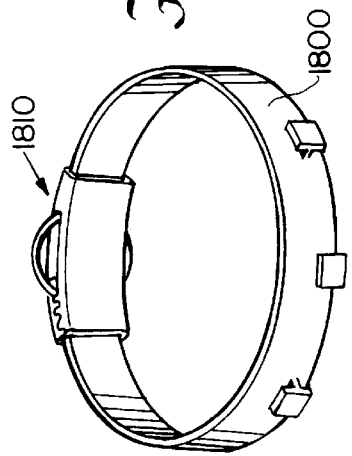
Fig. 56D
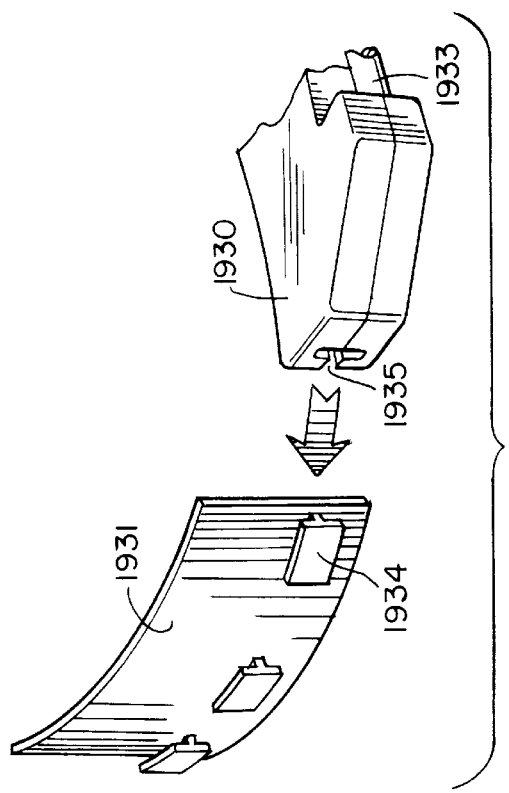
Fig. 56C
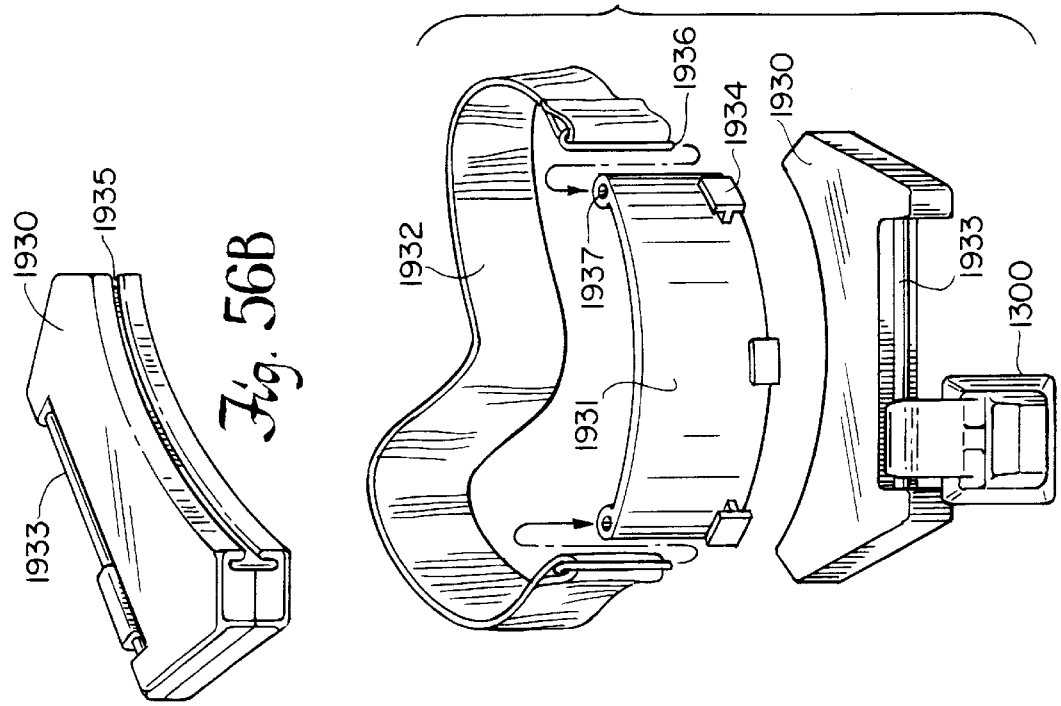
Fig. 56A
Fig. 56B

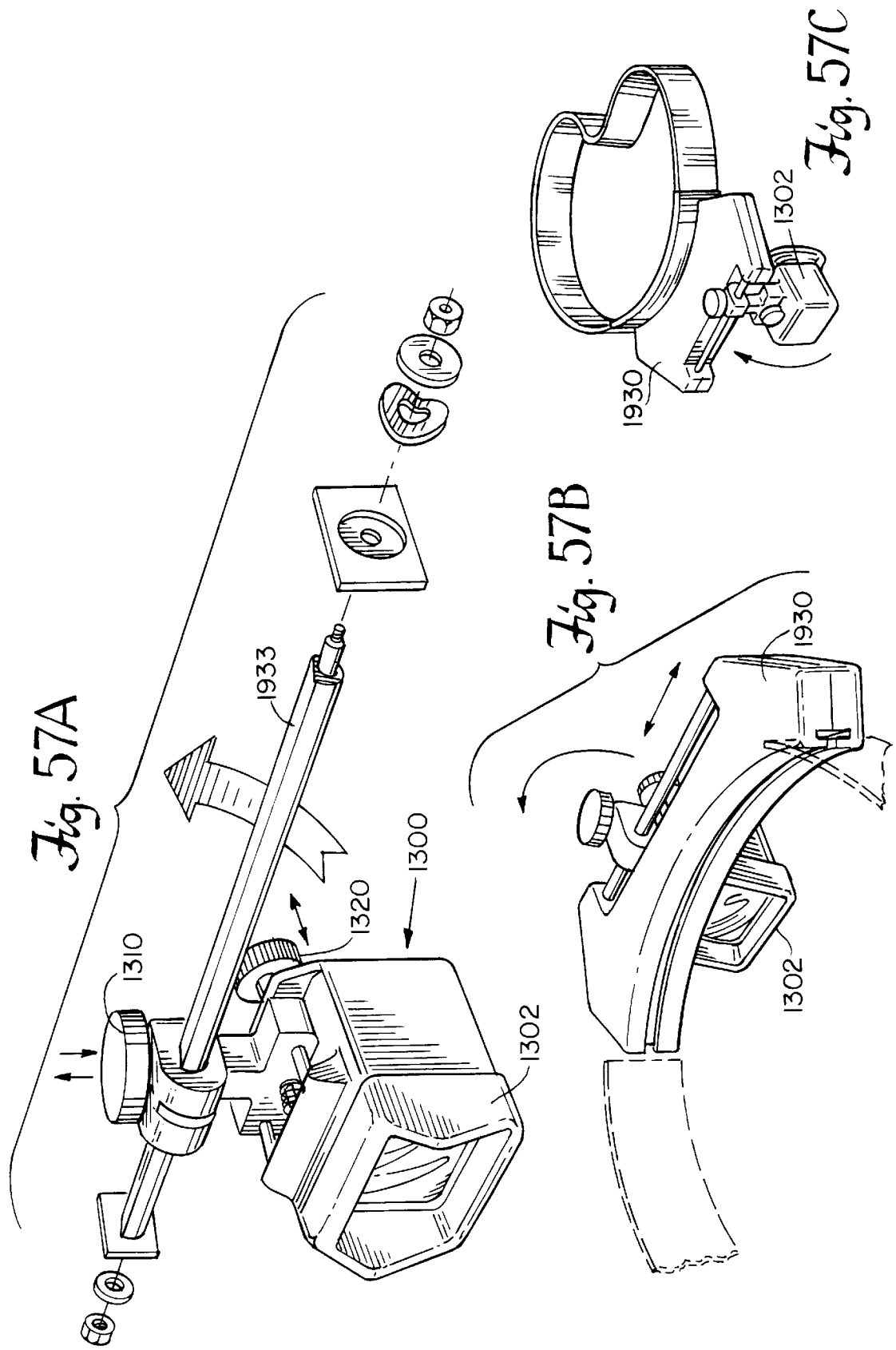

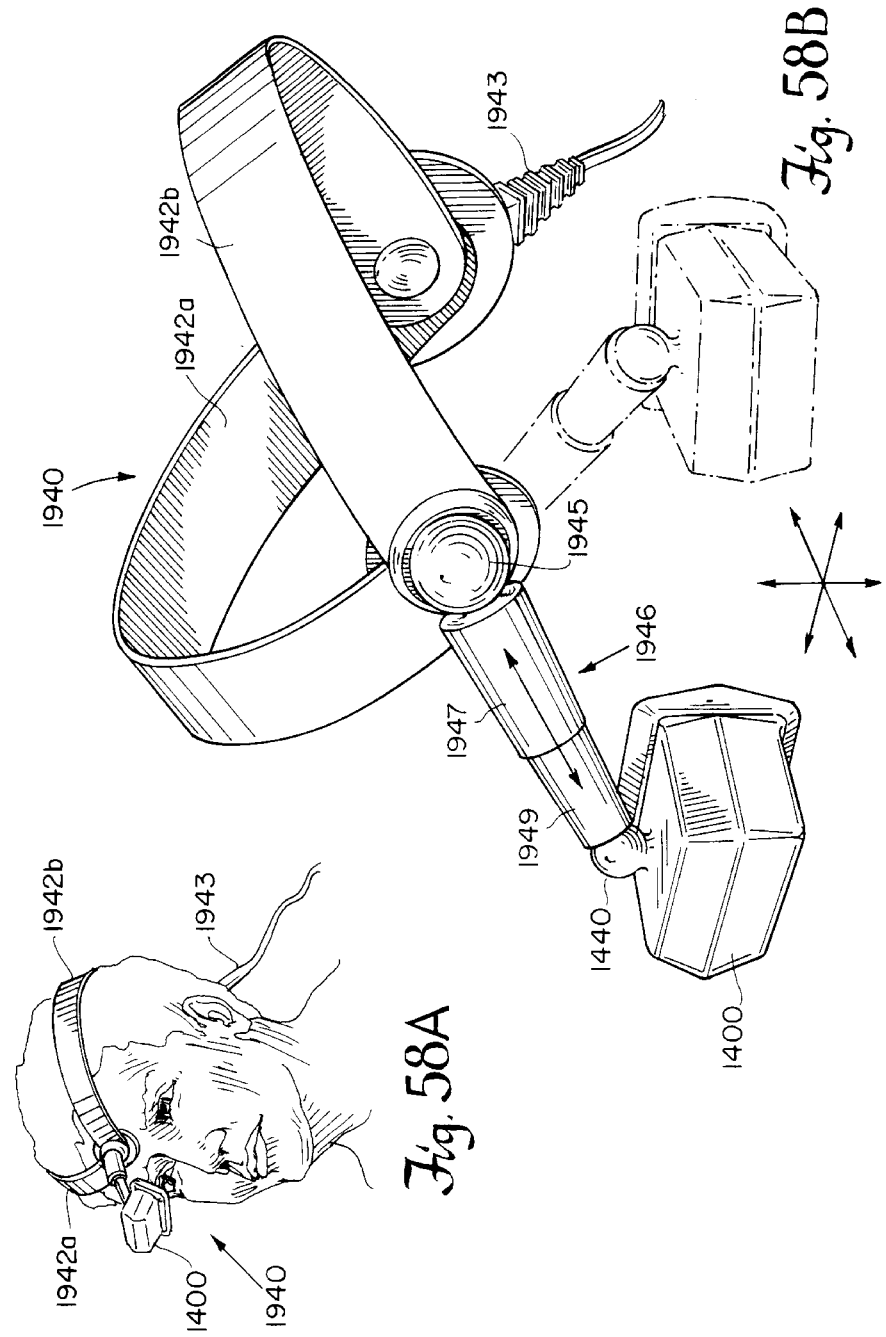

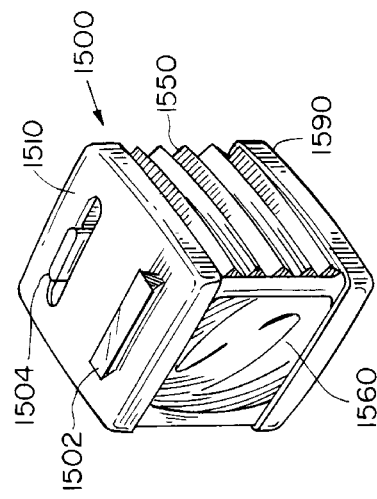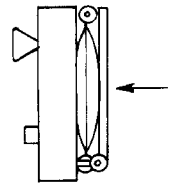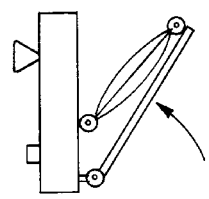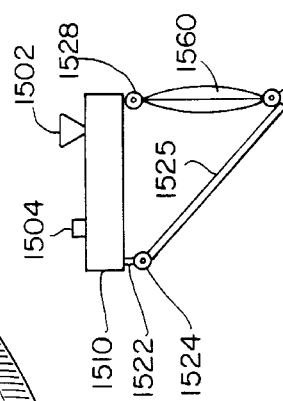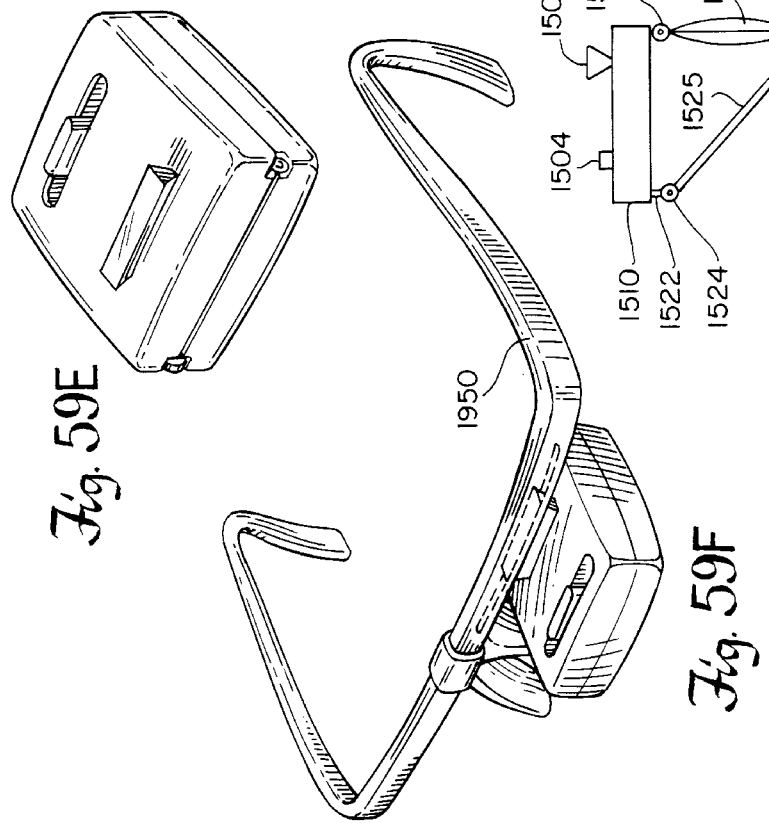

MONOCULAR PORTABLE COMMUNICATION AND DISPLAY SYSTEM

RELATED APPLICATION

This application is a continuation of application Ser. No. 08/288,062 filed Aug. 9, 1994, now abandoned, which is a Continuation-in-Part of U.S. Ser. No. 08/220,042, filed on Mar. 30, 1994, now abandoned, which is a Continuation-in-Part of U.S. Ser. No. 08/141,133, filed on Oct. 22, 1993, now abandoned.

BACKGROUND OF THE INVENTION

Head mounted display systems have been developed for a number of different applications including use by aircraft pilots and for simulation such as virtual imaging. Head mounted displays are generally limited by their resolution and by their size and weight.

Existing displays have relatively low resolution, and because of the size and weight of available systems, these displays are often positioned at the relatively large distance from the eye. Of particular importance, is the desirability of keeping the center of gravity of the display from extending upward and forward from the center of gravity of the head and neck of the wearer, where it will place a large torque on the wearer's neck and may bump into other instruments during use.

There is a continuing need to present images to the wearer of a helmet mounted display in high-resolution format similar to that of a computer monitor. The display needs to be as non-intrusive as possible, leading to the need for lightweight and compact system. Existing head mounted displays have used analog cathode ray tube ("CRT") devices mounted above or to the side of the user's head which project an image onto a surface or visor mounted in front of the user's eyes. Often these displays utilize helmets which incorporate earphones into the helmet. Other head mounted display devices have contemplated the use of liquid crystal devices that could be mounted above or to the side of the user's head and employ reflective optics to direct an image within the field of view of the user.

SUMMARY OF THE INVENTION

The present invention relates generally to systems and methods for mounting display and electronic systems on the human body for numerous applications including commercial, industrial and entertainment purposes. Due to the development of small, light weight, high resolution matrix displays, the use of these systems for head mounted and body mounted applications is expected to increase. The use of transferred thin film techniques and/or thin film single crystal silicon material to produce small, high resolution active matrix electronic displays is highly suited for the manufacture of head or body mounted displays is described in U.S. Pat. Nos. 5,206,749, 5,258,325, and 5,300,788, the entire contents of these patents being incorporated herein by reference.

Depending on the particular application, it is desirable to use either monocular or binocular systems for head mounted displays. For monocular systems, preferred embodiments have a single display and associated optics in a housing that can be positioned at the center of the filed of view of either of the user's eyes and can be moved partially or completely out of the user's field of view. Both monocular and binocular systems can be used with any video source. A preferred embodiment of the monocular system can be mounted to a frame with a hinge so that it can rotate in a vertical plane to a position above the field of view of the user. The frame can be secured to a support that holds the display on the head of the user. The frame can also house the wiring harness for the display as well as other communications systems described hereinafter.

A particular embodiment, uses either of the monocular or binocular systems with a head or body mounted computer system and a user interface. The computer and associated electronic components used to load programs, load and store data and communicate or network with other systems by wire or wireless operation can be mounted on the headpiece, or in other embodiments, on the chest, back, arms or around the waist of the user. The user interface can be a standard (ISO) keyboard, a collapsible keyboard in standard or non-standard format, a voice activated system a pen, a joystick, a trackball, a touch pad, or a virtual keyboard using motion sensitive gloves, or other suitable means depending upon the particular embodiment and application.

In accordance with a preferred embodiment of a binocular head mounted display, the system can include a housing in which a pair of matrix display elements are secured. These display elements are of a sufficiently light-weight and compact nature that the housing can be mounted onto the head of a user with a pair of hinge mounted arms or support elements that can be rotated relative to the housing from a closed position to an open position. When in the open position the arms extend about the opposite side of the user's head and serve to position audio transducers mounted on the arms into proximity with the ears of the user. The arms can also be double hinged in which each arm is folded once about its mid-point and then rotated about the hinge on each side of the housing to assume the closed position.

System electronics and manually adjustable controls can be positioned within the housing or the rotating arms, or on bands extending above or behind the head of the user. Positioning of the electronics and controls within the arms; or bands permits a more desirable distribution of weight evenly about the sides or top of the user's head.

The inter-pupillary distance between the two displays can be adjusted such as by the use of a gear driven cam assembly mounted within the housing. Centering of both monocular and binocular displays within the field of view of one or both eyes can thus be accomplished manually, or alternatively by motorized gears or cams. Motors can also be incorporated into the support structure to move the display into, and out of, the user's field of view.

The direct view display can be a transmission type display with the light source directly adjacent the light valve active matrix and mounted within the display device. The transmission type display can, in a preferred embodiment, also receive light directly from the user's environment so that the display overlays an image over the users existing field of view.

Alternatively, the display can be an emission type device such as an active matrix electroluminescent display or an active matrix of light emitting diodes (LEDs), or transmissive passive matrix display or a reflective display.

In various alternative embodiments, a head mounted display can be provided for use with a headband where a molded plastic visor serves as a frame for mounting the electronic display and houses the display wiring harness. An audio system can be mounted on various types of head and body mounted displays described herein, including the headband, the monocular and binocular systems. The audio system can be linked to a computer system, with a network, with connection by wire, fiberoptic or wireless systems, or to other audio sources including radio or television transmitters.

A preferred embodiment provides protective headgear such as safety glasses, hardhats and helmets for a number of commercial and industrial applications. For embodiments including hardhats and helmets, the system includes a rigid protective headpieces covering the head of the user to prevent injury from falling objects. The protective headgear is dimensioned to work in combination with an electronic display mounted on a frame which can be secured to the user's head using several alternative devices. The frame can be mounted to the rigid headpiece by clipping or otherwise securing the frame to the headpiece visor or a receptacle on that portion of the headpiece adjacent one ear of the user. Alternatively, the frame can be mounted on or within the helmet. The frame can include a first track to permit the user to move the display from a retracted position to a viewing position within the field of view of the user. This system can be a monocular system or a binocular system using two displays. The monocular system can be placed on a second horizontal track so that the user can center the display in front of either eye.

In other alternative embodiments, the protective headgear can include transparent safety glasses or visor in front of the user's eyes. When used with safety glasses or other protective components, the display can be secured with a breakaway mounting device so that impacts on the display above a threshold force level with cause the display to detach from the glasses, visor or frame on which the display is mounted.

The displays used herein can be monochrome or color. Color or monochrome active matrix displays having at least 300,000 pixels and preferably over 1,000,000 pixels can be fabricated using methods described in U.S. Ser. No. 07/944,207 filed Sep. 11, 1992, the entire contents of which is incorporated herein by reference.

BRIEF DESCRIPTION OF THE DRAWINGS

The above and other features of the invention, including various novel details of construction and combinations of parts, will now be more particularly described with reference to the accompanying drawings and pointed out in the claims. It will be understood that the particular head and/or body mounted display systems embodying the invention is shown by way of illustration only and not as a limitation of the invention. The principles and features of this invention may be employed in varied and numerous embodiments without departing from the scope of the invention.

FIG. 6 is a top plan view showing the embodiment of FIG. 1 in a stowed position.

FIG. 7 is an exploded perspective view of a preferred embodiment of cam assembly for the pivot point 39 of FIG. 6.

FIGS. 8A–8B are partial perspective views of another preferred embodiment for storing the stems 30 of FIG. 1.

FIG. 9 is a perspective view of an alternative embodiment of the invention.

FIGS. 17A–17B are detailed views of the sliding assembly.

FIGS. 18A–18B are further detailed views of the spool assembly and cable management system.

FIG. 20 shows two modules mounted on a rail assembly.

FIG. 22 is a cross-sectional side view of the optics.

FIG. 24 shows the focus slide and backlight housing.

FIG. 25 is an alternative embodiment of the optical system for a high resolution display.

FIG. 26 is an exploded view of the eye-piece display and optics of a preferred embodiment of the invention.

FIGS. 29A–29B illustrate another preferred embodiment of the collapsible keyboard and head mounted display system.

FIGS. 34A–34D illustrate partial exploded perspective views of another head-mounted computer in accordance with the present invention.

FIGS. 47A–47D illustrate views of a preferred embodiment of a projection type display.

FIG. 48 is a perspective view of another preferred embodiment of the invention.

FIGS. 56A–56D are perspective views of another head-mounted display apparatus according to the invention.

FIGS. 57A–57H illustrate perspective view of a particular visor mounted preferred display.

FIG. 58A is a perspective view of a wearer equipped with a preferred embodiment of a head-mounted display.

FIG. 58B is a perspective view of the head-mounted display of FIG. 58A.

FIGS. 59A–59F are perspective views of a collapsible display according to a preferred embodiment of the invention.

DETAILED DESCRIPTION OF THE
PREFERRED EMBODIMENT OF THE
INVENTION

Figure 1:
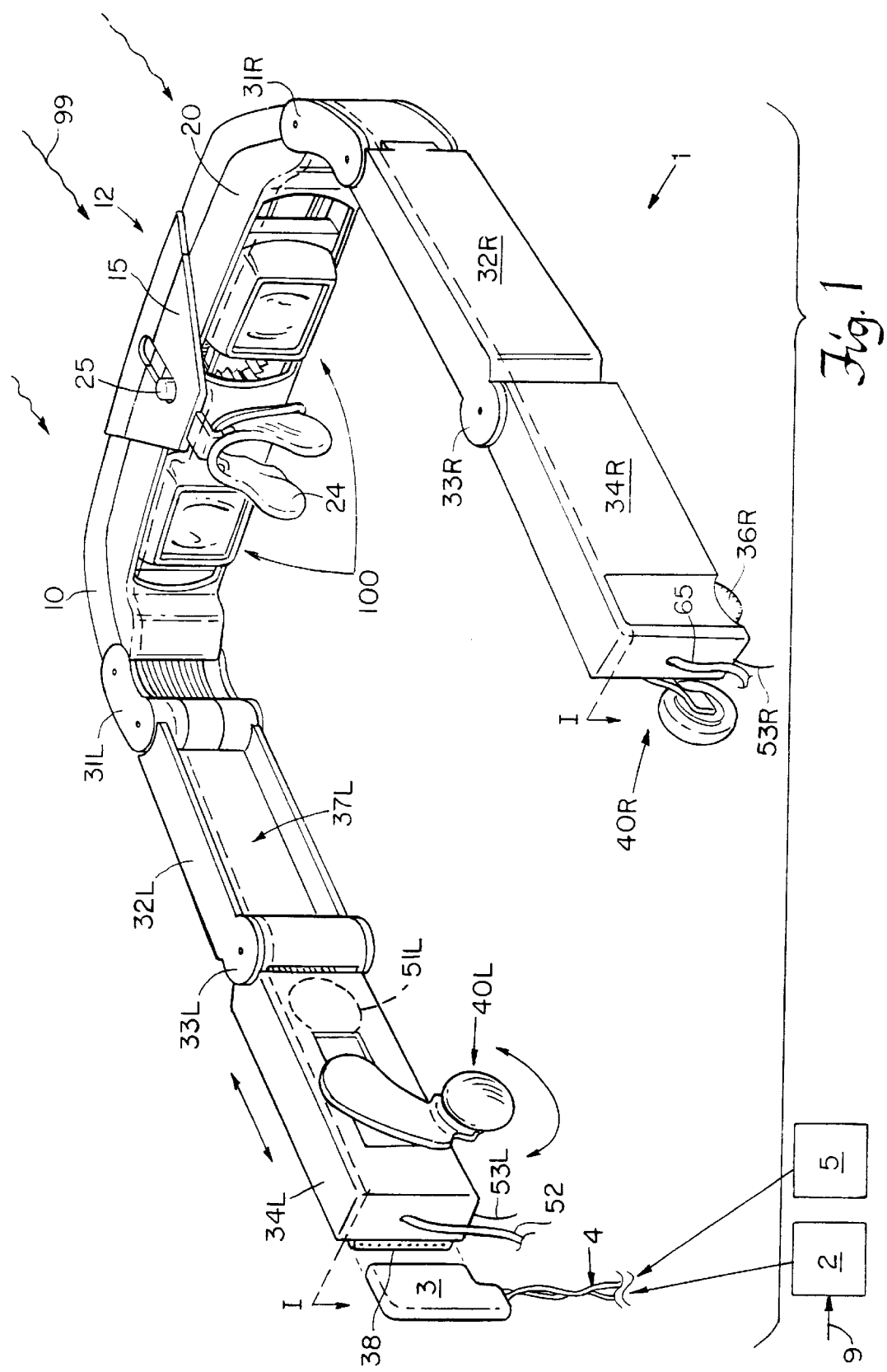
FIG. 1 is a rear perspective view of a preferred embodiment of the invention.

FIG. 1 is a rear perspective view of a preferred embodiment of a head mounted display 1. The head mounted display 1 is constructed of plastic or some other light-weight housing material and is adapted to be worn by a user to view video images via an optical assembly 100. The head mounted display exploits electronic digital imaging to form video images on a pair of light valve display panels, one of which is viewed through the user's left eye and the other of which is viewed through the user's right eye. Related discussions of head mounted display devices are provided in U.S. patent application Ser. No. 07/971,352, filed Nov. 4, 1992 and International Patent Publication WO 93/18428, filed Mar. 12, 1992, the teachings of which are both incorporated herein by reference.

The images are provided by a remote video source 2, which can be a camera, a computer, a receiver, a video cassette player, or any device that can transmit a video signal. The video source 2 may generate of video signal from data received over a link 9, such as fiber optic cable. In addition, supply voltage is provided to the head mounted display 1 from a power supply 5, which can provide the required supply voltage through the video source 2. The video source 2 can also provide an audio signal. In a particular preferred embodiment of the invention, the video source 2 and the power supply 5 are physically connected to the head mounted display 1 using a connector 3.

It should be understood that the head mounted display 1 can be self-contained such that no physical connection to the remote video source 2 or power supply 5 is required. For example, the head mounted display 1 can contain a receiver to receive transmitted video information and translate that received video information to control signals. Such an embodiment is particularly useful for receiving an over-the-air television broadcast. Similarly, the power supply for the head mounted display 1 can be provided by batteries or another power source (e.g., solar cells) that are integrated into the head mounted display 1.

Figure 3:
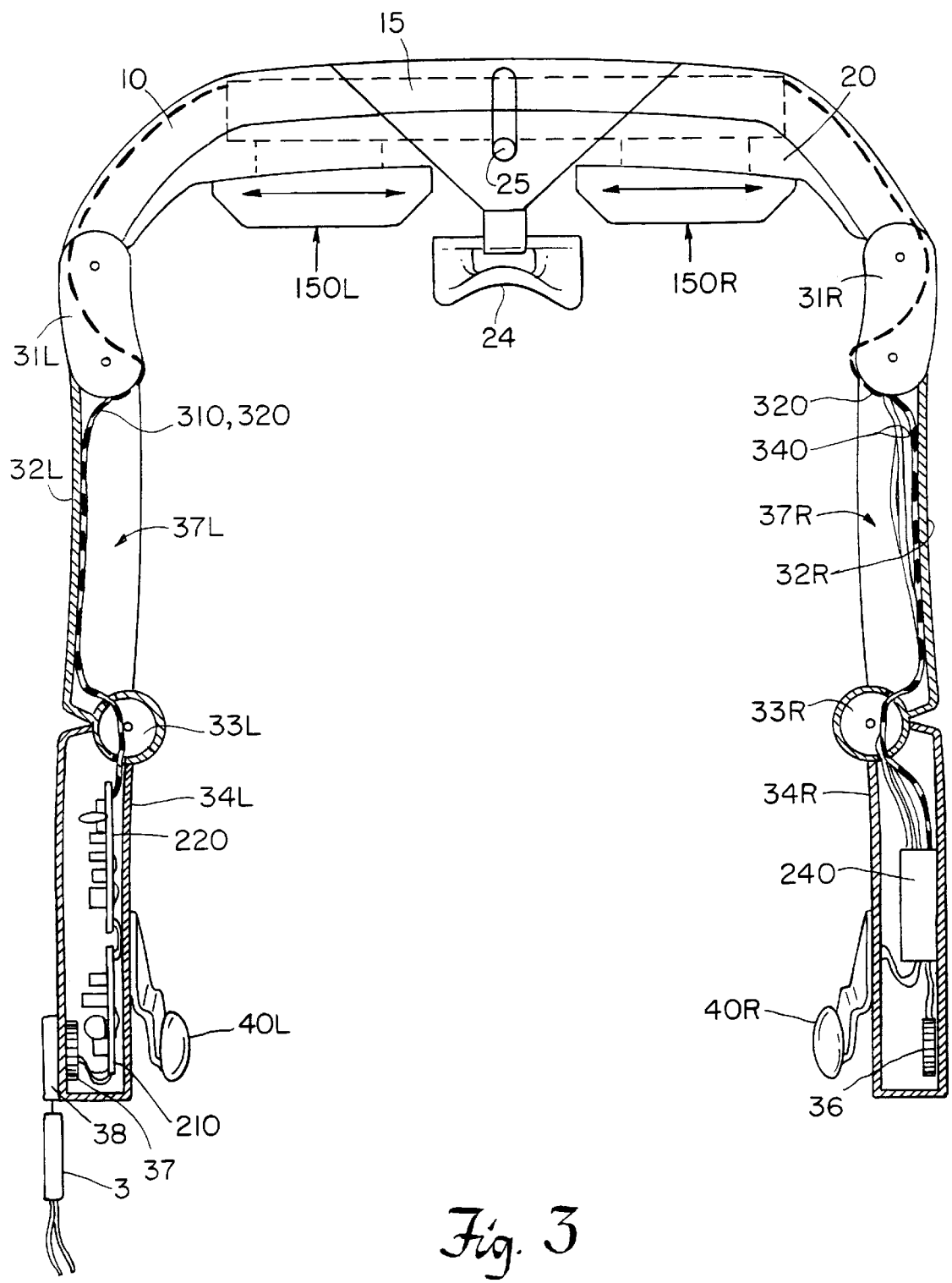
FIG. 3 is a top plan view of the preferred embodiment of FIG. 1 showing the placement of the wiring harness of FIG. 2.

The head mounted display 1 has a central housing body 12 that is formed from a front housing section 10 and a back housing section 20. The front section 10 is preferably formed from an opaque material such as plastic to block external light 99 from the user's eye's. The rear section 20 is also formed from an opaque material but is adapted to permit the user to adjust the optical assembly 100. The front section 10 is used to mount the optical assembly 100 (FIG. 3). In addition to the optical assembly 100, the user can also adjust a nose bridge assembly 24. The nose bridge assembly 24 can be positioned between an extended position (as illustrated) and a retracted position using an actuating button 25. The user can select a position from a discrete number of detents. In a preferred embodiment of the invention, the actuating button 25 is fastened to one end of a member that slides within a channel of a support member 15. The opposite end of the member is fastened to the nose bridge assembly 24. When in a selected position, the button is registered to a respective detent. The actuating button 25 is pushed to release the button 25 from the detent so that the nose bridge 24 is retracted.

Attached to each side of the head mounted display body 12 is a stem 30 through a respective forward hinge 31. Each stem contains a forward stem section 32, which is coupled to the forward hinge 31 at the proximal end. In a particular preferred embodiment, the forward stem section 32 contains a rear hinge 33 at the distal end and an earphone storage compartment 37 into which earphones 40 are stowed when the stems are folded.

Rearward stem sections 34 are coupled to the forward stem section 32 joints 33 at their proximal ends. The rearward stem sections 34 are adapted to supply earphones for use by the user. The earphones 40 pivot down from a horizontally aligned position for use by the user. When stowed, the earphones 40 are returned to a horizontally aligned position for storage in the earphone storage compartment 37 of the forward stem section 32. The earphones also slide forward and rearward for adjustment by the user. The rear stem sections 34 also contain control knobs 36, 37 (not shown) for adjusting the audio and video features during the operation of the head mounted display 1. The control knobs 36,37 are thus coupled to electronic circuitry, which is also stored within the stem sections 30. In a particular preferred embodiment of the invention, the right rear stem section 34R contains a volume control 36 and the left rear stem section 34L contains a contrast control 37 (not shown). Also in a particular preferred embodiment of the invention, the left rear stem section 34L, contains a female connector 38 for interfacing with the video source 2 through the male connector 3. Alternatively, an antenna can be provided to receive audio and video signals and other electronic information.

The head mounted display 1 can be used in numerous and varied applications including, but not limited to, commercial audio/video presentations (television, home video), computer and multimedia presentations, hospital operating room use (e.g. orthoscopic surgery), remote camera monitoring, or any other use where private or detailed viewing of a video image is desired. For certain applications, it is desirable that the body 12 of the head mounted display 1 pivot upward like a visor to permit the user to easily alternate viewing the video image and alive scene. An example of such an application is when the head mounted display 1 is worn by a surgeon during orthoscopic, or other, surgery.

Figure 2:
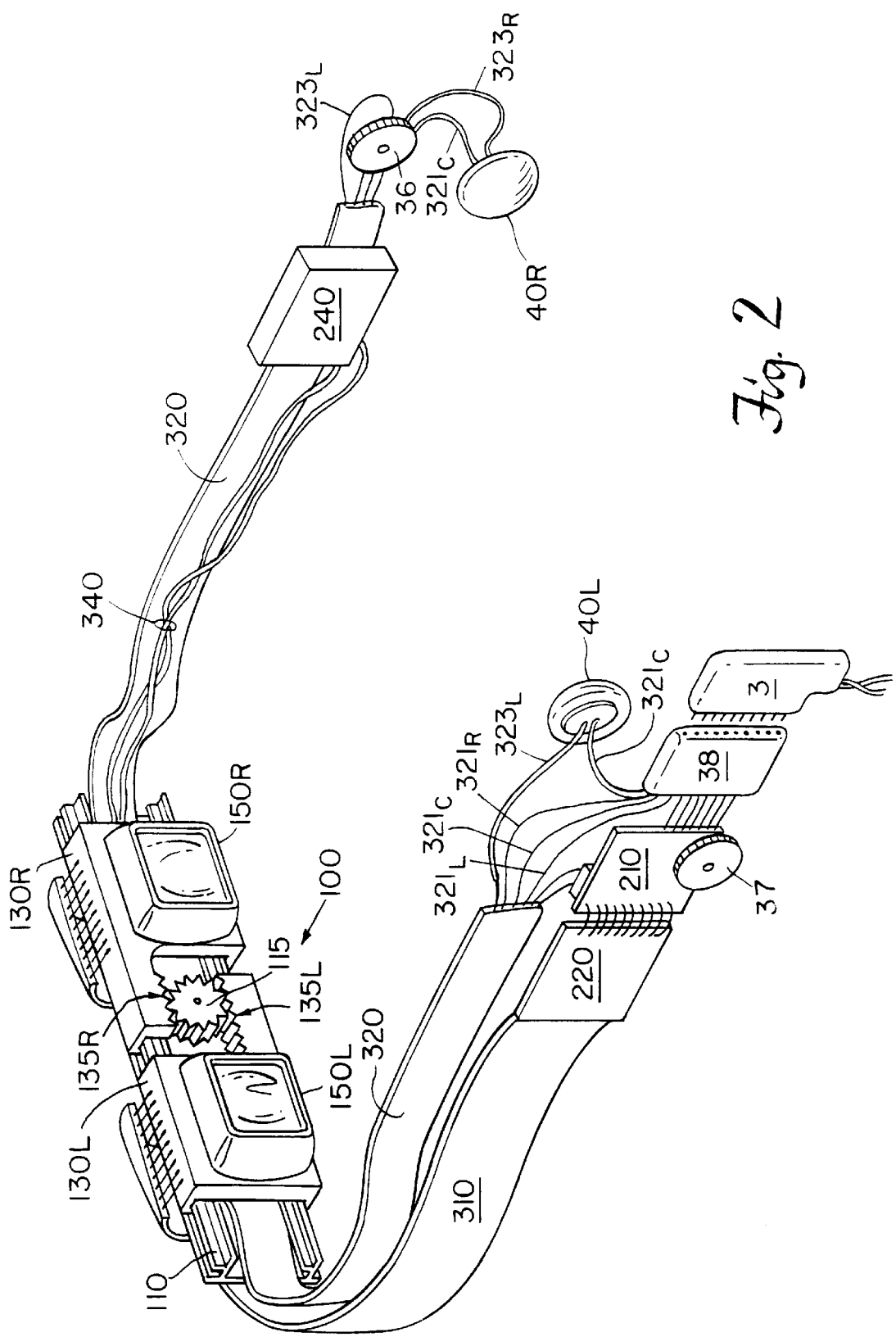
FIG. 2 is a perspective view of a preferred embodiment of a wiring harness.

FIG. 2 is a rear perspective illustration of the wiring harness enclosed by the head mounted display 1. In a particular preferred embodiment, audio and video information and supply power is provided via a 10-pin male connector 3. The male connector 3 registers to a 10-pin female connector 38. Of these ten pins, seven pins are provided for the display panel power and backlight power, and three pins are provided for audio signals. The seven video signals are provided to a first circuit 210. A contrast control 37 is coupled to the first circuit 210 to permit the user to adjust the contrast of the images displayed on the light valve display panels. In other preferred embodiments, other video controls (e.g., brightness, image alignment, color adjust, etc.) are provided and coupled to the first circuit 210. The first circuit 210 is coupled to a second circuit 220, which drives the light valve display panels via an N-conductor ribbon cable 310, where the number of conductors N is determined by the type of display panel.

The first circuit 210 also separates the backlight power signals from the light valve display panel signals and provides those signals to a backlight driver 240 over a 6-conductor ribbon cable 320. In addition to the two backlight driver signals, the 6-conductor ribbon cable 320 carries four audio signals. A left channel signal $321_L$, a common signal $321_c$, and a right channel signal $321_R$ are provided on the 6-conductor ribbon cable 320 to a stereo volume control 36. In a particular preferred embodiment, the backlight driver 240 and the stereo volume control 36 are disposed within the opposite stem 30 from the circuit 210.

The stereo volume control 36 permits the user to alter the gain of the signals in the right and left earphones 40. The adjusted right signal $321_R$ is provided to the right earphone 40R and the adjusted left channel signal $323_L$ is carried by the 6-conductor ribbon cable 320 back to the left earphone 40L. Both the left and right earphone are also provided with the common signal $321_c$. In other preferred embodiments, other audio controls (e.g., stereo balance, tone, etc.) are provided.

The second circuit 220 need not be a discrete device as illustrated. In another preferred embodiment, the second circuit 220 is fabricated with each display panel, such that each display panel is controlled by a respective control circuit.

The backlight driver 240 provides high voltage signals to the optical assembly 100 over signal lines 340. The high voltage signals can be used to drive a backlight for each display panel where a transmissive display panel is used. Similarly, the high voltage supply can be used to drive an emissive display panel. In a particular preferred embodiment of the invention, the display panels are of the active matrix liquid crystal display type, which require backlighting.

In a preferred embodiment the discrete circuiting 38, 210, 220, 240 are disposed near the rear of the head mounted display 1 to provide for more even weight distribution. A preferred control circuit for driving the active matrix display panel 13 is described in U.S. patent application Ser. No. 07/971,399, filed Nov. 4, 1992, the teachings of which are incorporated herein by reference. In another preferred embodiment, the display panels are of the passive matrix liquid crystal display type. A control circuit for driving the passive matrix display panel is described in U.S. patent application Ser. No. 07/971,326, filed Nov. 4, 1992, the teachings of which are incorporated herein by reference.

FIG. 3 is a top plan view of the head mounted display 1 taken along section line I—I of FIG. 1. The positioning of the wiring harness 300 is illustrated in phantom. Note that the ribbon cables 310, 320 are routed around the joints 31, 33 to permit folding of the stems 30 into a compact unit for storage. In a preferred embodiment, the rear hinge 33 employs a split cylinder that rotates independent of the joint so the ribbon cable is not visible when the stems are opened or folded.

Figure 4:
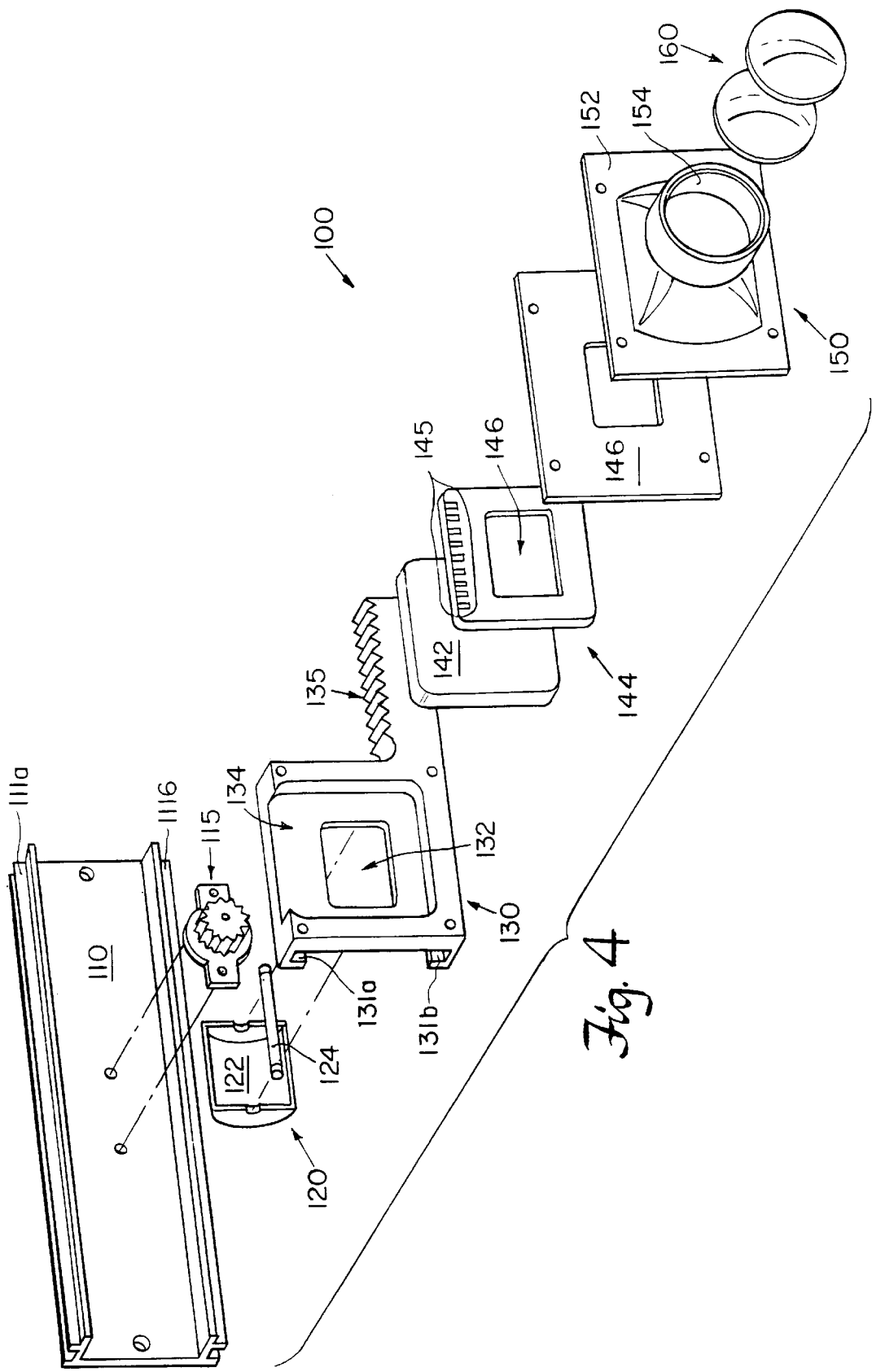
FIG. 4 is an exploded view of an optical assembly for use in a transmissive display system.

FIG. 4 is an exploded view of the optical assembly for the head mounted display 1. A mounting frame 110 is adapted to be mounted to the inner surface of the front section 10 of the head mounted display 1. The mounting frame 110 has first and second guide rails 111a, 111b to permit adjustment of the inter-pupil displacement of the light valve display panels. The adjustment of the inter-pupil displacement will be discussed in more detail below.

Mounted to the mounting frame is a backlighting assembly 120 for use in transmissive display systems. The backlighting assembly 120 contains a backlight 124, which is preferably a cold cathode backlight. The backlight 124 is disposed in a white reflector 122, which reflects light from the backlight 124 onto the display panel. In a transmissive color display, the backlighting can be provided by a multi-color sequential backlight where there is a backlight for each primary display color (e.g., red, green, blue) and the backlights are sequentially lit in timing with the switching of the light valve. In another preferred embodiment backlight is provided by direct ambient light 99. Through a light transmissive front housing section 10 and mounting frame 110.

A display holder 130 is positioned on the mounting frame 110 such that the mounting frame rails 111a, 111b are disposed within respective display holder channels 131a, 131b. The display holder 130 contains a display area 134 and an aperture 132 through which light from the backlight 124 passes. The display holder 130 also has a geared rack 135 for use in adjusting the inter-pupil displacement. A viscous damped gear assembly 115 meshes with the geared rack 135 such that rotational motion of the gear assembly 115 causes linear movement of the display holder 130 along the mounting frame 110. As illustrated, the user adjusts the inter-pupil displacement by sliding the left and right display holders 130 along the mounting frame 110. Alternatively, an axle can extend from the gate 115 to a knob or crank lever, preferably disposed on the forward face of the front section 10 of the display body 12. Indicator marking can also be provided to guide the user.

Although only the left portion of the optical assembly 100 is illustrated in FIG. 3, the right display holder is similar to the left display holder, except that the right display holder is rotated 180° relative to the left display holder. In that alignment, the left display holder gear rack 135L is positioned below the gear assembly 115 and the right display holder gear rack 135R is positioned above the gear assembly 115 as illustrated in FIG. 2. Consequently, the gear assembly simultaneously displaces both the left and right display holders when rotated. In a preferred embodiment of the invention, the inter-pupil displacement is adjustable by the user in a range from about 55 mm to 72 mm to provide an aligned left-right image to the user.

Returning to the optics assembly, a display assembly 140 is registered to the display chamber 134. The display assembly contains a translucent plastic light diffuser 142, a liquid crystal display panel 144, and a thin plastic matte black mask 146. The diffuser 142 diffuses light from the backlight 124 that passes through the display holder aperture 132 to provide a light distribution that is sufficiently uniform across the display area 146. The liquid crystal display panel 144 has a display area that is 0.7 inch as measured diagonally. The liquid crystal display panel 144 is preferably fabricated in accordance with U.S. patent Ser. No. 07/815,684, filed Dec. 31, 1991, the teachings of which are incorporated herein by reference. The display panel 144 contains connectors to connect to the 20-conductor ribbon cable 310 (FIG. 2). The display assembly 140 is secured in the display holder chamber 134 by an optics holder 150, which is fastened to the display holder 130. The optics holder 150 contains a housing 152 that may be conformable to the users eye to block ambient light and surround a cover glass 154.

Optional lenses 160 are adaptable to the display holder 150 to, for example, correct the user's near vision.

Figure 5:
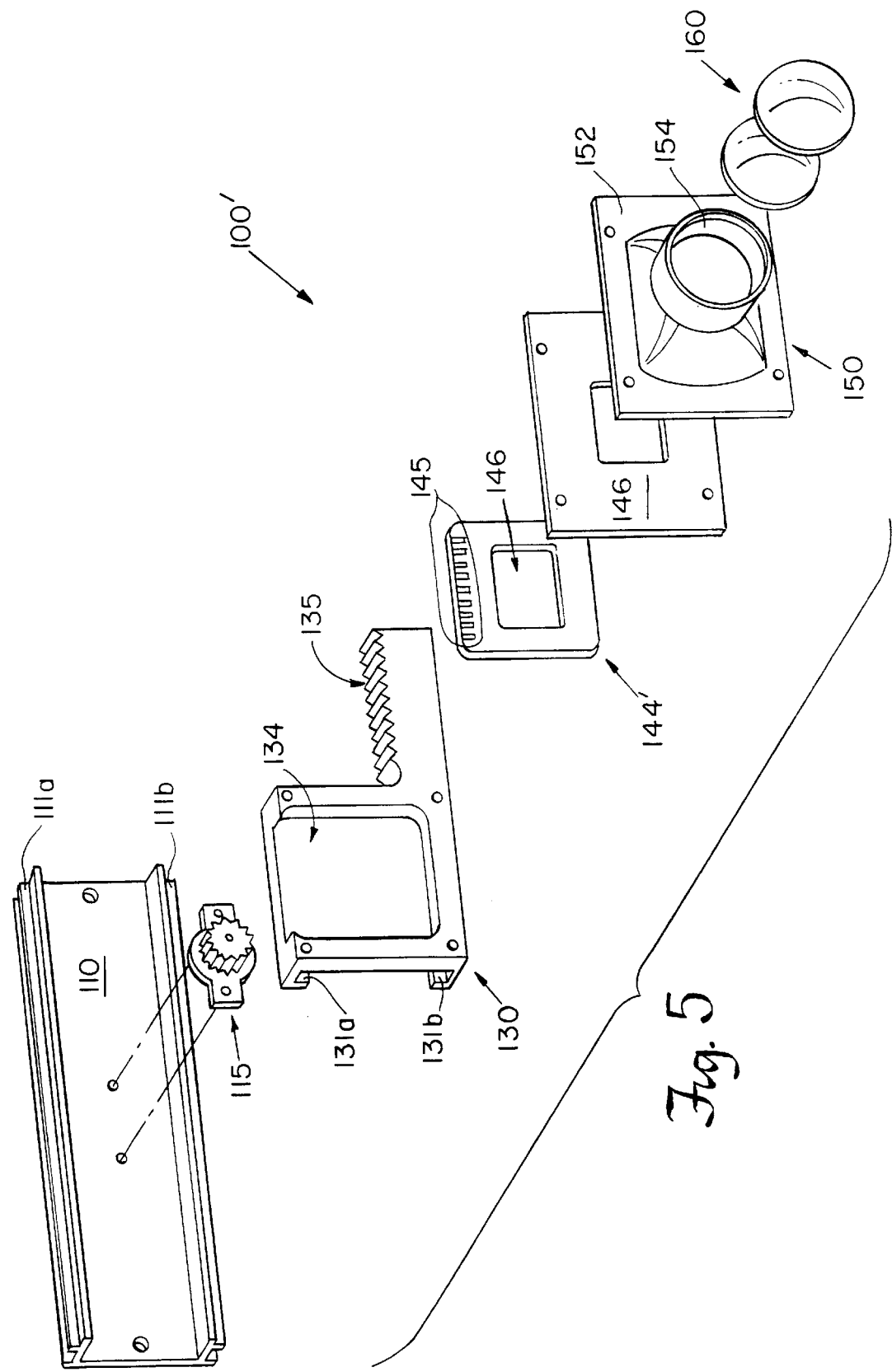
FIG. 5 is an exploded view of a preferred embodiment of an optical assembly for use in an emissive display system.

Although FIG. 4 illustrates a preferred embodiment employing a transmissive display panel, an optical assembly 100' can be adapted to receive an emissive display panel 144', as illustrated in FIG. 5. The emissive display optical assembly 100' differs from the transmissive display optical assembly 100 in the following respects. The emissive embodiment does not use a backlight 120. Thus the display holder 130 does not require an aperture 132 or a light diffuser 142. Instead, the light is provided by emissive material on the display panel 144 that is activated by drive signals. The emissive display panel is preferably fabricated in accordance with U.S. patent application Ser. No. 07/643,552, the teachings of which are incorporated herein by reference.

FIG. 6 is a top plan view of the head mounted display 1 in the folded configuration. In particular, note that the nose bridge assembly 24 has been positioned into the retracted position for storage. In the retracted position, the nose bridge assembly 24 does not interfere with the folding of the stems 30. The hinge points 39 on the forward joints 31 are spring tensioned to facilitate head rotation.

FIG. 7 is an exploded view of a preferred spring cam assembly, 390R that is used at the hinge port 39R on the right forward joints 31R. The cam assembly 390R comprises a first cam 391R and a mirror image second cam 392R. The cams 391R, 392R contain an outer section 391R*a*, 392R*a* that registers to a respective receptacle on the body 12 and an inner section 391R*b*, 392R*b* that registers to a respective receptacle on the forward stem 32R. the inner cams 391R*b*, 392R*b* each include a landing 393 that allows for free play before engagement. A compression spring 395 is disposed between spring landings. The cams 391R, 392R compress the spring 395 when rotated together. For the right stem 30R, free play is exhibited for an angular displacement from the folded position, thereafter a variable return force is extended by the spring 395, which tends to secure the head mounted display 1 to the user's head. The compression can be adjusted by an adjustment bolt 396 that meshes with a threaded opening on the outer sections 391*a*, 392*b*.

FIGS. 8A–8B are partial views of another preferred stem storage embodiment. The forward stem section 32 is a skeleton frame on which the rear stem section 34 slides for storage. (FIG. 8B) Alternatively, the forward stem section 32' can encapsulate the rear stem section 34' when stored.

Other preferred embodiments employ other devices to secure the head mounted display, to the user's head. Such devices include an inflatable bladder 51 (shown in phantom in FIG. 1), with an associated pump assembly, that is disposed over the user's temple, and a headband 52, and ear loops 53.

In a preferred embodiment, the head mounted display 1 is formed from injection molded plastic. Particular components, such as the nose bridge support member 15, are rigid glass filtered molded plastic or a composite laminate.

FIG. 9 is a front perspective view of another preferred embodiment of a heat mounted display unit 1'. The head mounted display unit 1' comprises a visor 50 and a headband 60 coupled together by a pair of pivot assemblies 70*a*,70*b*. The right side pivot assembly 70*a* is a mirror image of the left side pivot assembly 70*b*. The pivot assemblies 70*a*,70*b* are adjustable and flex such that the head mounted display unit 1' can be secured to a user's head. The display unit 1' also includes a right speaker assembly 80*a* and a left speaker assembly 80*b* that can be positioned over the user's ears. Each of these components will be discussed below in further detail.

The visor 50 includes a face plate 52 having a right side 52*a* and left side 52*b*. In a preferred embodiment, transmissive display panels use a dedicated backlight as illustrated in FIG. 4. In another preferred embodiment, emissive display panels are used in the visor 50. The visor further includes a back section 54, which will be discussed in further detail below.

Figure 10:
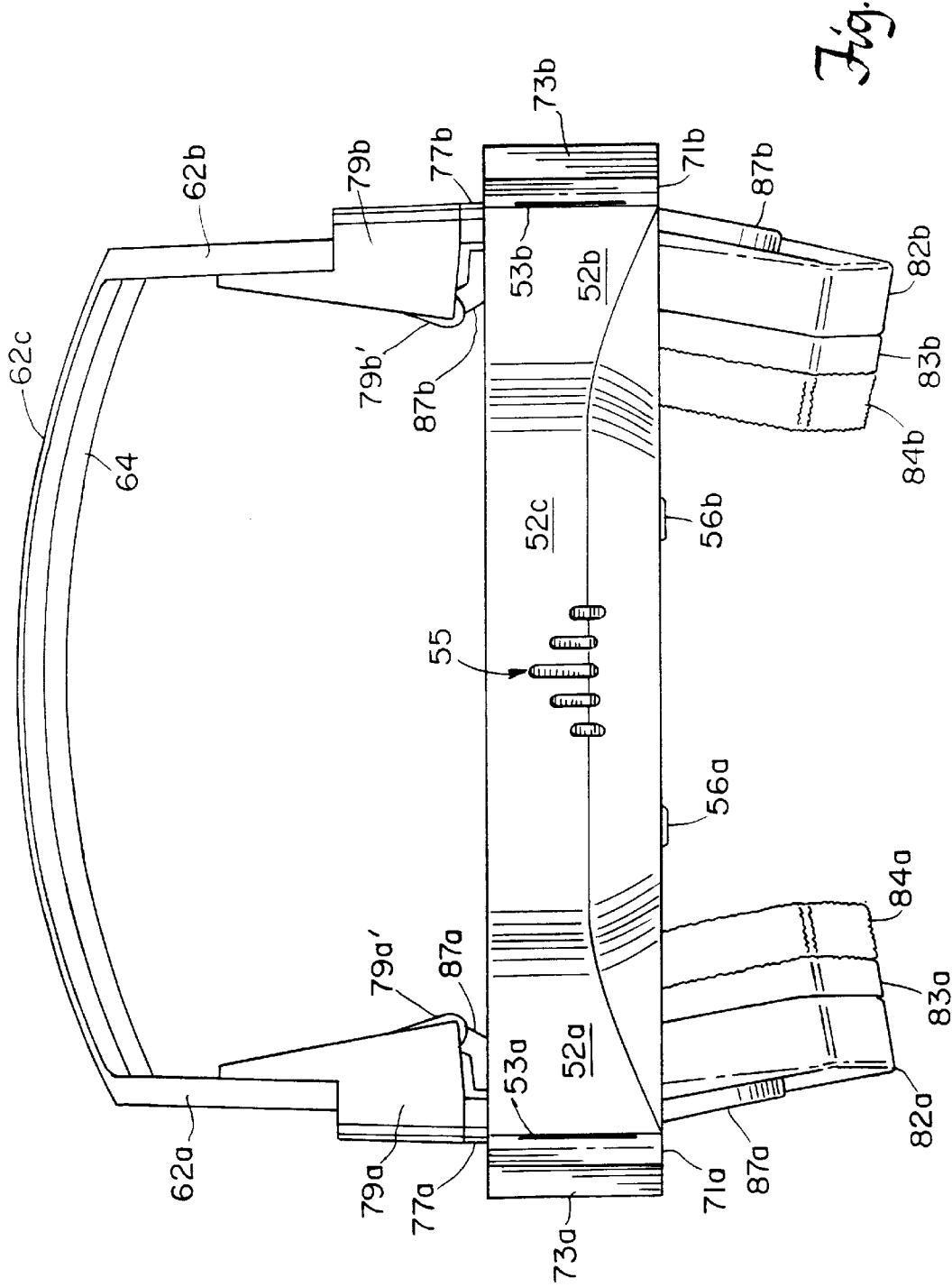
FIG. 10 is a front view of an alternative embodiment of the invention.

The visor is connected to the right pivot assembly 70*a* by a right visor hinge 53*a* and to the left pivot assembly 70*b* by a left visor hinge 53*b* (FIG. 10). The visor hinges 53*a*,53*b* allow the respective pivot assembly 70*a*,70*b* to flex laterally relative to the line of sight of the user. This flexion, for example, permits the user to separate the distance between the speaker assemblies 80*a*,80*b* so as to fit the display unit 1' over the user's head.

The pivot assemblies 70*a*,70*b* each contain components to displace the visor 50 from the earphones 80*a*,80*b* longitudinally relative to the user's line of sight. This permits the user to properly adjust the visor for a snug fit. More particularly, longitudinal motion is accomplished by cooperation between a front hinge 71 and a center pivot 75. The front hinge 71 is mated to a respective visor hinge 53 by a pin 71'. The front hinge includes a rail section 72 and the center pivot 75 includes a rail section 74. A center coupler 73 permits the rails 72,74 to slide relative to one another. As illustrated in FIG. 9, the display unit 1' is shown fully extended in the longitudinal direction. Within the center coupler 73 is a wheel 76 to facilitate relative motion between the opposed rails 72,74.

The headband 60 is preferably formed of rigid plastic and includes a headpiece 62 having a right side 62a and a left side 62b. In each side of the headpiece 62, are a series of spaced detents 68 to couple to a respective pivot assembly 70a,70b. Optionally, the headband 60 can include a pad 64, preferably made of a pliable rubber foam to provide a comfortable fit over the user's head.

The pivot assemblies 70a,70b cooperate to permit the headband 62 to rotate about the center pivots 75a,75b. In a preferred embodiment of the invention, the headband 60 pivots 360° traverse to the plane of the user's line of sight. As illustrated, the headband 60 is positioned at 90°.

A lateral pivot joint 77 is coupled to the respective pivot joint 75 such that when the headband 60 is positioned at the 90° position, a pivot point (not shown) is positioned parallel to the visor hinges 53 such that the speaker assemblies 80a,80b can flex laterally. A supporting member 79 is coupled to the lateral hinge 77 via the pivot. The supporting element 79 includes a rail 78, which is mated to the series of detents 68 by a catch 79. The headband 60 can be fixed to positions defined by the detent 68 by moving the headpiece 62 along the rails 78.

The speaker assemblies 80 are also coupled to the respective pivot assemblies 70a,70b. A lobe member 87 is coupled to the supporting element 79 of the pivot assembly 70 by a hinge 79'. Each headphone 80 includes a mounting frame 82 which is connected to the lobe member 87. A speaker component 83 is fixed to the speaker frame 82. A foam pad 84 rests against the user's ear such that the user hears sound from the speaker component 83 through an aperture 85 in the foam padding 84.

FIG. 10 is a front view of the head mounted display unit 1' of FIG. 9. The front view more clearly illustrates the capability of swiveling the earpiece 80a,80b about the respective pivot points 79a',79b'. Also illustrated are slide tabs 56a,56b for aligning the display panels (not shown) within the visor 50. More particularly, the slide tabs 56 permit adjustment of the inter-pupillary displacement of the display panels. Furthermore, the slide tabs 56 preferably operate independently of each other such that each display panel can be positioned relative to the respective eye to compensate for off-center vision.

Figure 11:
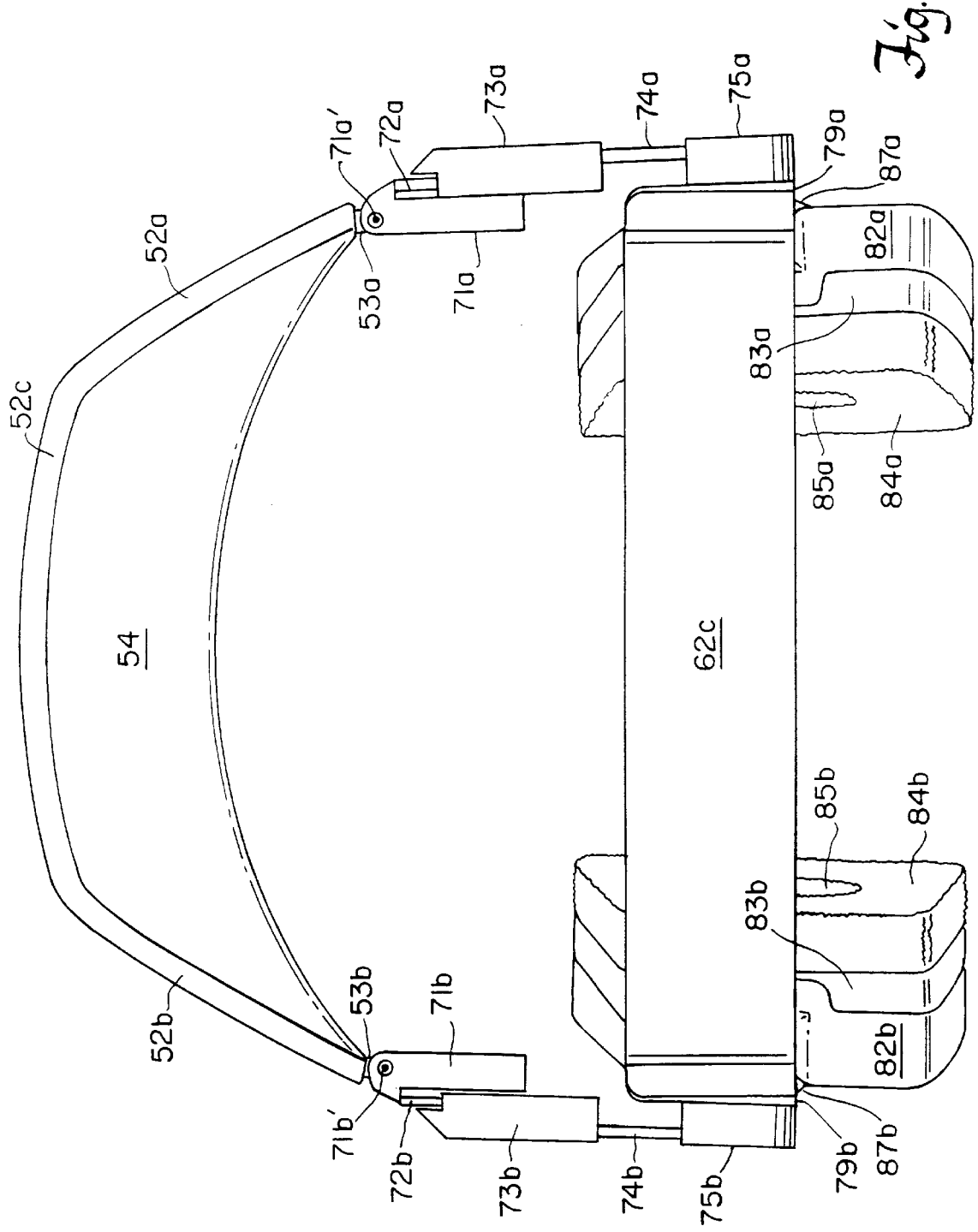
FIG. 11 is a top view of an alternative embodiment of the invention.

FIG. 11 is a top view of the head mounted display unit 1' of FIG. 9. In particular, the lateral motion about hinge pairs 53–71 and 77–79 are illustrated.

Figure 12:
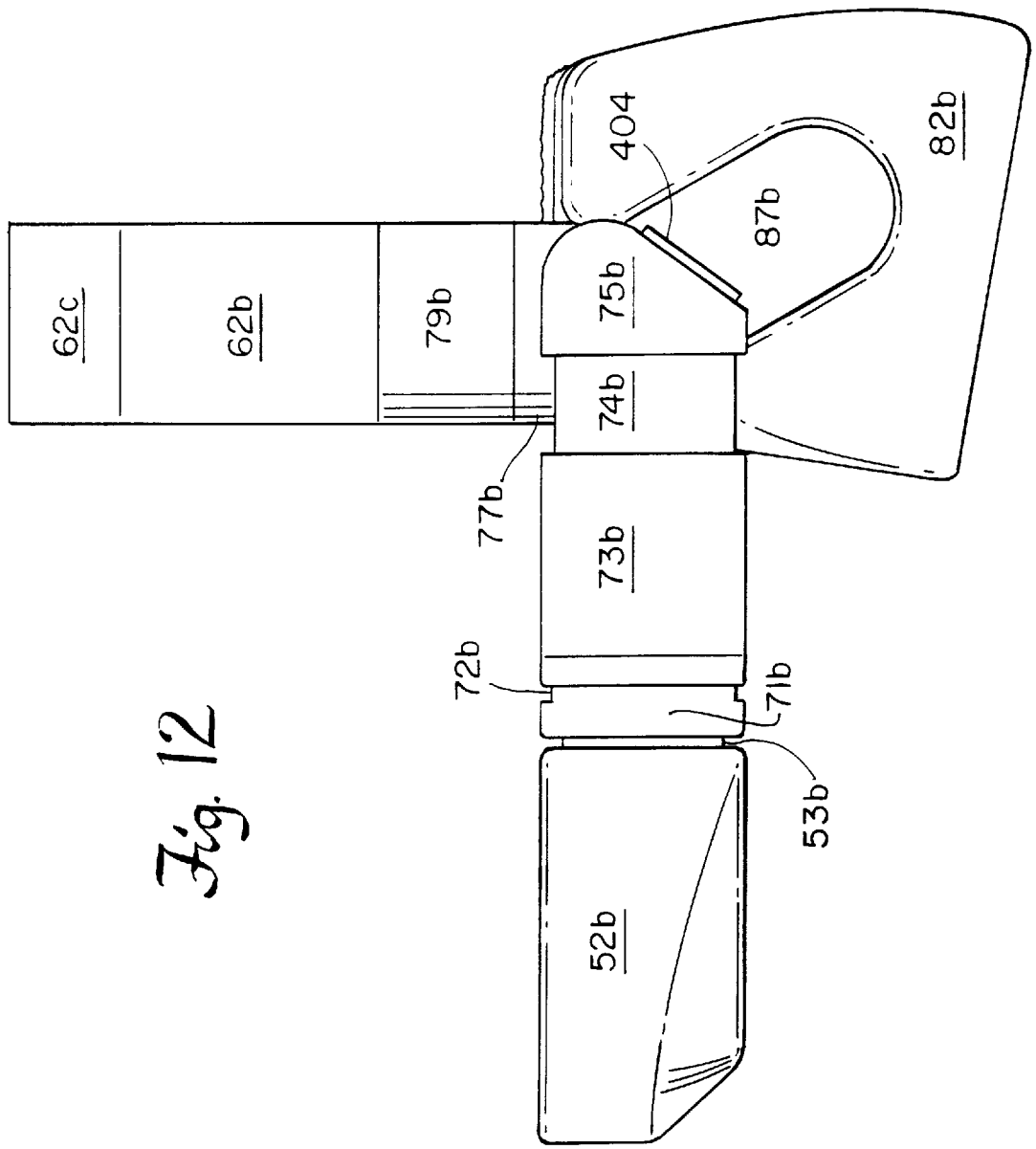
FIG. 12 is a side view of an alternative embodiment of the invention.

FIG. 12 is a left side view of the head mounted display device 1' of FIG. 9. As illustrated, the headpiece 62 is fully retracted. In addition, the visor 50 is partially retracted. A pin connector 404 is mounted in element 75b to provide video and audio connections to the device. Alternatively, two pin connectors can be used, one on 75b, the second on 75a.

Figure 13:
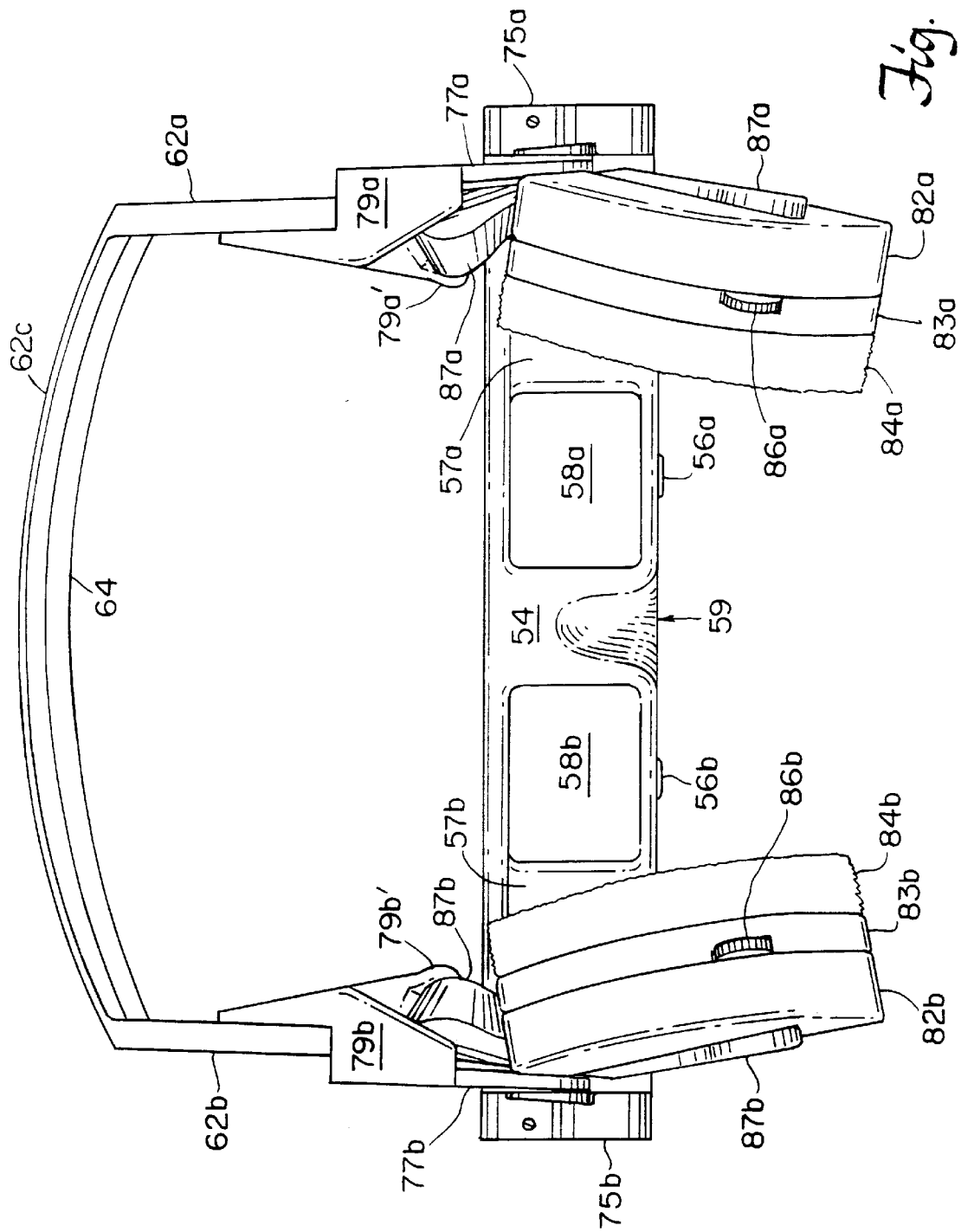
FIG. 13 is a back view of an alternative embodiment of the invention.

FIG. 13 is a rear view of the head mounted display device 1' of FIG. 1. Illustrated are ball joints 75a',75b' of the respective center pivot 75a,75b. As illustrated, each back section 54 of the visor 50 includes a right viewer 58a and a left viewer 58b. Each viewer permits the user to view images formed on respective display panels (not shown) disposed within the visor 50. Preferably, the viewers 58a, 58b are positioned within respective recessed cavities 57a,57b of the back section 54 of the visor 50. The recessed cavities 57a,57b make the display device 1' eyeglasses compatible. Also illustrated is a nose bridge 59, which is preferably molded into the back section 54. Also shown in the figure are control knobs 86a,86b protruding through the respective speaker assemblies 80a,80b. In a particular preferred embodiment, the right control knob 86a controls contrast on the display panels and the left control knob 86b controls speaker volume.

Figure 14:
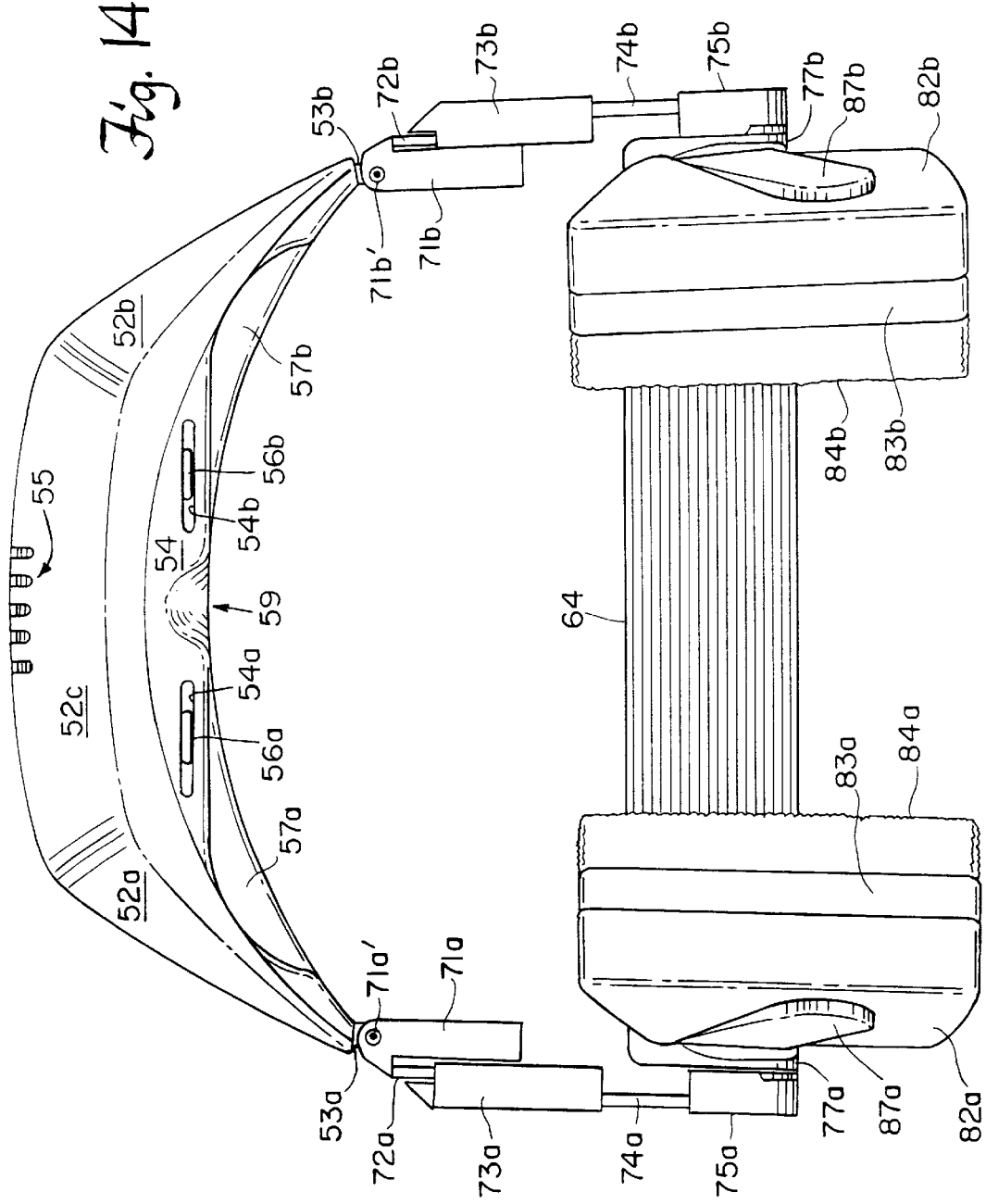
FIG. 14 is a bottom view of an alternative embodiment of the invention.

FIG. 14 is a bottom view of the head mounted display unit 1' of FIG. 9. More clearly illustrated are the recessed cavities 57a,57b of the back section 54 of the visor 50. Furthermore, the configuration of the slide tabs 56a,56b in a respective slide channel 54a,54b of the back section 54 is illustrated. Furthermore, the head pad 64 is illustrated as having longitudinal ribs to help maintain the headpiece 64 in place. The hinge between 52a and 71a, and the second hinge between 52b and 71b can be "hidden" as shown in FIG. 14.

Between the closed position and the 90° position there can be a discrete number of a detent for positioning the headband 60. In a particular preferred embodiment, a detent is provided at the 45° position. Alternatively, a friction bearing surface can be used to rotate the visor relative to the headband to hold the visor in a partially raised position.

Figure 15:
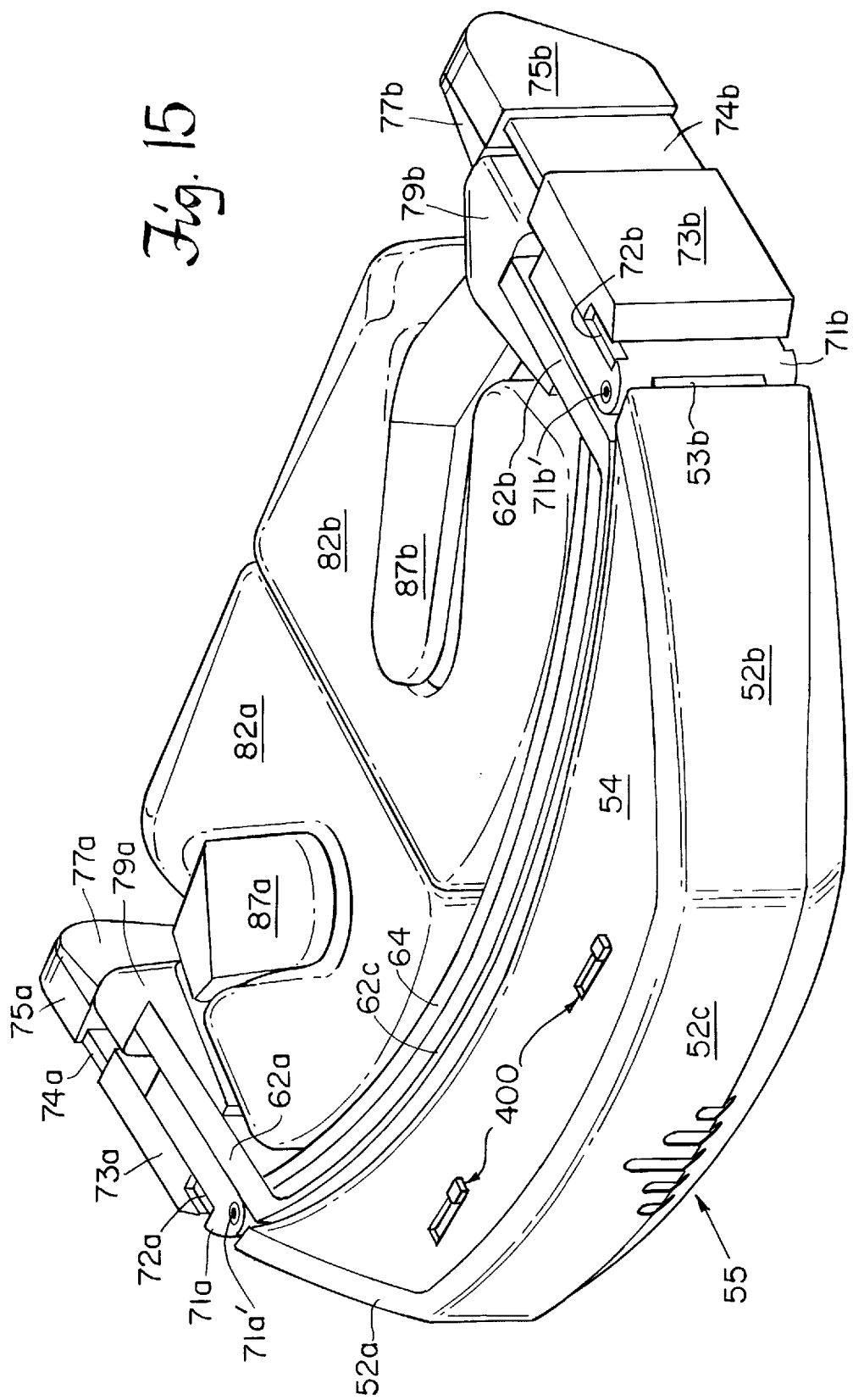
FIG. 15 is a top perspective view of the alternative embodiment in a closed position.
Figure 16:
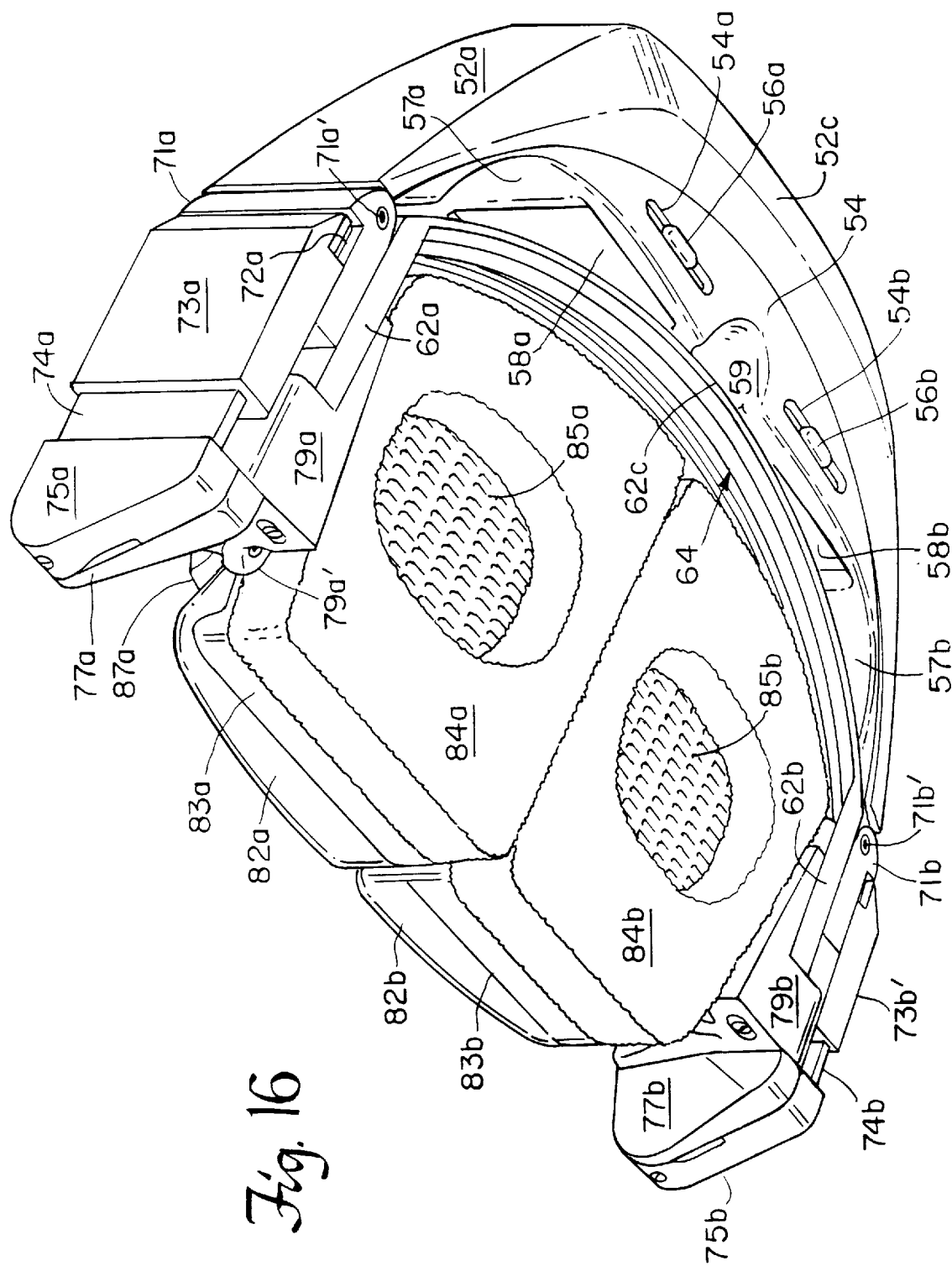
FIG. 16 is a bottom perspective view of the closed position.

FIG. 15 is a front perspective view of the head mounted display device 1' of FIG. 9 in a folded position. FIG. 16 is a bottom perspective view of the display unit 1' of FIG. 15. The unique and novel pivot assemblies 70a,70b cooperate to allow the display unit 1' to be folded into a compact package. The headpiece 60 is rotated about the center pivots 75a,75b to the 0° position. The earpiece 80a,80b are then folded behind the headpiece 60, where the earpiece 80a,80b lie flat. In a particular preferred embodiment, the supporting elements 79a,79b contain a spring-loaded pin 79a',79b' to aid the folding of the earpiece 80a,80b. The pins 79a',79b' can be similar to the cam assembly of FIG. 7. The visor is then retracted toward the center pivots 75a,75b until the display unit 1' is securely packed. From this folded position, the head mounted display unit 1' can be easily packed, carried or otherwise transported. FIG. 15 also shows manual focus adjust elements 400 located on the top of the visor which are described in greater detail below.

FIGS. 17A–17B are detailed views of the light pivot assembly 70a. As illustrated, the rails 72a,74a lie in tracks 73a',73a" of a respective center coupler 73a. A wheel 76a having a pin 76a' through its central axis and fixed at one end to the center coupler 73 is disposed between the opposing rails 72a,74a. Each opposing rail 72a,74a has a respective slot 72a',74a' through which the wheel pin 76a' extends. The wheel 76a is held between slots and contains cable guides as described below. Also illustrated is a connector 89a on the lobe member 87a for connecting the speaker assembly 80a to the assembly. The connector 89a is an electrical connector carrying audio signals.

The wiring of the device is as follows: The signals and power enter through the back of 75b via a connector. The audio portion then passes through to the earcups with one extending through the headband. The video goes forward through the temple slides via the "spool" or wheel 76a. The pin 76a' is the center axle that allows it to rotate in the hole in 73. The pin 76a' is secured to the wheel 76a. FIG. 18A shows pin 76a". The wheel has two of these, on opposite sides, 180° apart. These are what ride in the slots 72a" and 74a" (shown in FIG. 18A). The wheel circumference is not in contact with the rails. As shown in the detailed view of FIG. 18A which shows the wheel 76a held between slots 72a'.

FIG. 18B shows the wheel 76a is also a spool. It serves to control the cable length as the rails are moved fore and aft. The spool 76a is designed to be an assembly using two identical pieces 450, 452. The kidney shapes act as cable guides 454, 456 which control the motion of conductor cable 458 as the rails are moved.

Figure 19:
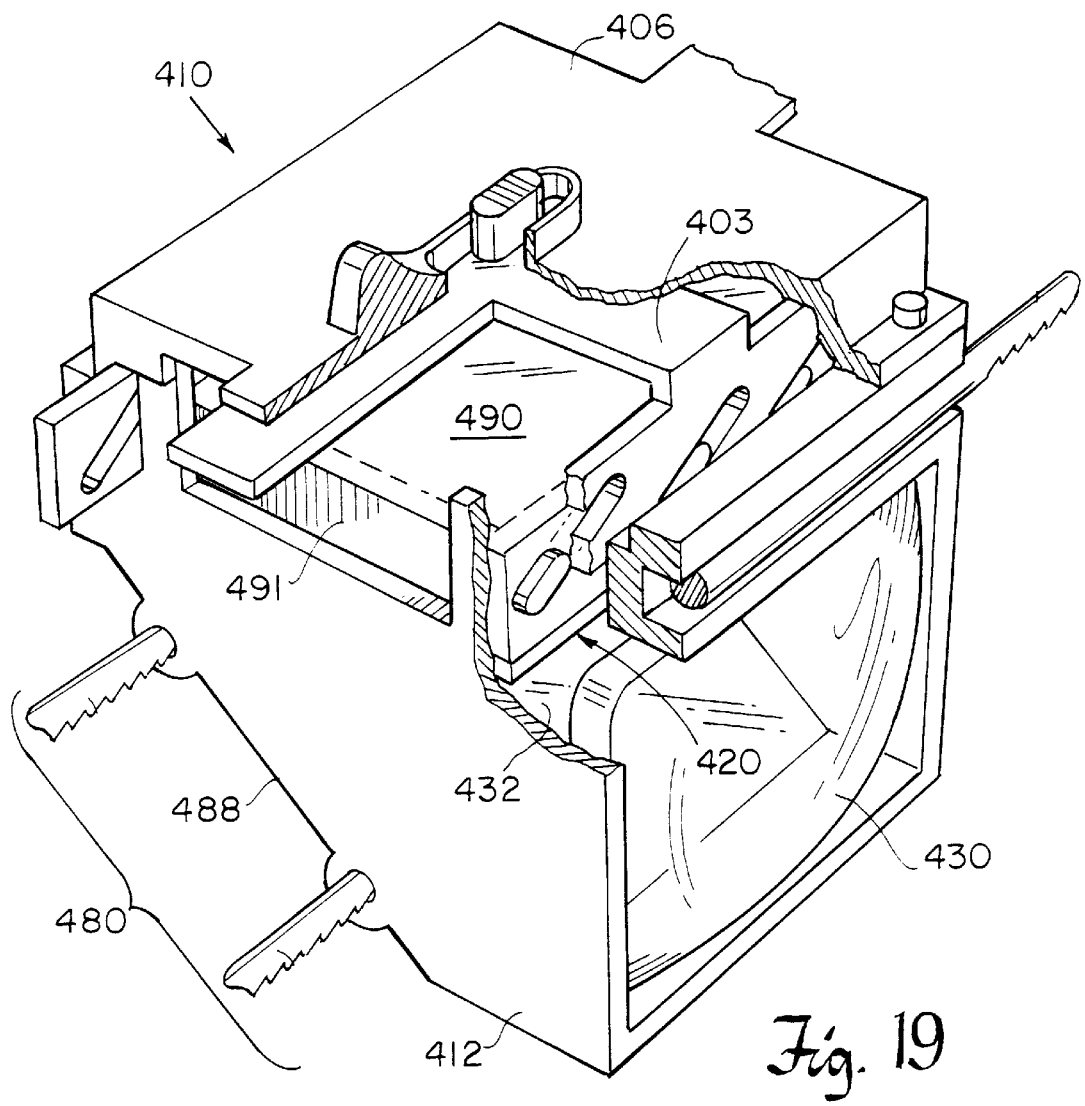
FIG. 19 is a perspective view of an optical module.

FIG. 19 shows the optics module sub-assembly. Two of these modules 410 are mounted to a triangulated rail system 480 and comprises an optics assembly.

Figure 21:
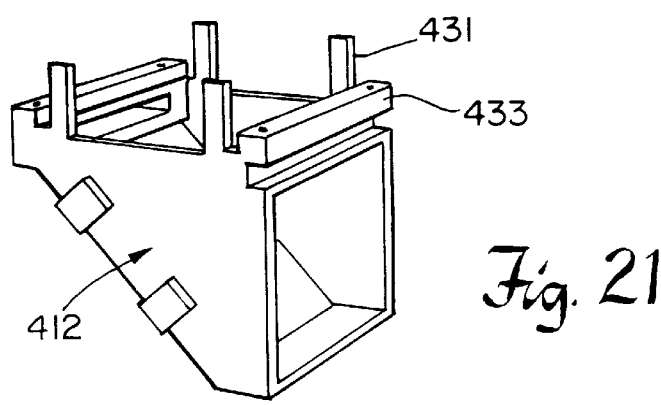
FIG. 21 is a perspective view of the optics housing.
Figure 23:
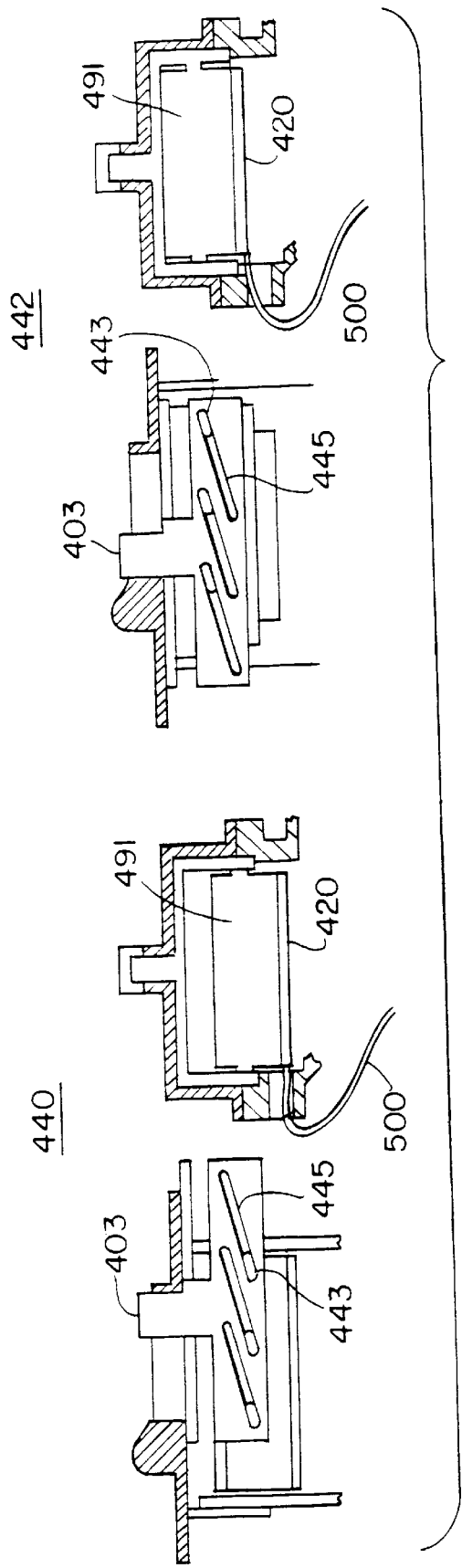
FIG. 23 illustrates the full down and full up position of the focus adjusting system.

Each optics module consists of the following: A display 420; a backlight 490; a lens 430; a mirror 432; an optic housing 412*a*; a focus adjust slide 403; a IPD adjust/cover 406; and a rail slide 488. As shown in FIG. 20 the two modules 410, 415 are mounted on rail system 480. FIG. 21 is a perspective view of an optics module housing 412. The housing 412 has a rim 433 that is used to secure the IPD adjustment system and surrounds one of rails 480. The housing 412 also has legs 431 used to position the ramp and IPD adjustment components. FIG. 22 is a side cross sectional view of the optical system with lens 430, mirror 432, the backlight 490 and display 420. Focus is accomplished with a sliding ramp system, shown in FIGS. 23 and 24, which are incorporated into the focus adjust slide 403 and the backlight housing 491. Tabs 443 protruding from the backlight housing are engaged in slots 445 incorporated in the focus slide 403. As the focus slide button 407 is moved horizontally, the backlight housing (along with the attached display) move vertically. As shown in FIG. 23 with the focus adjust in the full down position 44, the tabs 443 on housing 491 are int he lowest position. In the full up position 442, the tabs 443 are in the highest position. Multiple tabs 443 ensure positive alignment throughout the motion range. The vertical legs 431 extending from the optic housing keep the backlight/display assembly centered horizontally left to right as well as acting as vertical slide surfaces. The button 407 serves as the top of the assembly capturing the top on the focus slide.

FIG. 25 shows the display placed at the focal length of the lens, thus producing an image of the display at an apparent distance of infinity to the viewer. The lens has a small focal length, preferable about 1 inch. The flat optical element is present to correct for lateral color separation in the lens. This element consists of a diffractive optic 434 designed to compensate for the lateral color in the lens. The mirror serves to fold the optical path to minimize the depth of the head mounted device while extending its height. the mirror is optional to the system and is present for desired form factor. Two such setups make up on binocular head mounted display system: one for each eye. The distance that the displays appear to the viewer can be adjusted for personal comfort, generally between 15 feet and infinity. The magnification of the system is about 10. Other lens systems can be used and are available from Kaiser Electro-Optics, Inc. of Carlsbad, Calif. Such a system is described in U.S. Pat. No. 4,859,031, the contents of which are incorporated herein by reference. Such a system 500 is shown in FIG. 26. The display system 500 includes an active matrix display 502, a polarizing filter 504, a semi-reflective concave mirror 506, and a cholesteric liquid crystal element 508. The image that is generated by the display 502 is transmitted through the filter 504, the filter 504 the semi-reflective concave mirror 506 to the element 508. The element 508 reflects the image back onto mirror 506 which rotates the light so that, upon reflection back to element 508, it is transmitted through element 508 to the viewer's eye 509. A lens can be used with this system depending upon the size, resolution, and distance to the viewer's eye of the optical system components and the particular application.

One interface device used in conjunction with the various embodiments of the invention is a collapsible keyboard. Preferred embodiments used in conjunction with the display systems described herein are illustrated in connection with FIGS. 27–30. The term collapsible keyboard, used in connection with the present application, means a keyboard have a plurality of sections which move relative to each other to assume a more compact position for storage or transport in which each section has a plurality of keys activated by a user's fingers. A "standard" keyboard means a keyboard having at lest three rows of keys for the alphabet, and can also include a fourth row for the numbers 0–9, a fifth row for a space bar, a sixth row for dedicated function keys, a laterally positioned calculator keyboard, and four cursor movement keys.

Figure 28:
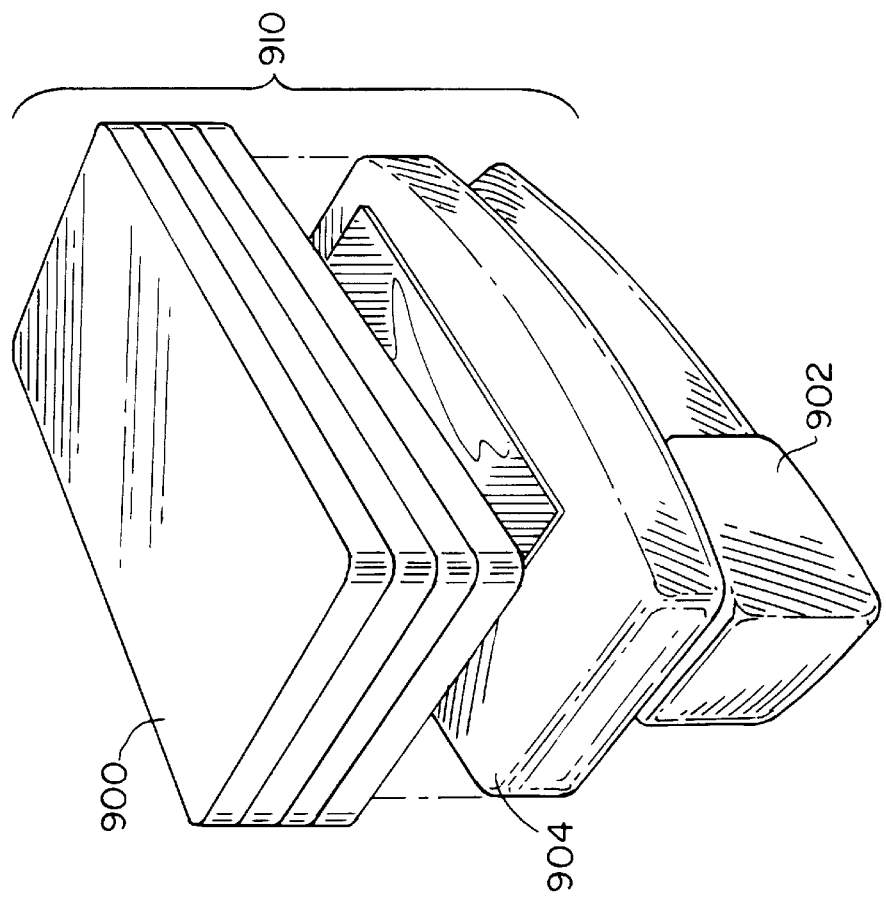
FIG. 28 is a perspective view of a collapsed keyboard and head mounted display device.
Figure 27:
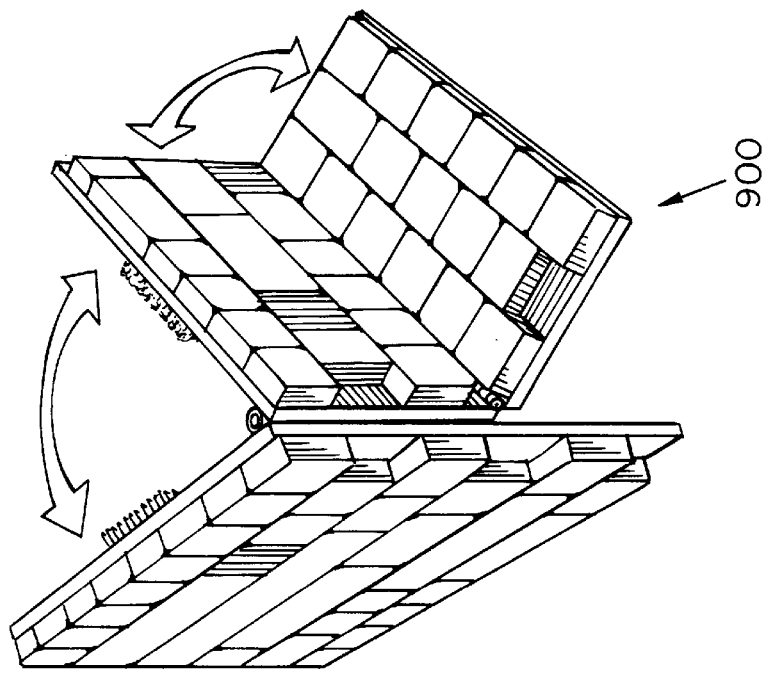
FIG. 27 is a perspective view of a collapsible keyboard in accordance with the invention.

As shown in FIG. 27 a keyboard 900 with a standard key configuration can be collapsed and connected, as shown in FIG. 28, with a head mounted display 902 to form a portable computer system 910. As described in the various distinct embodiments herein, the central programming unit, the memory and various parts can be included with the portable keyboard, or alternatively with the headpiece.

In FIGS. 29A and 29B, another preferred embodiment utilizing a collapsible keyboard 922 with hinged elements 922*a*, 922*b*, can be connected to head mounted monocular display 924 to provide portable computer system 920.

Figure 30A:
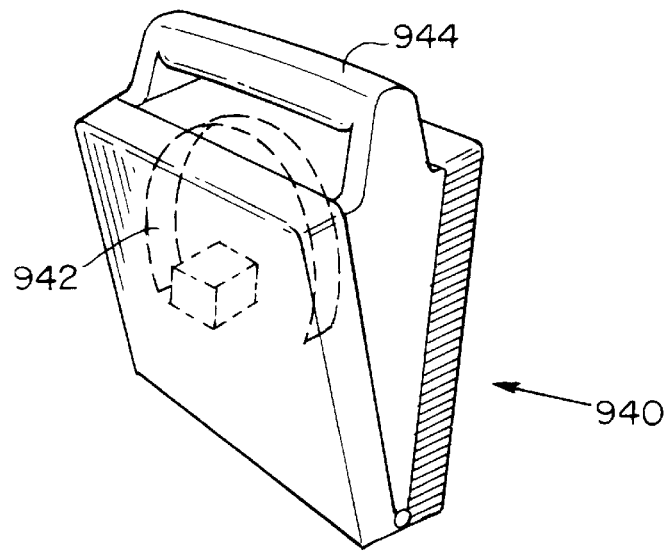
FIGS. 30A–30C illustrate another preferred embodiment of a collapsible keyboard and head mounted display system in accordance with the invention.
Figure 30B:
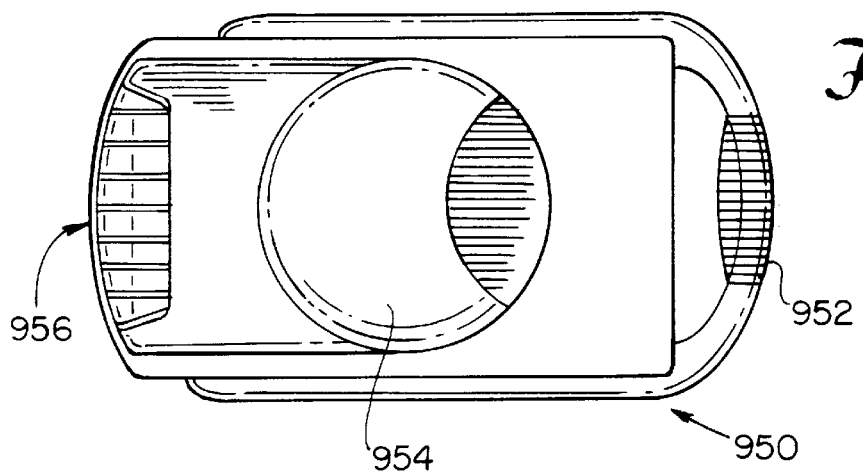
Figure 30C:
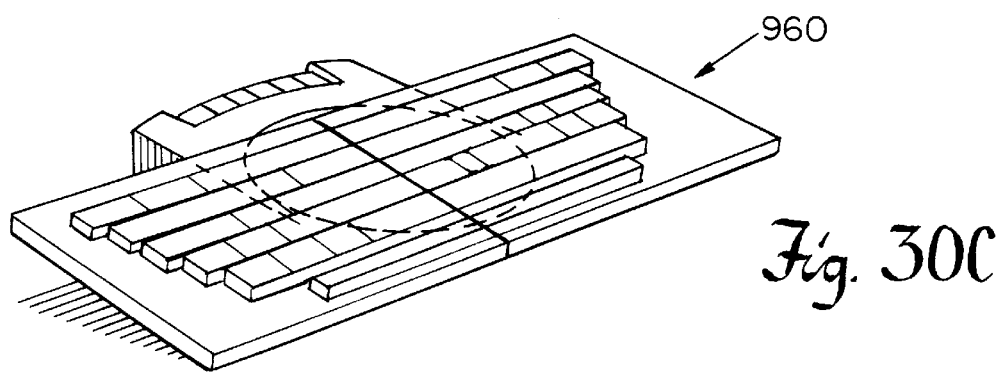

FIGS. 30A–30C illustrate another portable computer system mountable within portable case 940 with handle 944. A head mounted monocular display 942 can be stored in case 940 which can have a CD-ROM drive 954.

Figure 31A:
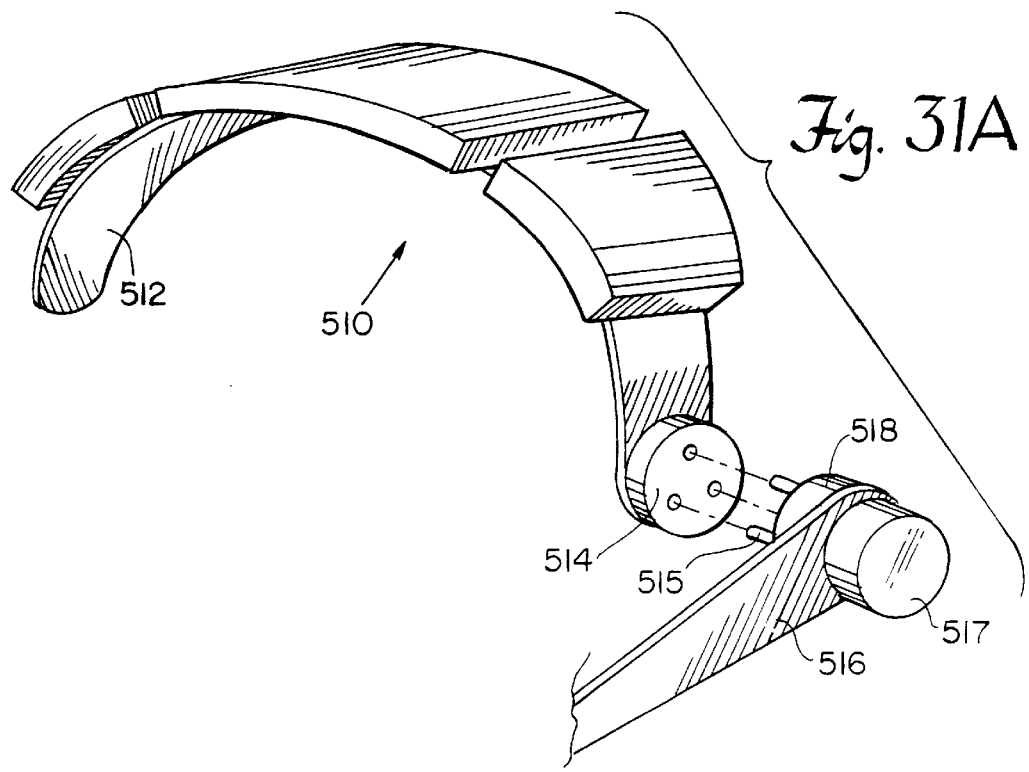
FIG. 31A is a perspective view of a head-mounted computer with a motorized display arm shown detached.

FIG. 31A is a perspective view of a head-mounted computer 510 with a motorized display arm 516 shown detached. The head-mounted computer 510 includes a head band 512 with an electrical socket 514. An arm assembly includes a video display panel at the distal end, which provide a video image to a wearer.

The arm assembly includes an electrical plug 515 mated to couple with the socket 514. Preferably, there is one socket 514 on each side of the head band 512. The two sockets 514 are bilaterally symmetrical so the arm assembly plug 515 can be coupled to either socket 514 to facilitate use of the display as either a left or right monocular piece. The coupling provides video signals from the computer to the display panel.

The arm 516 is operated by a motor 518 which turns a torque ring 517. By turning the torque ring 517, the motor 518 can move the display panel vertically within the wearer's field of view.

Figure 31B:
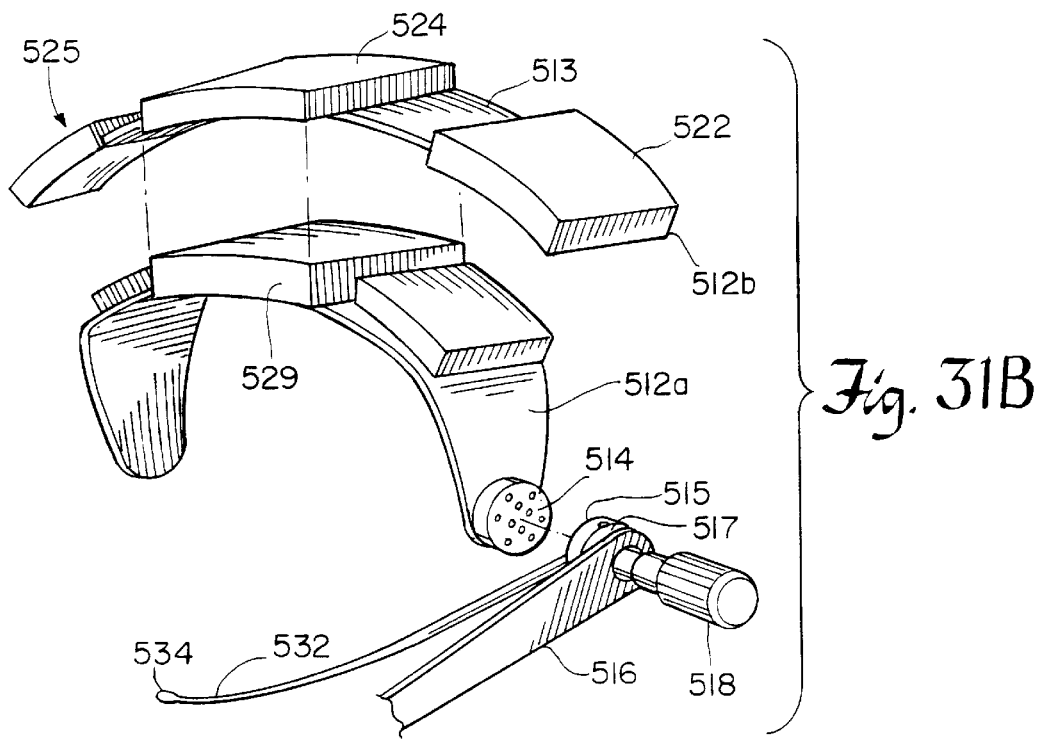
FIG. 31B is an exploded perspective view of the head-mounted computer of FIG. 31A.

FIG. 31B is an exploded perspective view of the head-mounted computer 10 of FIG. 31A. The head band 512 includes a base assembly 512*a* and a computing assembly 512*b*. The computing assembly 512*b* includes a CPU and video board module 522, a disk drive module 524 and at least one expansion module 525. The modules 522, 524, 525 communicate with the CPU over a flexible bus 523. The base assembly 512*a* includes a battery module 529, which supplies dc power to the computer modules 522, 524, 525. Although only one expansion module 525 is illustrated, it should be understood that multiple expansion modules can be added to the flexible bus 523.

Figure 32A:
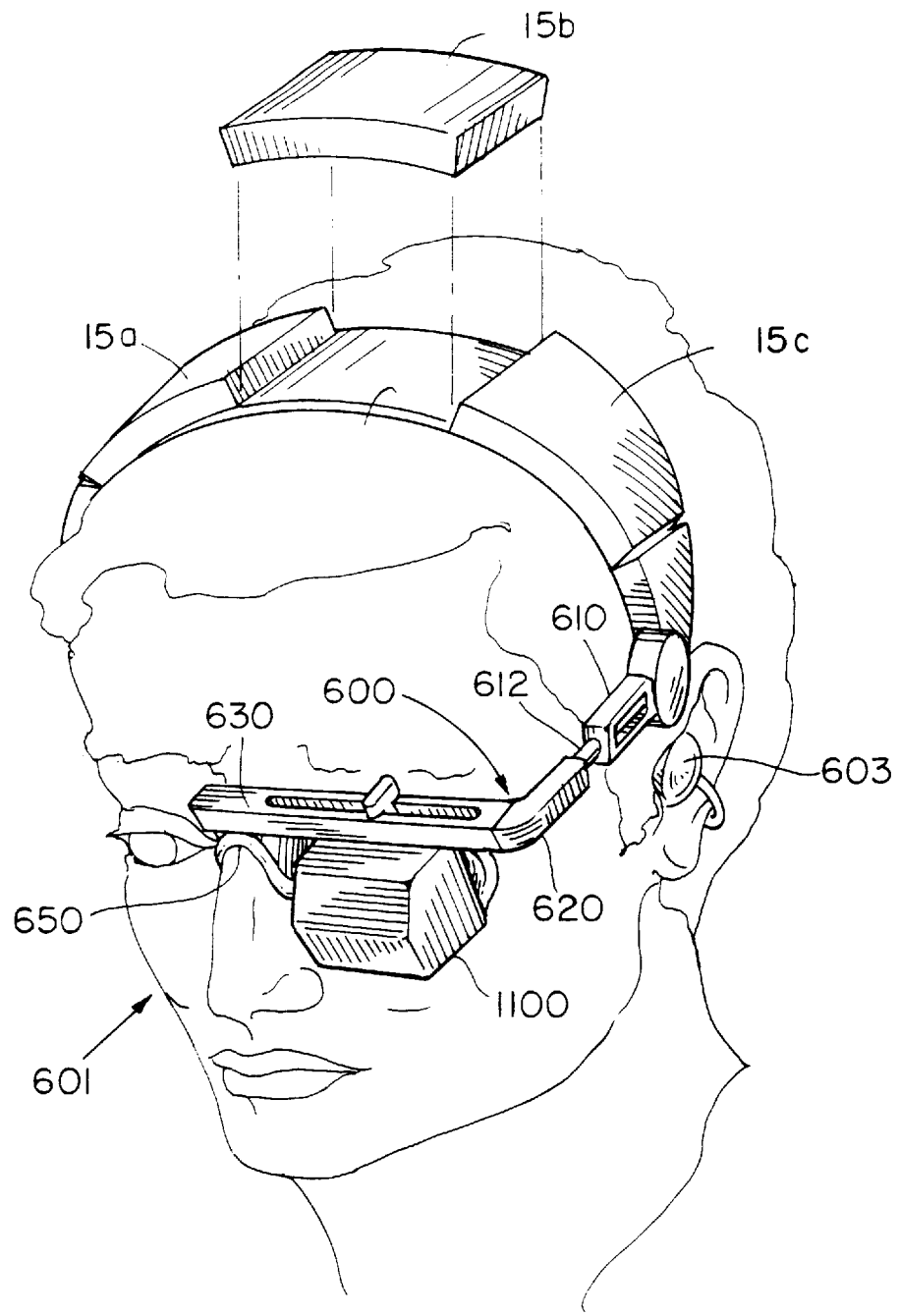
FIG. 32A is a perspective view of a head-mounted computer fitted to a wearer.

FIG. 32A is a perspective view of a head-mounted computer 510 fitted to a wearer. The CPU and video driver are fabricated as an integral part of the head band 512. Expansion modules 525A, 525B, 525C are removable and coupled to the bus 523. As shown, the wearer 601 is fitted with a monocular display. A display pod 1100 is positioned in the wearer's field of view by a display arm assembly 600. The display arm assembly 600 includes a proximal section 610, a distal section 620, a horizontal support member 630, and a nose piece 650. The distal arm member 620 telescopes from the proximal arm member 610 using a supporting member 612. Also shown is an earplug 603.

Figure 32B:
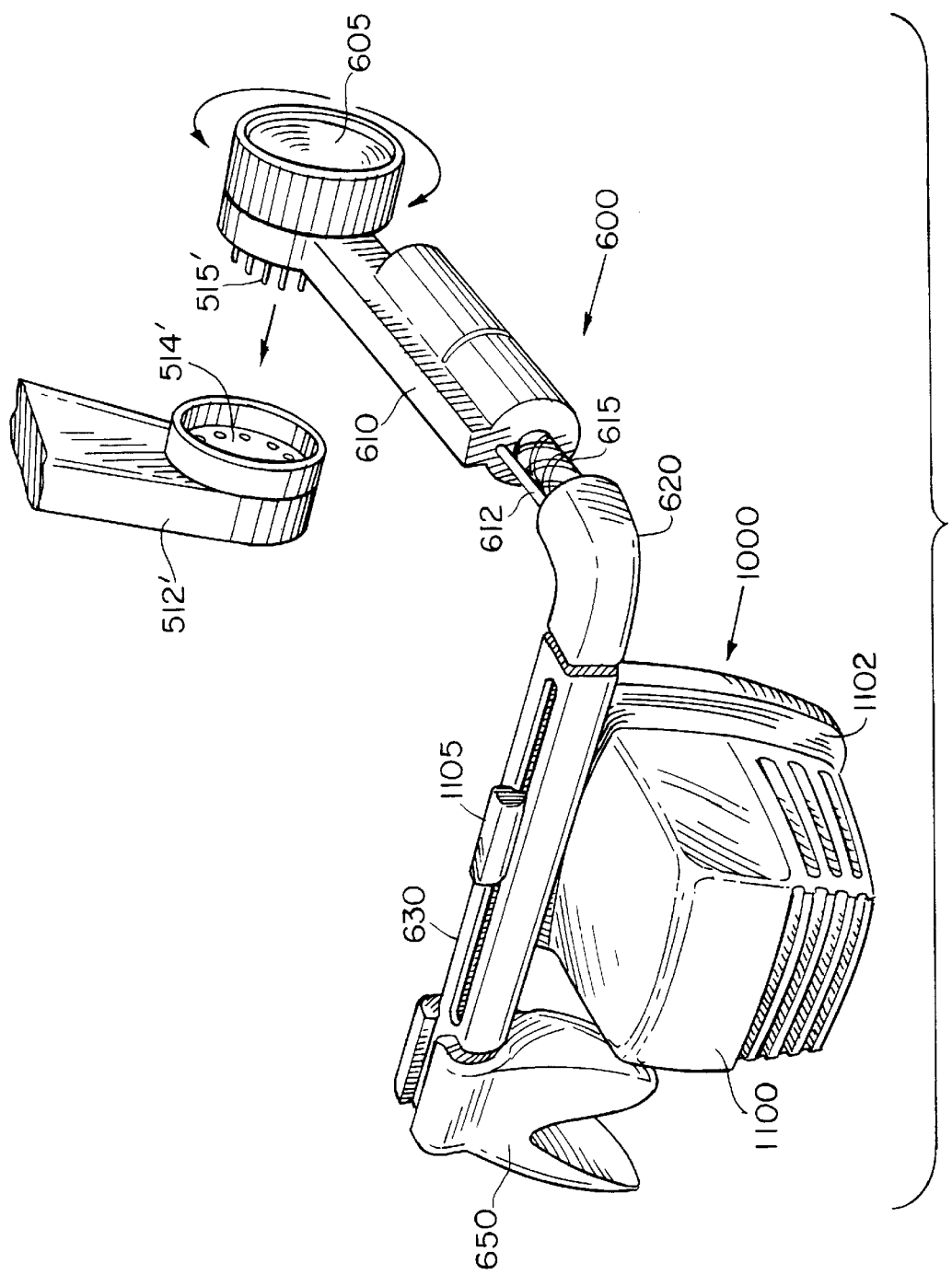
FIG. 32B is a perspective view of a preferred display arm, such as shown in FIG. 32A.

FIG. 32B is a perspective view of a preferred display arm, such as shown in FIG. 32A. Illustrated is a socket 514 on a broken away head band 512 and an arm assembly 600. The arm assembly 600 couples to the socket 514 by a matching plug 515. As illustrated, the arm assembly is a monocular arm assembly having a single display panel. The plug 515 and socket 514 are secured together by thumb screw 605.

The arm assembly has a proximal section 610 fixed to the plug 515 and a distal section 620 that telescopes from the proximal section 610. A supporting beam 612 is fixed to the distal arm section 620 and telescopes out from the proximal arm section 610 to support the distal section 620.

A display pod 1100 encasing the display panel is attached to a horizontal frame 630 by a positioning slide 1105. The horizontal frame 630 is attached to the distal arm section 620. A nose bridge 650 supports the horizontal frame 630 on the wearer's nose. An eye cup 1102 conforms to the shape of a wearer's eye. Electrical signals from the plug 515 to the display panel are carried over a connecting cable 615.

Figure 33:
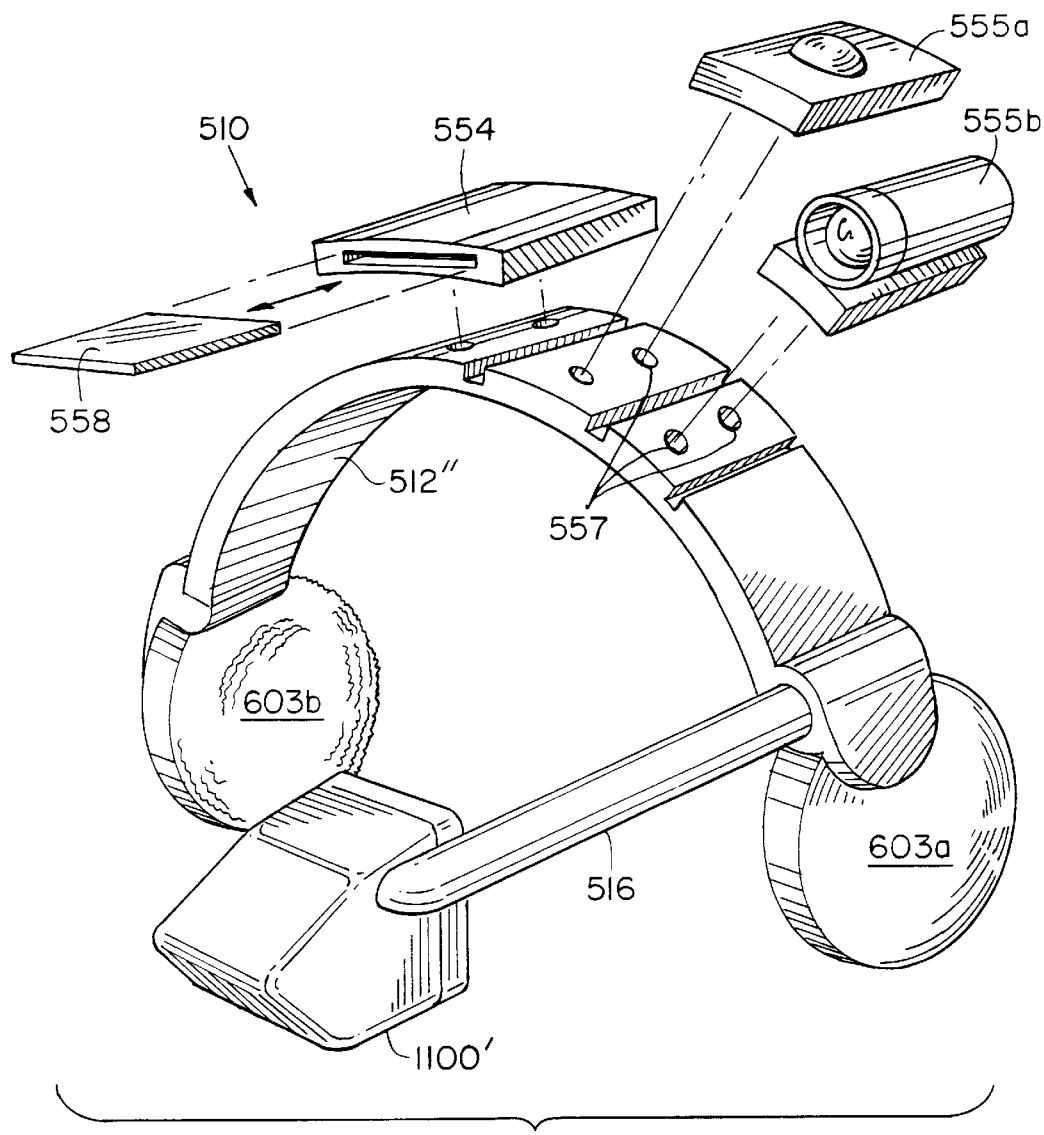
FIG. 33 is a perspective view of another preferred head-mounted computer.
Figure 34B:
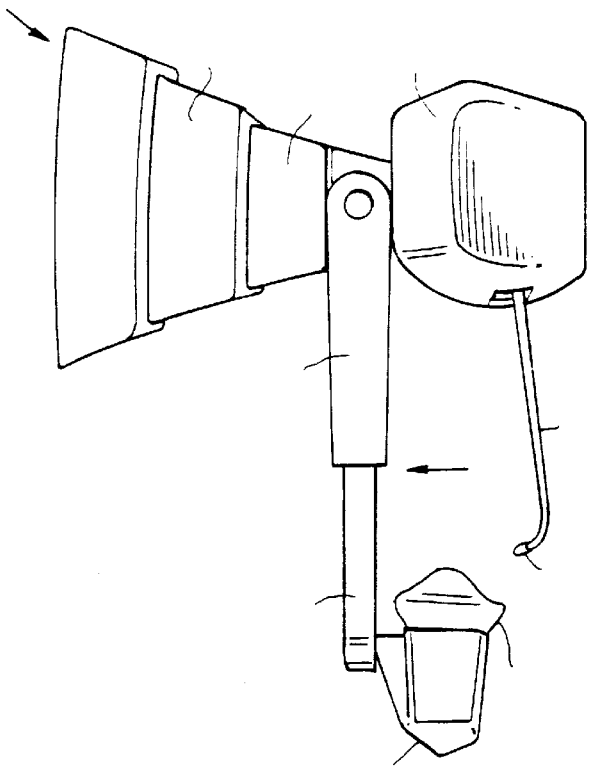
Figure 34C:
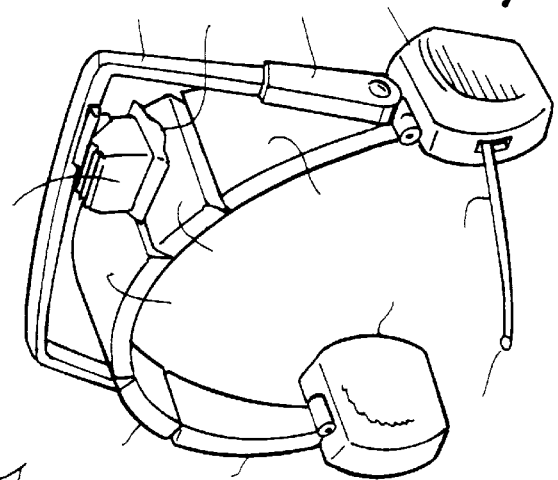
Figure 34D:
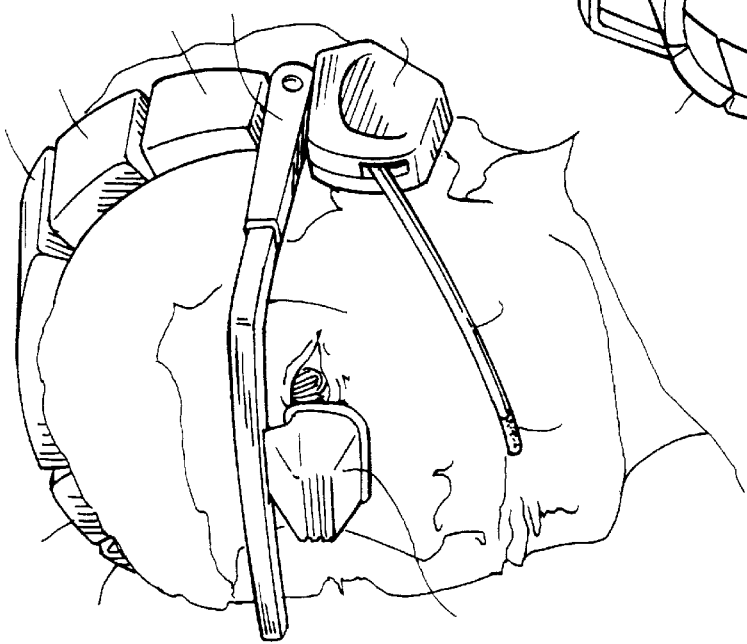

FIG. 33 is a perspective view of another preferred head-mounted computer 510. As illustrated, there is a head band 512, stereo headphones 603A, 603B, a display arm 516 connecting the headband 512 to a display pod 1100', which includes a display panel. The CPU and video drive circuitry are fabricated as an integral part of the head band 512. Shown on the head band 512 are plurality of ports 557 which accept expansion modules. As shown, there is a PMMA interface module coupled to the head band 512. A PMMA module 558 is inserted into the PMMA interface module 554. Also illustrated are expansion modules 514, an infrared communication sensor 555a and a Charge Coupled Device (CCD) camera 555b.

FIGS. 34A–34D illustrate a partial exploded perspective views of another head-mounted computer in accordance with the present invention. The head band 512 includes a CPU, a disk drive 564 and expansion modules 515a, 515b, 515c all interconnected together by a flexible bus 563. Each module 564, 515 connects to the bus 656 by a respective connector 517a.

Also shown in FIG. 34A–34D are earphones 603a, 603b for providing audio information to the wearer. Attached to one of the earphones is a microphone arm 690 having a microphone 559 at its distal end. The earphones 603a, 603b are hinged to the head band 512 to provide a comfortable fit for the wearer.

A frame assembly 600' is coupled to each end of the head band 512 by a respective pin 602a, 602b. The pins 602a, 602b allow the frame assembly 600' to be rotated up and over the head band 512. In that position, the head-mounted computer 510 is compactly stored and easy to carry.

The frame assembly 600' includes a pair of distal arms 610a, 610b which are coupled to the head band 512 by the pins 602a, 602b. A horizontal support 630' telescopes out from the proximal arms 610a, 610b and around the forehead of the wearer. At least one display pod 1100' is mounted to the horizontal support 630'. As illustrated, a single display pod 1100' provides for monocular display. The display pod 1100' is preferably slidable along the horizontal frame 630' for use with either the left or right eye of the wearer. The display pod 1100' includes an eye cup 1102'.

Figure 35:
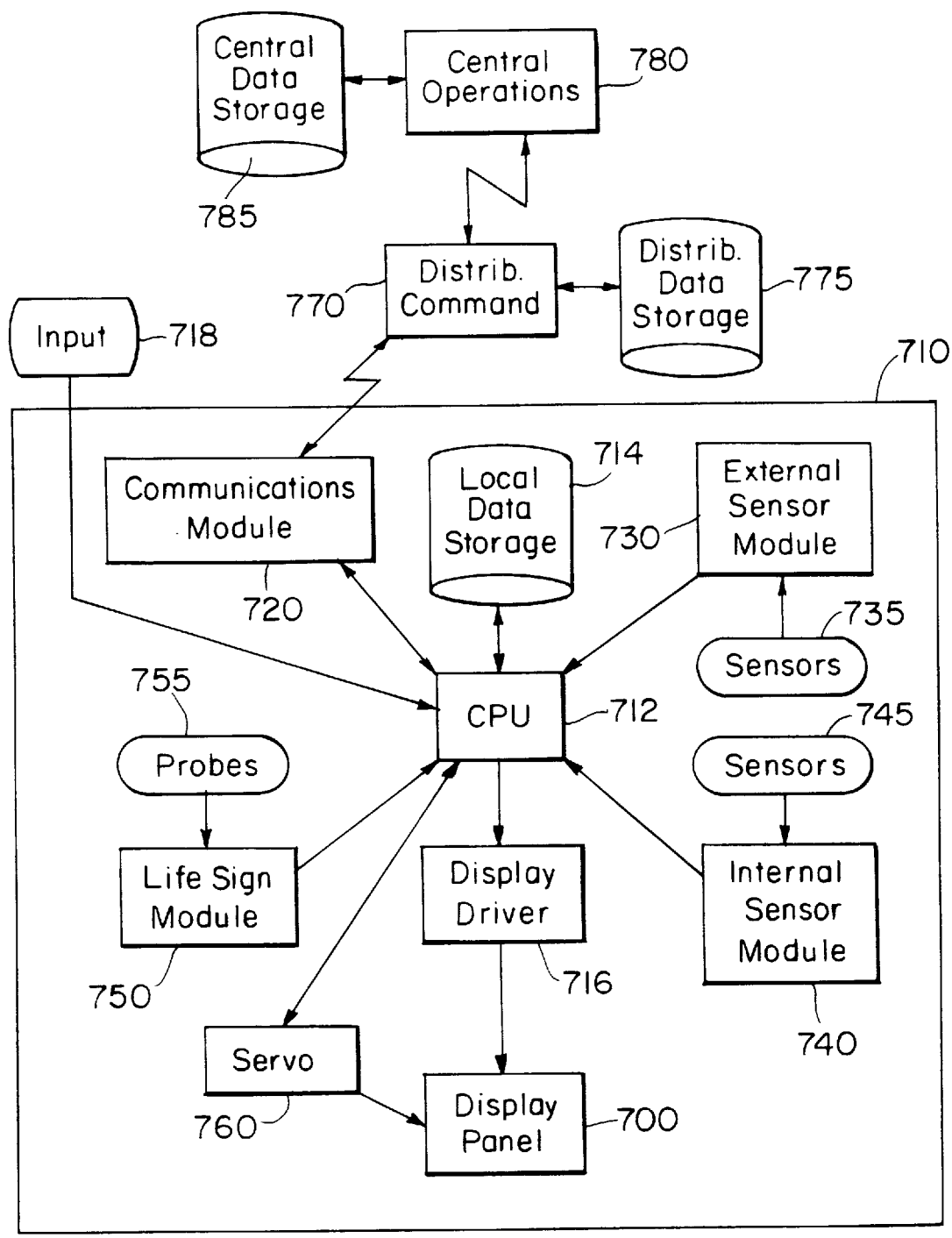
FIG. 35 is a functional block diagram of a preferred head-mounted computer architecture according to the invention.

FIG. 35 is a functional block diagram of a preferred head-mounted computer architecture according to the invention. The head-mounted computer 710 includes a CPU 712 having read and write access over the bus 513 (FIG. 31B) to a local data storage device 714, which can be a floppy disk, a hard disk, a CD-ROM or other suitable mass storage devices. The CPU 712 also drives a display driver 716 to form images on the display panel 700 for viewing by the wearer.

Either the head or body mounted platforms can house a memory or modem card 741 conforming to the Personal Computer Memory Card International Association (PCMCIA) standards. These cards are restricted to fit within a rectangular space of about 55 mm in width, 85 mm in length, and 5 mm in depth.

A servo 760 communicates with the CPU 712 to vary the position of the display panel 700 relative to the wearer's eyes. The servo 760 is controlled by the wearer through an input device 718. The servo 760 operates the motor 518 (FIG. 31A) to raise or lower the vertical position of the display panel 700. Thus the display panel 700 can be positioned so the wearer can glance up or down at the image without the display panel 100 interfering with normal vision. Additionally, the display panel 700 can be stowed outside the field of view.

CPU 712 also sends and receives data from a communication module 720 for interfacing with the outside world. Preferably, the communication module 720 includes a wireless transducer for transmitting and receiving digital audio, video and data signals. A communication module 720 can also include a cellular telephone connection. The communication module 720 can likewise interface directly with the Plain Old Telephone Service (POTS) for normal voice, facsimile or modem communications. The communication module 720 can include a tuner to receive over-the-air radio and television broadcasts.

The CPU 712 can also receive and process data from an external sensor module 730. The external sensor module 730 receives data signals from sensors 735, which provide data representing the external environment around the wearer. Such sensors are particularly important where the wearer is encased in protective gear.

When the wearer is clothed in protective gear, an internal sensor module 740 can receive sensor data from sensors 745 within the protective gear. The data from the internal sensors 745 provide information regarding the wearer's local environment. In particular, the internal sensors 745 can warn the wearer of a breach or failure of the protective gear.

In addition, the CPU 712 can also receive data from a life sign module 750. The life sign module 750 receives data from probes 755 implanted in or attached to the wearer. The life sign data from the probes 755 provides the CPU 712 with information regarding the wearer's bodily condition so that corrective actions can be taken.

The sensor modules 730, 740, 750 receive data from associated detectors and format the data for transmission over the bus 513 to the CPU 712. The sensor modules can also filter or otherwise preprocess the data before transmitting the preprocessed data to the CPU 712. Thus, each expansion module can contain a microprocessor.

The wearer can control the operation of the CPU 712 through the input device 718. The input device 718 can include a keyboard, a mouse, a joystick, a pen, a track ball, a microphone for voice activated commands, a virtual reality data glove, an eyetracker, or other suitable input devices. A preferred eyetracker is described in U.S. Pat. No. 5,331,149, the teachings of which are incorporated herein by reference. In a particular preferred embodiment of the invention, the input device 718 is a portable collapsible keyboard. Alternatively, the input device 718 is a wrist-mounted keypad.

As illustrated, the head-mounted computer 710 is a node on a distributed computing network. The head-mounted computer 710 is in communication with a distributed command computer 770 via the communication module 720. The distributed command computer 770 has access to distributed data storage 775 for providing audio, video and data signals to the head-mounted computer. The distributed command computer 770 can also be in communication with a central operations computer 780 having central data storage 785. Such external networks can be particularly adapted to applications of the head-mounted display or may be general purpose distributed data networks.

Figure 36:
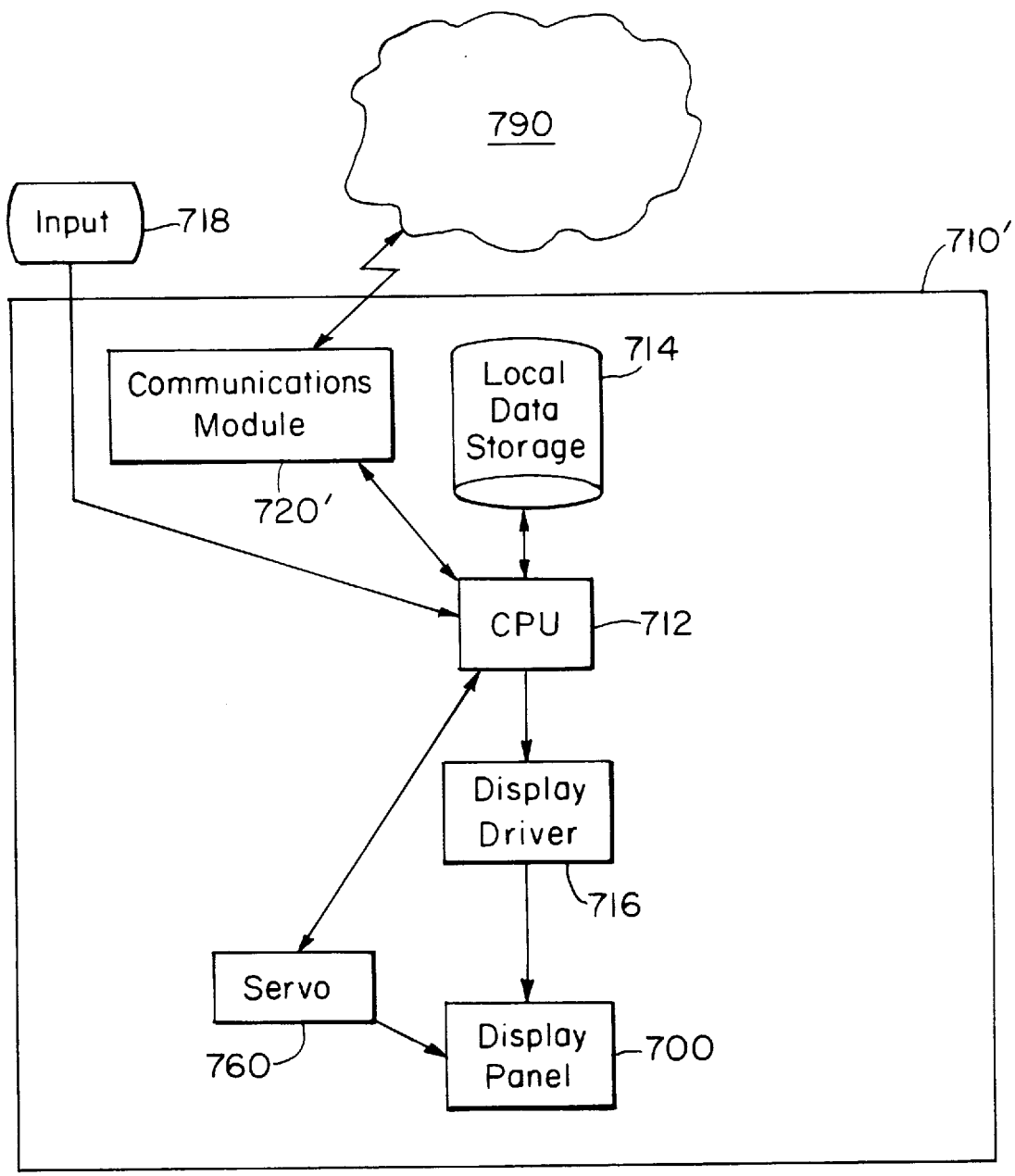
FIG. 36 is a functional block diagram of a general purpose head-mounted personal computer.

FIG. 36 is a functional block diagram of a general purpose head-mounted personal computer 710'. The head-mounted personal computer 710' includes a communication module 720' for interfacing with an information exchange 90. The information exchange 790 can interconnect the personal computer 710' with other personal computers or informational networks. The communication module 720' can communicate with the information exchange 90 over a wireless data link, a modem, a facsimile apparatus or a digital data link. The communication module 720' can include one or more of the aforementioned communication mechanisms, as required. The local data storage 714 includes software applications for execution by the CPU 712.

In addition to general purpose computing, the head-mounted computer 710 can be adapted for use in many real world situations. In particular, there are situations where a head-mounted computer 710 is especially advantageous. Such situations typically involve applications where the wearer desires or needs auxiliary sensory input.

Figure 37:
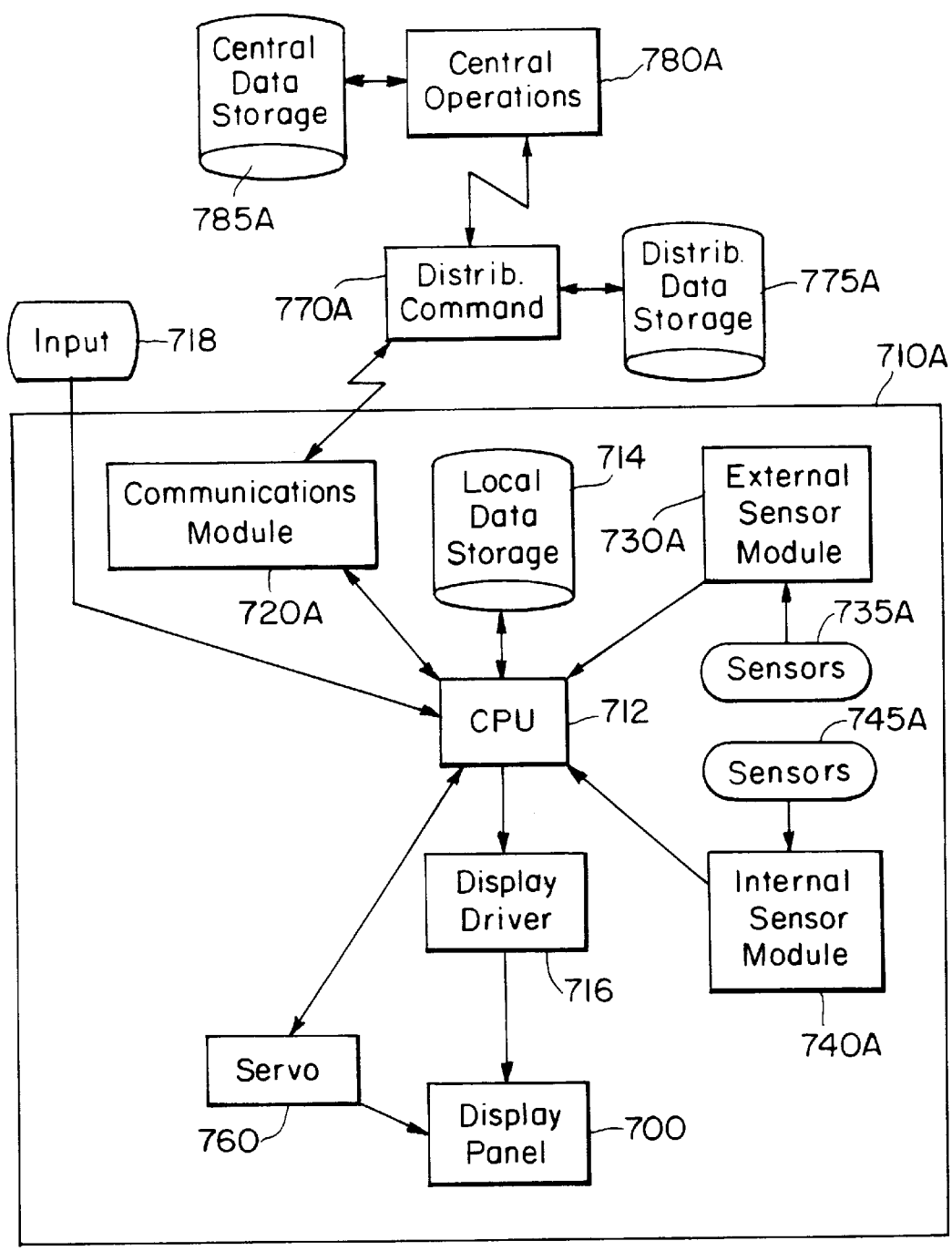
FIG. 37 is a functional block diagram for a personal firefighter computing system.

FIG. 37 is a functional block diagram for a personal firefighter computing system 710A. A firefighter in a burning building needs access to at least three pieces of valuable information: (1) where the firefighter is located, (2) the dangers surrounding the firefighter and (3) how to egress the building in an emergency. In addition, the firefighter's commander needs to know where the firefighter is located in the building at all times so that any necessary rescue operation can be expedited. To that end, a head-mounted firefighting computer 710A is adapted to aid the firefighter. In addition to application software, the local data storage module 714 includes building schematics for the building where the firefighter is located. Local data storage 714 can also include emergency medical instructions.

The firefighter is in communication with a local fire vehicle or truck 770A via a communication module 720A. The communication module 720A provides wireless audio, video and data communication between the firefighter and the truck 770A. The truck 770A is equipped with a distributed data storage system 775A for storing maps and building schematics for the coverage area of the firefighting unit. The truck 770A can receive additional maps and building schematics from a central firehouse 780A when the truck 770A is dispatched outside of its normal operation area. Through the communication module, a commander at the truck 770A or a central firehouse 780A can communicate with the firefighter.

In addition, the communication module includes a global positioning satellite (GPS) sensor or other position sensor for accurately determining the position of the firefighter. This information is combined with the building schematics by the CPU 712 to provide the firefighter and the truck 770A with the firefighter's exact position in the building. In addition, the CPU 712 can calculate and direct the firefighter to all exits from the building. In particular, the firefighter's path into the building can be recorded in the local data storage 714 so the firefighter can be directed out of the building following the path over which the firefighter entered the building. Preferably, the directions for backtracking or otherwise exiting the building are pictorially displayed on the display panel 700 so the firefighter can exit even in low or no visibility situations.

While in a burning building, the firefighter can encounter closed doors having flames behind them. To warn the firefighter, the external sensors 735A include an infrared detector. Signals from the infrared detector are provided to the CPU 712 by the external sensor module 730A to warn the firefighter of potential hot spots to avoid. In addition, the infrared sensor preferably permits the firefighter to view the surrounding through heavy smoke. Data from the infrared sensor can also aid the firefighter in located trapped fire victims. External sensors 735A can also include a temperature sensor to provide the firefighter and the truck 770a with temperature readings within the burning building. Furthermore, a carbon monoxide sensor can supply the firefighter with the concentration of carbon monoxide in the burning building. Similarly, a natural gas sensor can warn the firefighter of a danger of explosion before a fire occurs.

In addition, the firefighter may be equipped with protective gear. Sensors 745A within the protective gear provide the firefighter with the temperature within the gear, the amount of oxygen remaining in the firefighter's oxygen tanks and an indication of battery power remaining in the firefighter's computer 710A. If any of these internal sensors 745A exceed predetermined thresholds, the CPU 12 warns the firefighter to exit the burning building.

Figure 38:
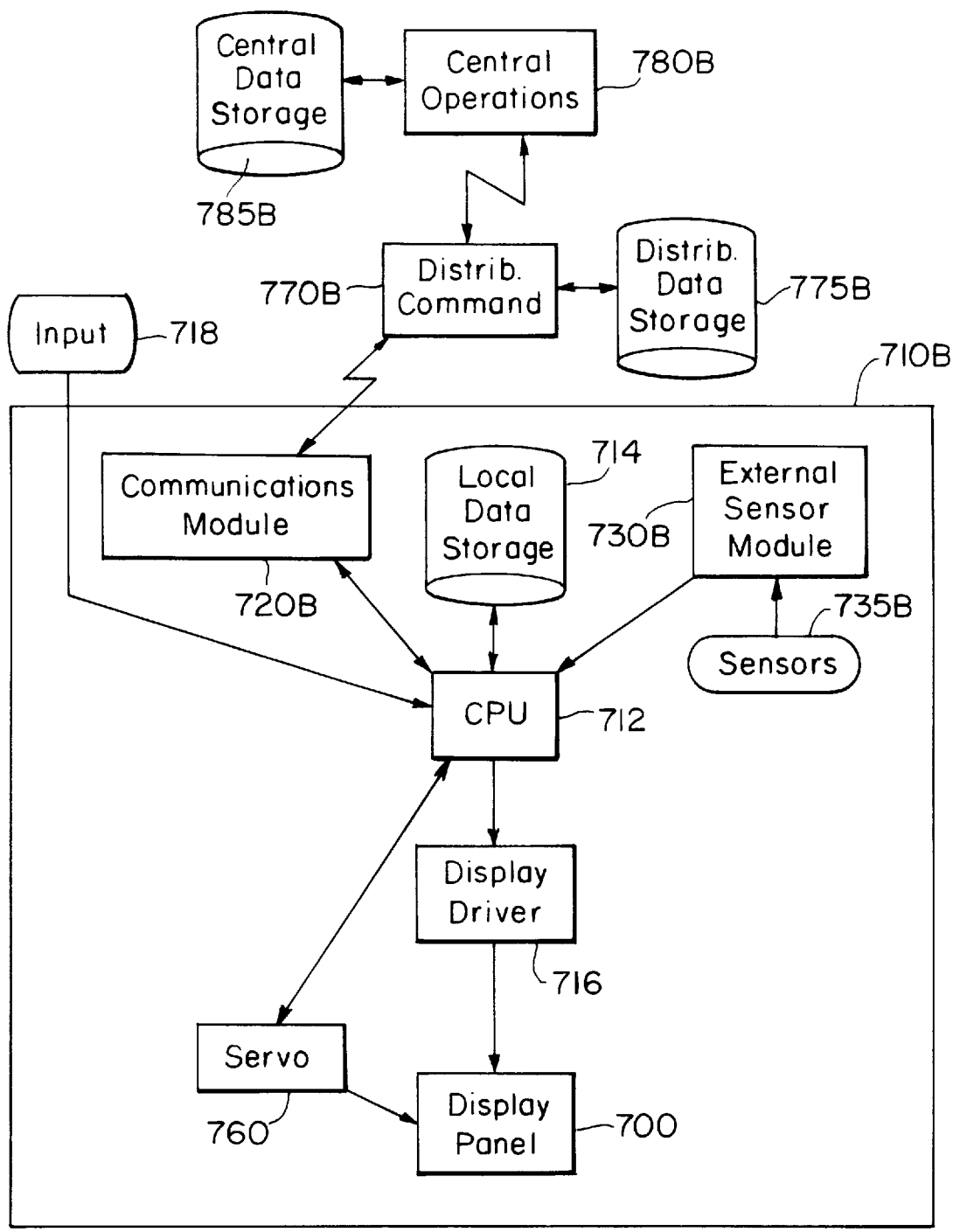
FIG. 38 is a functional block diagram of a head-mounted police computer according to the invention.

FIG. 38 is a functional block diagram of a head-mounted police computer 710B according to the invention. As with firefighters, police officers often act alone and must provide information to others and also receive updated information. In a police computer 710B, it can always be with the police officer to service these information needs.

Local data storage 714 can include city maps, building schematics, suspect rap sheets, and emergency medical information. As with firefighters, information can be exchanged between the police officer, a police car 770B and a police station 780B. The police car 770B stores more general maps and criminal data base in a distributed data storage unit 775B. The police station 780B has access to all maps, building schematics and criminal information, which are stored in a central data storage unit 785B.

A communication module 720B permits the exchange of audio, video and data information between the police officer and the police car 770B and police station 780B. The communication module 720B can also include a GPS so the police officer and others know the exact position of the police officer relative to city maps and building schematics. The police computer 710B can also include an external sensor 735B that provides the police officer with night vision. In addition, a magnetic or optical reader can be coupled to the external sensor module 730B. The reader can read driver licenses or other identification and provide the read information to the police station 780B for verification and a warrants check. The results are then provided and displayed to the police officer without the police officer having to return to the police car 770B during traffic stops or otherwise.

Figure 39:
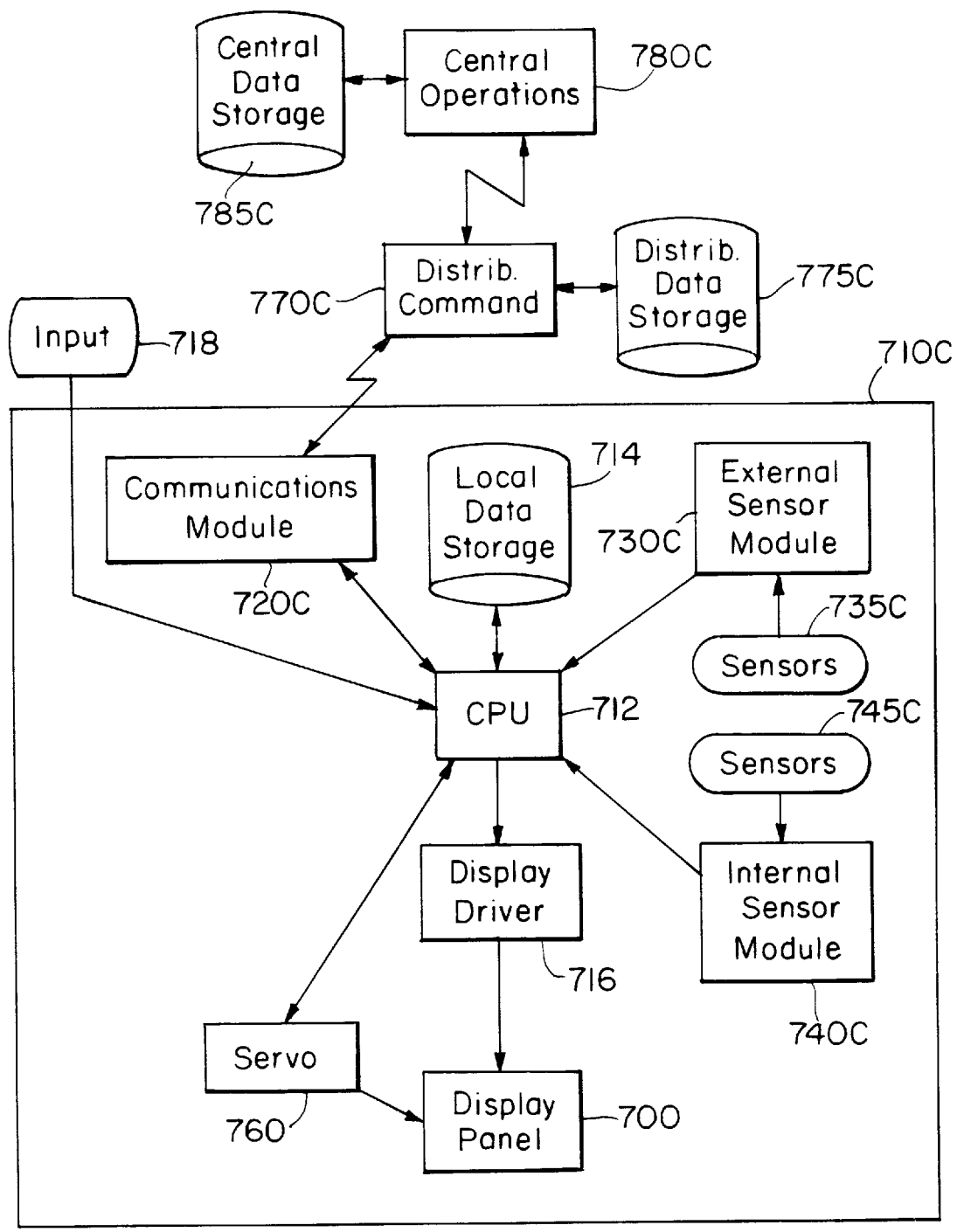
FIG. 39 is a functional block diagram of a head-mounted computer for use by chemical factory workers.

FIG. 39 is a functional block diagram of a head-mounted computer 710C for use by chemical factory workers. In particular, the chemical worker computer 710C is worn by those chemical factory workers exposed to or likely to be exposed to caustic or toxic chemicals or gasses. Local data storage 714 includes plant schematics and instructions to the chemical worker, including emergency medical instructions.

The communication module 720C provides an audio, video and data link between the chemical worker and the factory control 770C, which can provide the chemical worker with further building schematics and instructions. The factory 770C can also communicate with corporate headquarters 780C for further guidance. The communication module 720C can also include a GPS to identify the worker's position.

The chemical worker computer 710C also includes external sensors 735C for detecting caustic chemicals and toxic gas. Data from the external sensors 735C is provided to the CPU 712 by an external sensor module 730C. The external sensors 735C provide the chemical worker with information regarding dangerous substances in or that may have leaked into the work area.

The chemical worker may also be working within protective gear. For example, the chemical worker may be working in a hazardous area such as chemical storage tanks. Accordingly, the computer 710C includes internal sensors for measuring the remaining oxygen in the worker's oxygen tanks and remaining power in the head-mounted computer 710C. Data from the internal sensors 745C are provided to the CPU 712 by an internal sensor module 740C.

Figure 40:
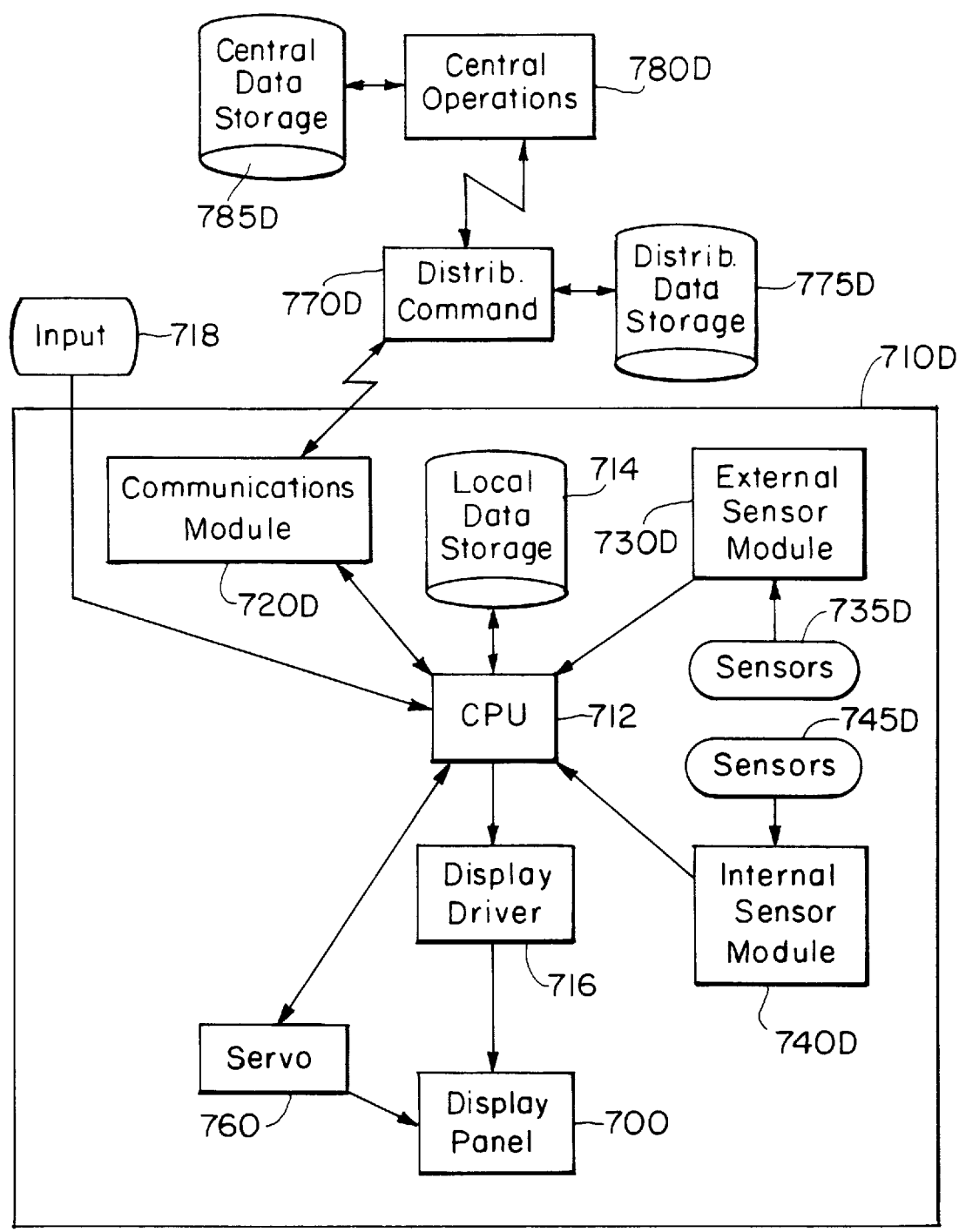
FIG. 40 is a functional block diagram of a head-mounted nuclear plant computer.

FIG. 40 is a functional block diagram of a head-mounted nuclear plant computer 710D. Nuclear plant workers face dangers similar to those of chemical workers. However, instead of detecting caustics and toxins, the nuclear worker computer 710D has external sensors 735D for measuring radiation levels. The radiation data is provided to the CPU 712 by an external sensor module 730D.

Figure 41:
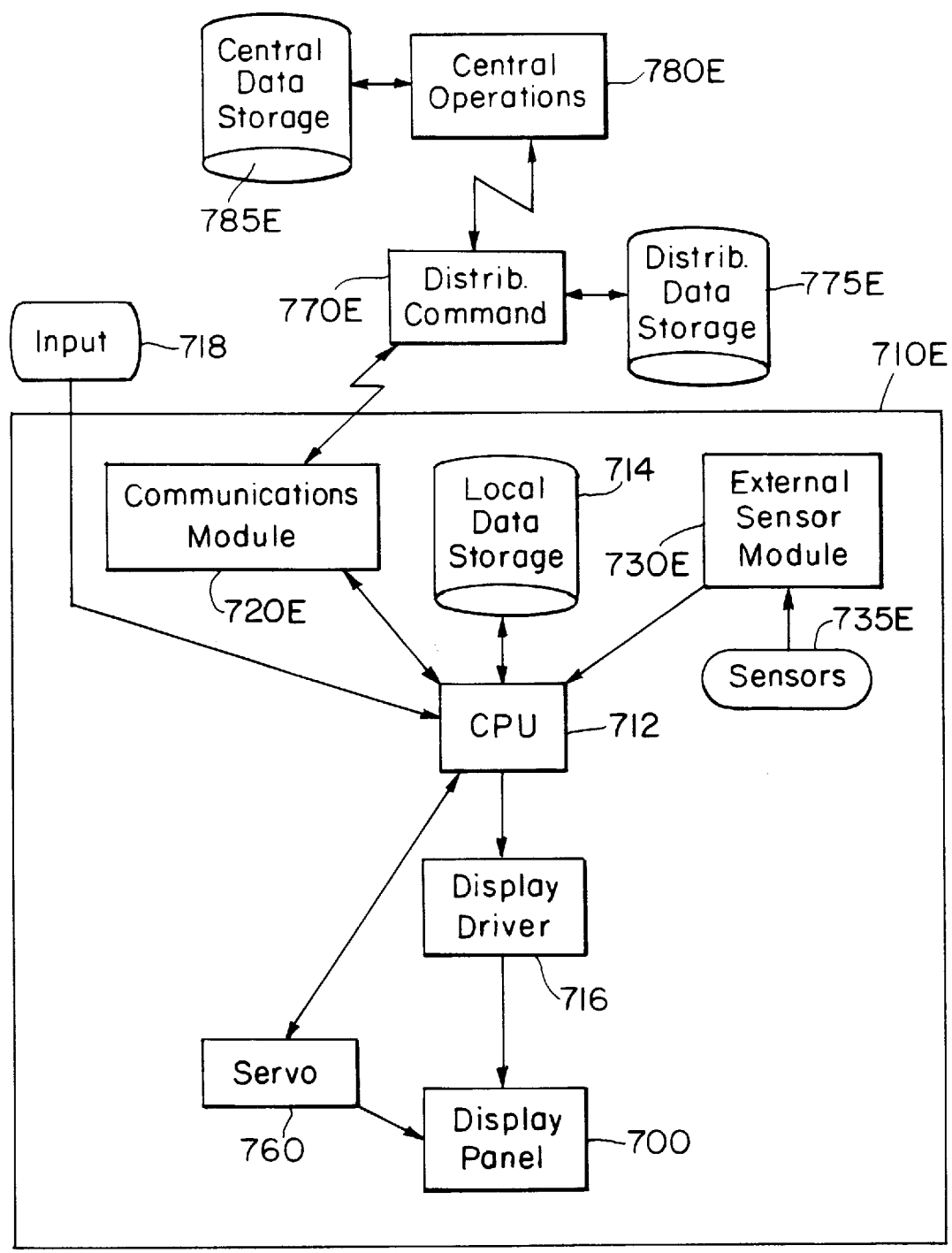
FIG. 41 is a functional block diagram of a head-mounted mining computer.

FIG. 41 is a functional block diagram of a head-mounted mining computer 710E. The mining computer 710E is worn by a coal miner or similar workers. External sensors 735E measure methane gas concentration. An external sensor module 730E provides the external sensor data to the CPU 712, which can warn the miner of a methane danger. In addition, an external sensor 735E can be a low-light vision sensor.

The communication module 720E provides an audio, video and data link between the mine control room 770E and the miner. For example, the control room 770E can provide a mine supervisor with real-time production rates so the supervisor can shift miners to make efficient use of equipment and human resources. The communication module 720E can also be used to exchange information with the miners in the event of a mine cave-in.

Figure 42:
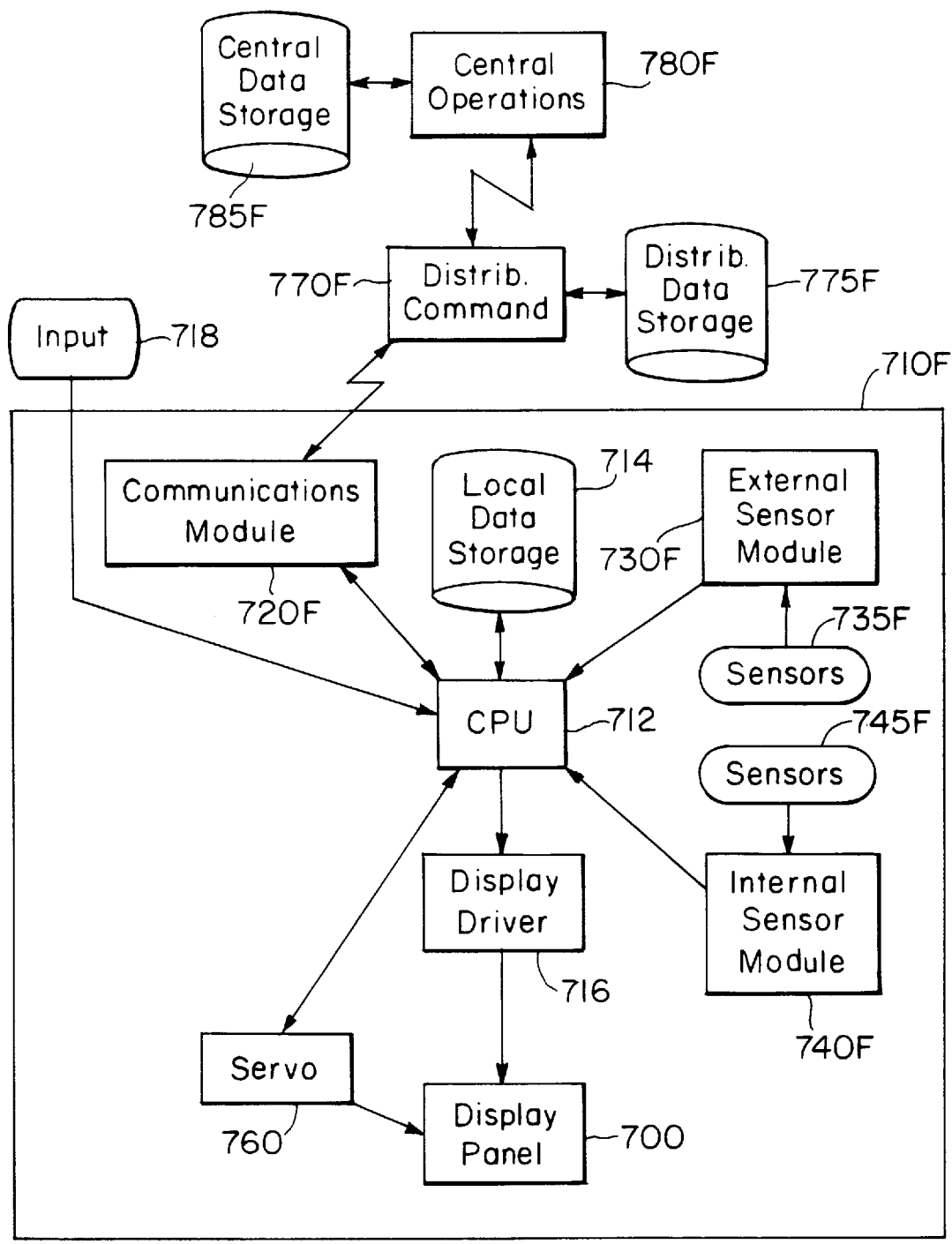
FIG. 42 is a functional block diagram of a head-mounted military computer.

FIG. 42 is a functional block diagram of a head-mounted military computer 710F. The military computer 710F is preferably adapted to be worn by field solders operating in areas of high toxicity, such as a combat station exposed to biological or chemical agents or radiation. The military computer 710F can also be worn by military personnel not exposed to such hazards.

The local data storage 714 stores area maps and emergency medical instructions for use by the soldier. The local data storage 714 can also contain repair instructions for equipment used by the soldier.

A communication module 720F provides a wireless audio, video and data link between the soldier and local command officers 770F. The local command officers 770F are in turn linked to remote command officers 780F. The communication module 720F can also contain a GPS, which provides the soldier and command officers with the soldier's location. Through the communication module 720F, the soldier can also receive real-time updates of enemy troop movements. The communication module 720F can also include an encryption/decryption unit securing communication channels.

An external sensor module 730F provides the CPU 712 with data from external sensors 735F. The external sensors 735F include detectors for detecting toxins, biological agents and radiation. The external sensors 735F can also include a night vision unit. If a hazard is detected, the soldier should be clothed in protective gear.

An internal sensor module 740F provides the CPU 712 with data from internal sensors 745F disposed within the protective gear. The internal sensors 745F provide the soldier with a measure of contaminates entering the protective gear.

Figure 43:
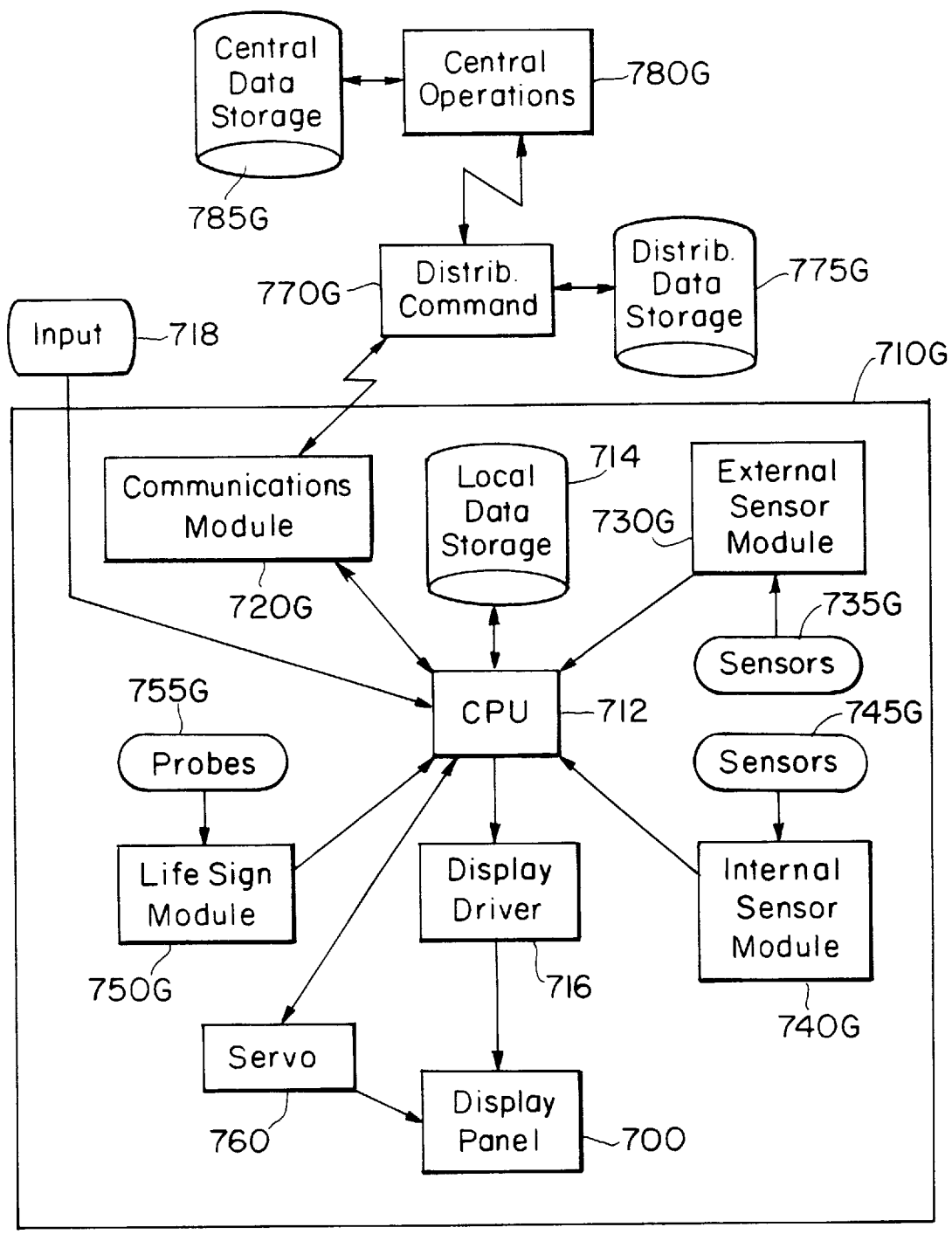
FIG. 43 is a functional block diagram on a head-mounted space exploration computer.

FIG. 43 is a functional block diagram on a head-mounted space exploration computer 710G. The space exploration computer 710G is worn by an astronaut while in space or exploring another planet or moon. The space exploration computer 710G is particularly useful for use in constructing structures in outerspace, such as in earth orbit or on another world. Because communications between the Earth and the astronaut may fail, the astronaut needs to have ready access to sufficient information to accomplish the mission independently.

The local data storage 714 contains maps, schematics and instructions for use by the astronaut. The maps can be used by the astronaut while exploring other objects. The schematics can be used by the astronaut while constructing structures and repairing equipment.

A communication module 720G provides an audio, video and data link between the astronaut and a command ship 770G and ground station command 780G.

An external sensor module 730G provides the CPU 712 with data from external sensors 735G. The external sensors 735G can include measuring devices for temperature, pressure and gas content of an atmosphere. The external sensors 735G can also include a position sensor to locate the relative position of an astronaut from a fixed reference data point, such as a landing craft. The position sensor data in combination with the maps from the local data storage 714 can be processed by the CPU 712 to provide instructions to the astronaut to return the astronaut to the landing craft. The external sensors 735G can also include an infrared vision unit and a night vision unit to aid the astronaut in dusty environments and at night.

Because the astronaut typically wears a space suit, an internal sensor module 740G provides the CPU 712 with data from internal sensors 745G within the spacesuit. The internal sensors 745G measure the temperature and pressure within the suit. From the internal sensor data, the CPU 712 can regulate the temperature and pressure and detect a breach in the suit. In addition, the internal sensors 745G include a sensor for measuring the remaining oxygen supply in the tanks. From the oxygen supply data, the CPU 712 calculates the remaining time until the oxygen supply is depleted and warns the astronaut when it is time to return to a safe environment.

A life sign module 750G provides the CPU 712 with data from probes 755G. The probes 755G measure the astronaut's body temperature, blood pressure, pulse and respiration rate.

Figure 44:
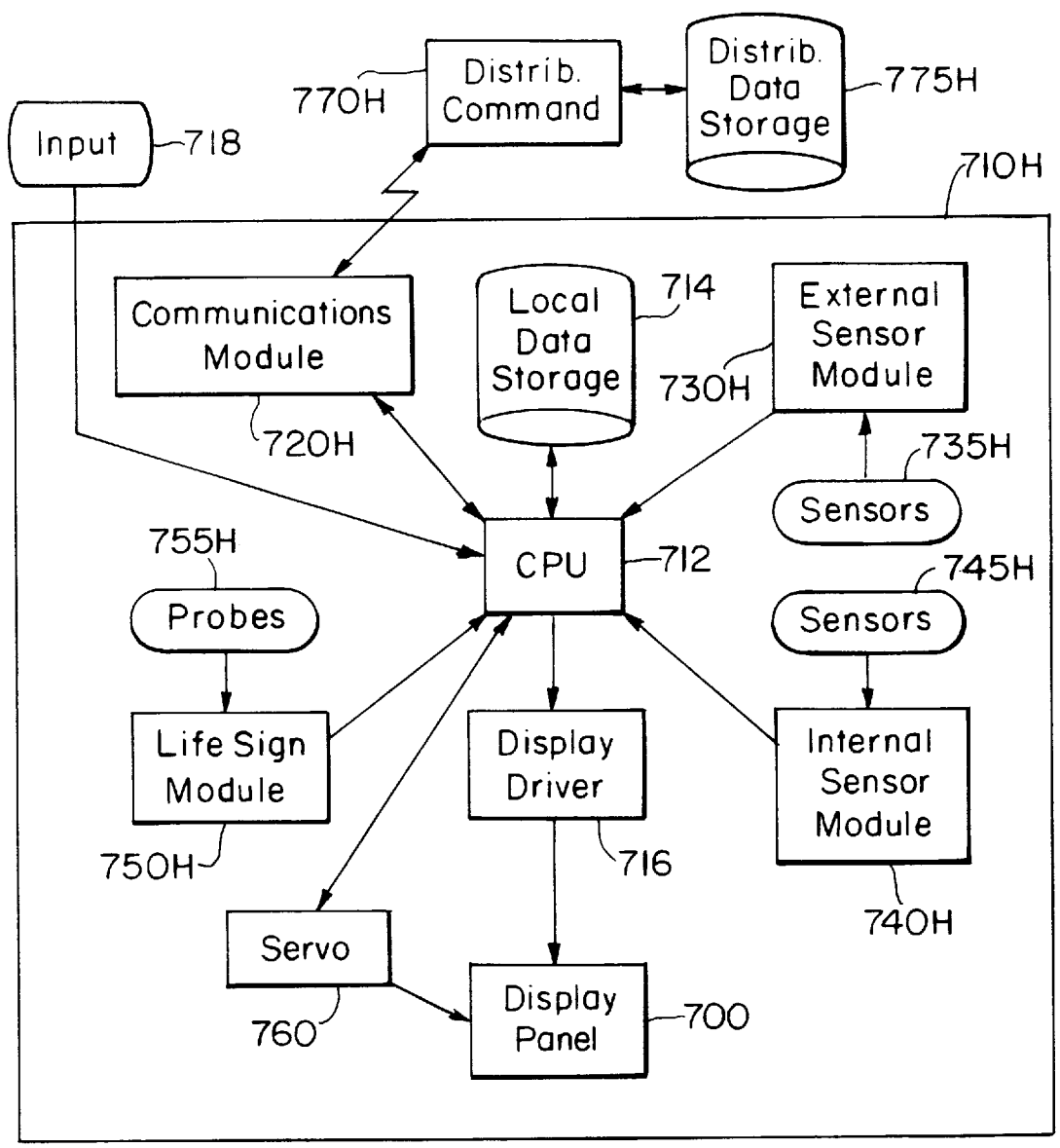
FIG. 44 is a functional block diagram of a general purpose head-mounted survival computer.

FIG. 44 is a functional block diagram of a general purpose head-mounted survival computer 710H. The survival computer 710H facilitates the survival and rescue of a wearer. The survival computer 710H can be integrated into a sea survival suit, an arctic survival suit or be a part of a desert survival pack. Pre-stored in the local data storage 714 are maps and medical instructions.

A communication module 720H includes a GPS and emergency communication equipment. The GPS data is combined by the CPU 712 with the maps from the local data storage 714 to determine the ground position of the wearer. The CPU 712 can then calculate a path for the wearer to take to obtain safe shelter. The ground position information is also broadcast over emergency channels by the communication module 720H to a rescue team 770H. Once contact is made with a rescue team 770H, the rescue team 770H can provide additional maps and other information to the wearer over a data link. For use of sea, the communication module 720H can also include a sonar transducer for attracting submarines and ships (e.g., a failure of radio communication).

An external sensor module 730H provides the CPU 712 with data from external sensors 735H. The external sensors 735H can include temperature and pressure detectors. The external sensors 735H can also include a night vision unit.

In the event the wearer is wearing protective gear in a cold environment, an internal sensor module 740H provides the CPU 712 with data from internal sensors 745H within the protective gear. The internal sensors 745G measure the temperature within the gear. The CPU 712 can then regulate the temperature and detect a breach in the gear.

A life sign module 750H provides the CPU 712 with data from probes 755H. The probes 755H measure the wearer's body temperature, blood pressure, pulse and respiration rate.

Figure 45:
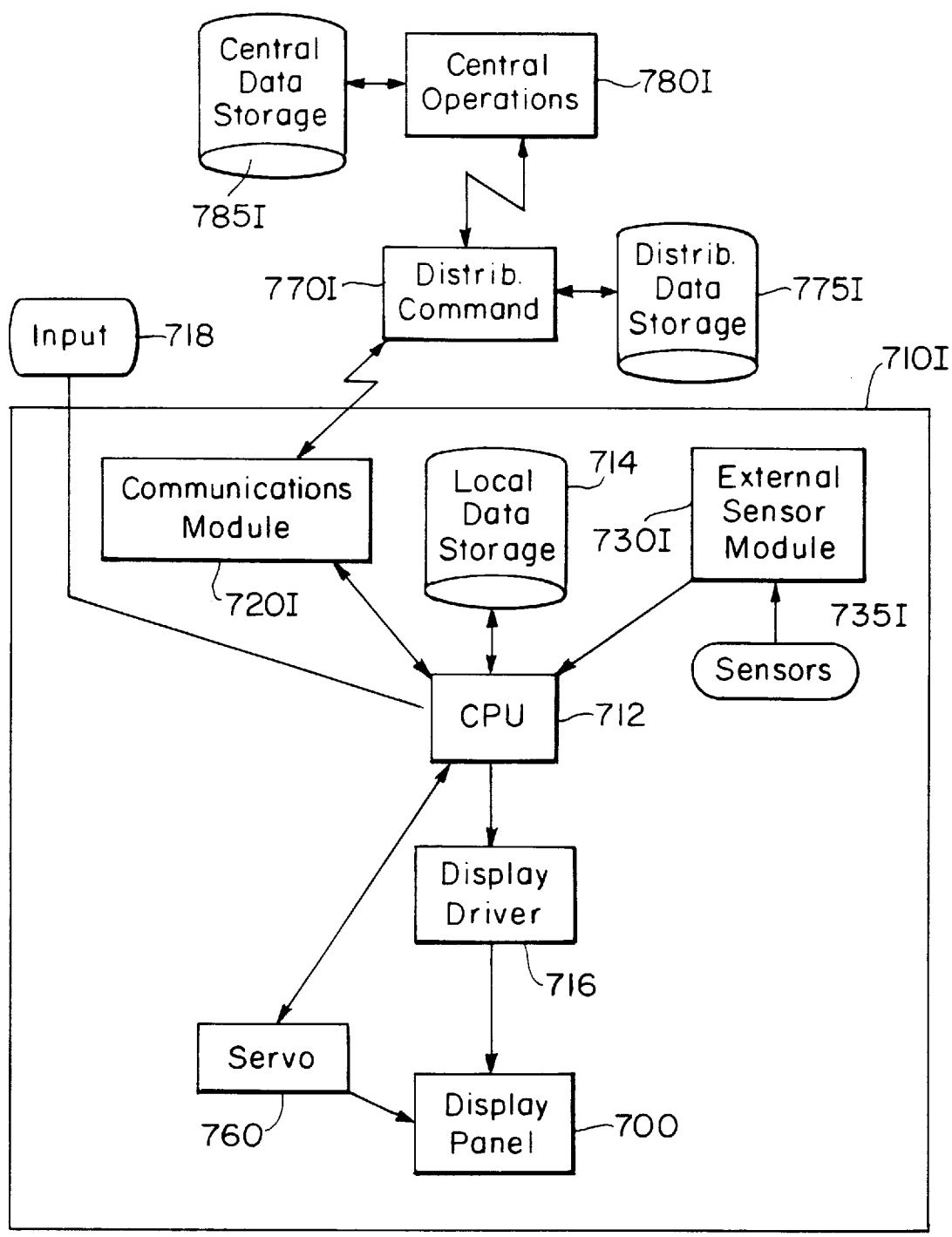
FIG. 45 is a functional block diagram of a head-mounted maintenance computer.

FIG. 45 is a functional block diagram of a head-mounted maintenance computer 710I. A maintenance computer 710K is worn by repair and maintenance personnel. The maintenance computer 710I provides the wearer with access to all relevant repair and maintenance manuals and can include diagnostic sensors integrated with the maintenance computer 710I.

FIGS. 46A–46E are views of a head-mounted maintenance computer 710K of FIG. 45 worn by a maintenance worker. The maintenance computer 710K is disposed within the hard hat 800.

Figure 46B:
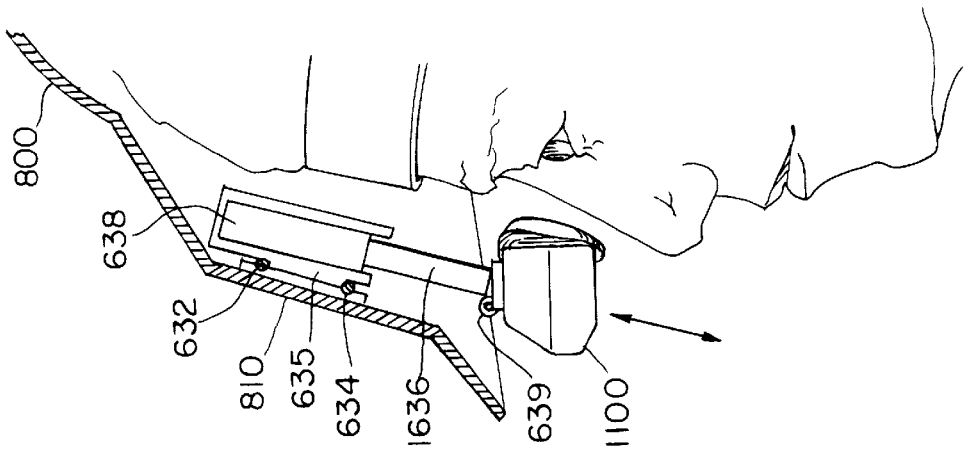
FIGS. 46A–46E are views of a protective head-mounted maintenance computer of FIG. 45 worn by a maintenance worker.
Figure 46A:
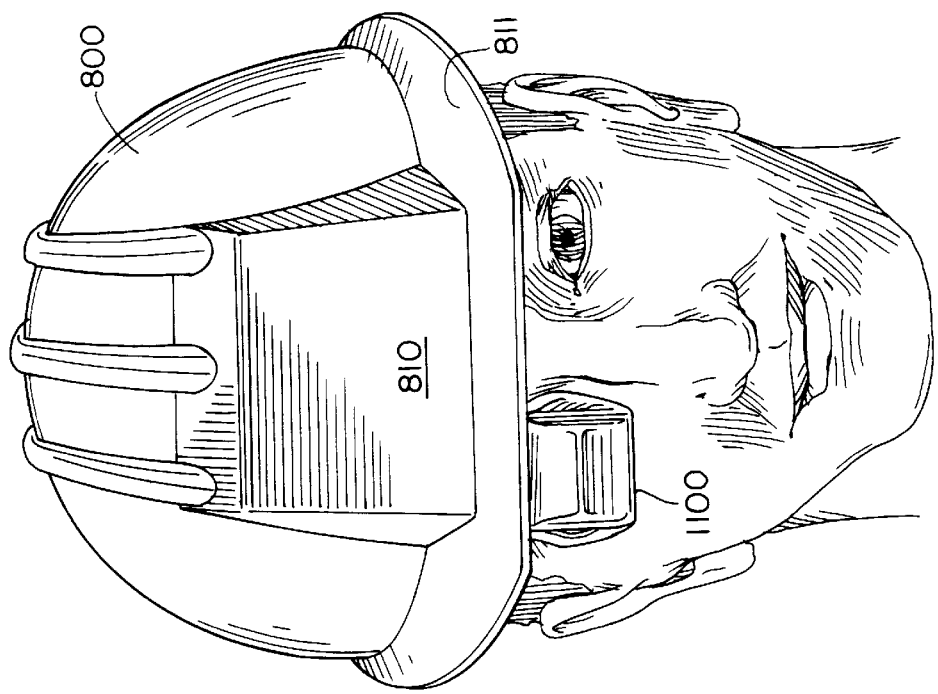

FIG. 46A is a front view of the protective headpiece used with the maintenance computer 710K of FIG. 45 worn by a maintenance worker. The hard hat 800 includes a blister compartment 810, which is shaped to receive the display pod 1100. As illustrated, the display pod 1100 is positioned for viewing by the maintenance worker. The pod is protected from impact by the visor 811 and blister 810.

FIG. 46B is a side view of the maintenance computer 710K of FIG. 45 partially in cross section. The display pod 1100 is coupled to a housing 635 which is supported by two horizontal members 632, 634 within the blister compartment 810. The housing 635 is slidable along the supporting members 632, 634 to position the display pod 1100 horizontally within the worker's field of view. The display pod 1100 is vertically positioned by a telescoping member 636 that is received by the base 638. In a particular preferred embodiment of the invention, the horizontal and vertical displacement of the display pod 1100 is controlled by a servo 760 (FIG. 45).

Figure 46E:
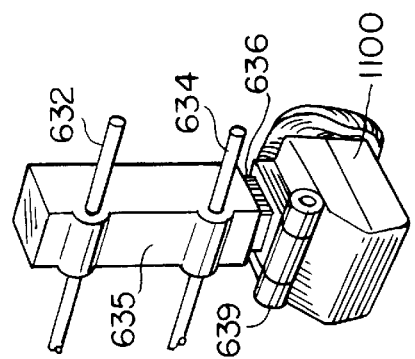
Figure 46D:
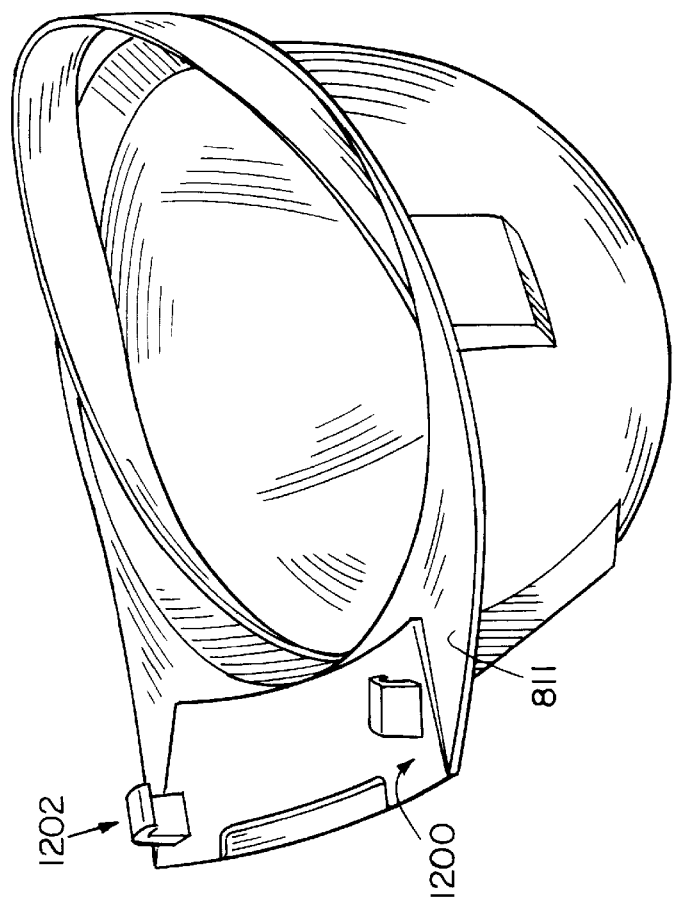
Figure 46C:
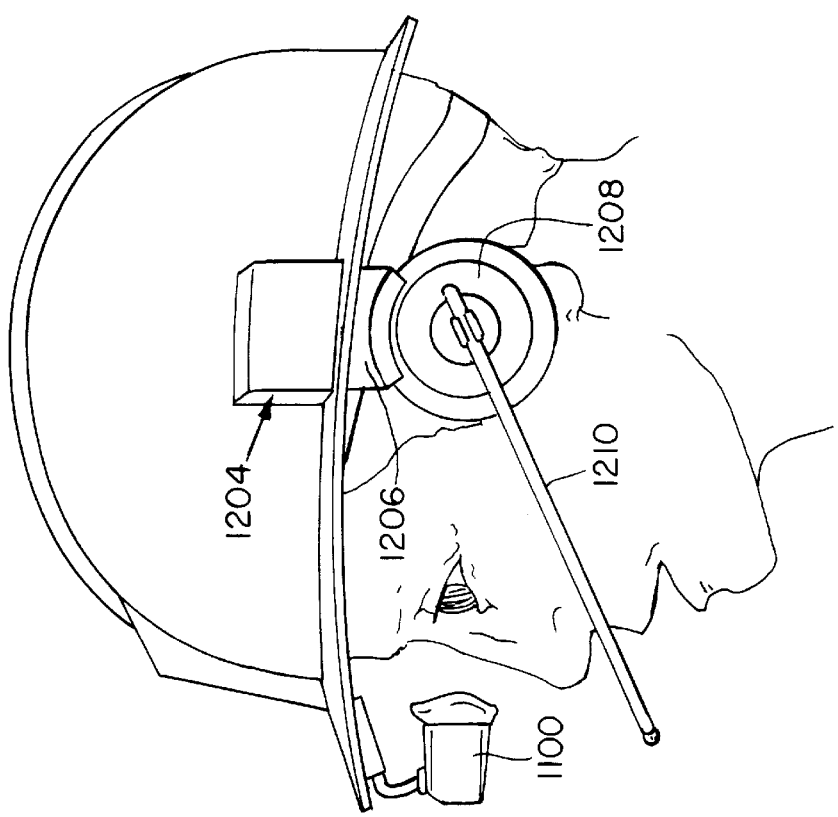

Shown in FIG. 46C is a side view in which the protective headpiece has a side receptacle 1204 in which the housing 1206 containing the audio circuit, the connector to the display, the earpiece 1208 and microphone 1210 can be inserted. The view of the underside of the helmet is shown in FIG. 46D where the visor 811 has tabs 1202 on both sides so that the monocular display can be mounted at 1200 adjacent to each tab. In the event of an impact to the pod 110, it will detach to prevent injury to the user.

FIG. 46E is a perspective view of the display pod mounting apparatus of FIG. 46B. Shown more clearly are the supporting members 632, 634 and the housing 635. The display pod 1100 is shown with the telescoping member 636 contracted. Also illustrated is a hinge 639 to allow the worker to pivot the display pod 1100 momentarily out of the field of view.

Figure 47A:
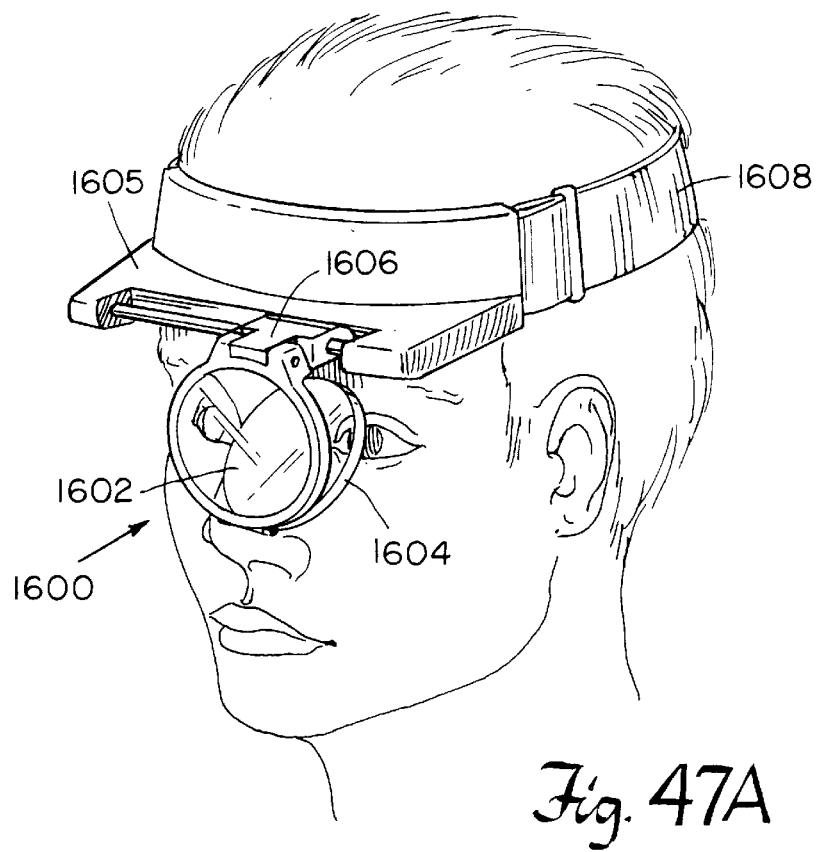
Figure 47B:
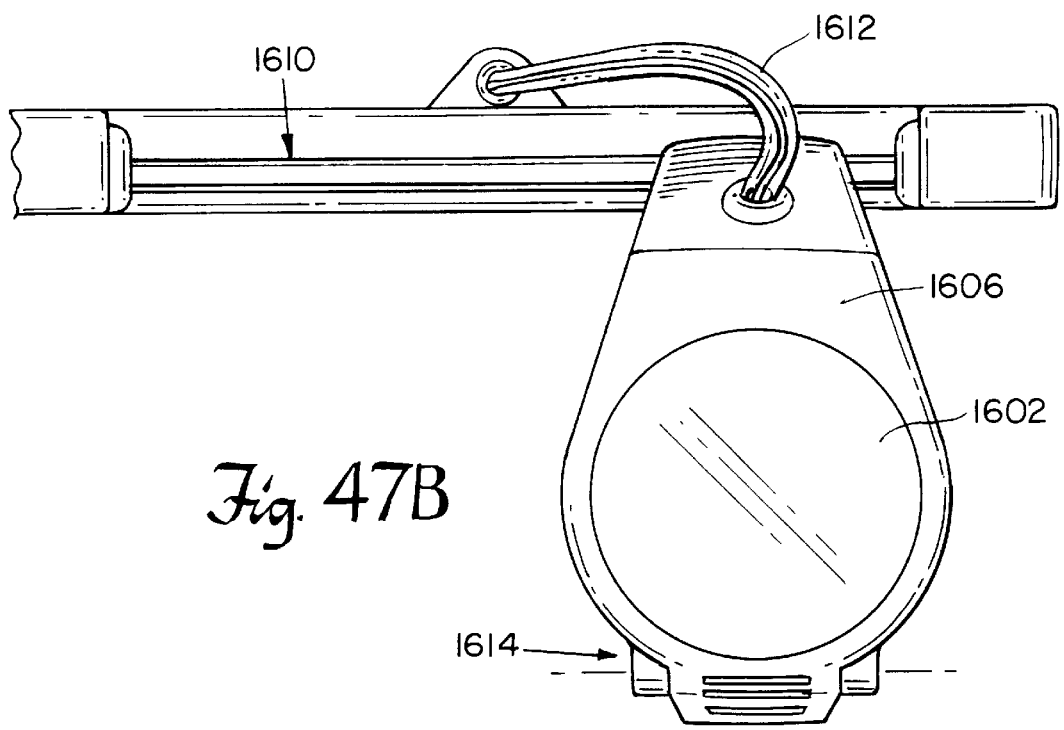

FIGS. 47A–47D illustrated another preferred embodiment of the invention in which a display is mounted above field of view of the user and which projects an image onto a transparent monocular or binocular system in front of the user's eye or eyes. FIG. 47A shows a monocular system 1600 in which a display is position in housing 1606 on visor 1605 and projects an image onto lens 1604. The user can also see through lens 1602 and 1604 to the outside environment. As shown in FIG. 47B, the display is connected by wire or fiber optic cable 1612 to a video source and can be positioned in from of either eye by sliding along rack or rail 1610. The hinge 1614 provides for rotation of lens 1604 against lens 1602. As seen in FIG. 47C, the lens can rotate about hinge 1624 and can be moved along distance 1622. Electronics 1626 for display 1620 can be incorporated into visor 1605. FIG. 47D shows a bumper 1640 for display unit 1632 which can rotate bout hinge 1630 to position lens 1634, 1638.

FIG. 48 is a perspective view of another preferred embodiment of the invention. The wearer is equipped with a helmet 800' adding a blister chamber 810' and a display pod 1100. The wearer is also equipped with protective goggles 1200 and a breathing apparatus 1300.

Although the computer 710 has been described as a head-mounted computer, it should be understood that the computer 710 can be otherwise carried on the wearer's person. For example, the computer 710 can be disposed within a backpack, chestpack or beltpack. Other mounting configurations are also meant to be within the scope of the invention. Furthermore, it should be understood that the computer 710 and input device 718 can be remote from the display 700. For example, the computer 710 can be in a briefcase removed from the person wearing a head-mounted display.

Figure 49:
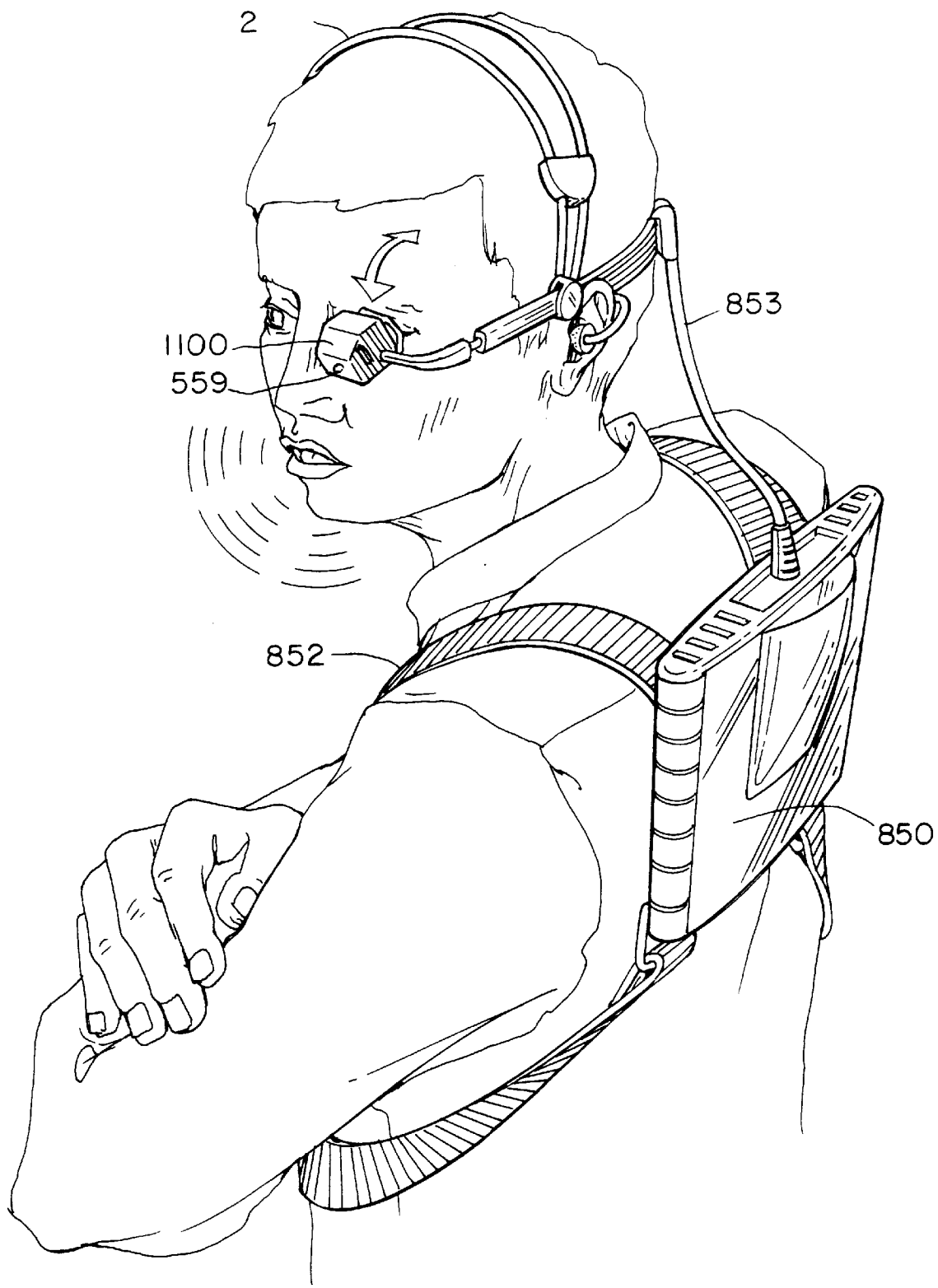
FIG. 49 is a perspective view of a back-mounted computer and a head-mounted display.

FIG. 49 is a perspective view of a back-mounted computer and a head-mounted display. The computer 850 is mounted to a harness 852 onto the wearer's back. A data cable 853 from the computer 850 drives the display panel in a display pod 1100 positioned in the wearer's field of view. An audio microphone 559 is mounted in the display pod 1100 for providing local commands to the computer 850 over the data cable 853. Also illustrated is an optional headband 2 for holding the system onto the wearer's head. Preferably, the display pod 1100 can be flipped upward or downward out of the wearer's field of view. The display pod 1100 can also be clipped into a hardhat.

Figure 50:
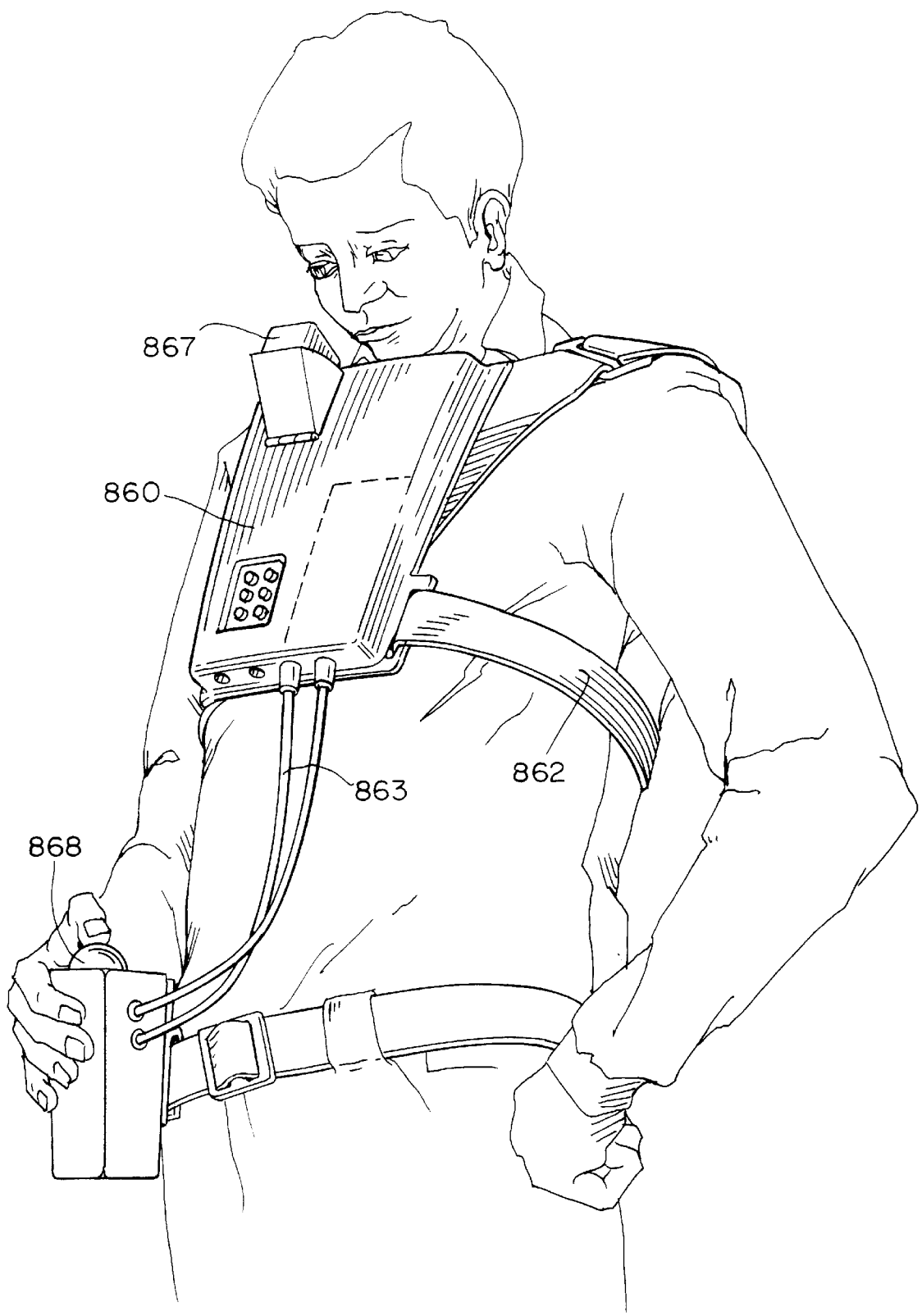
FIG. 50 is a perspective view of a chest-mounted computer according to a preferred embodiment of the invention.

FIG. 50 is a perspective view of a chest-mounted computer according to a preferred embodiment of the invention. A computer 860 is mounted to a wearer's chest by a harness 862. Control of the computer 860 is provided by a roller ball input device 868, which is coupled to the computer 860 by data cable 863. A display housing 867 is extendable from the housing of the computer 860 to permit the wearer to view a display panel. The housing can also have a keypad or a receptacle for a portable or collapsible keyboard (dashed lines).

Figure 51:
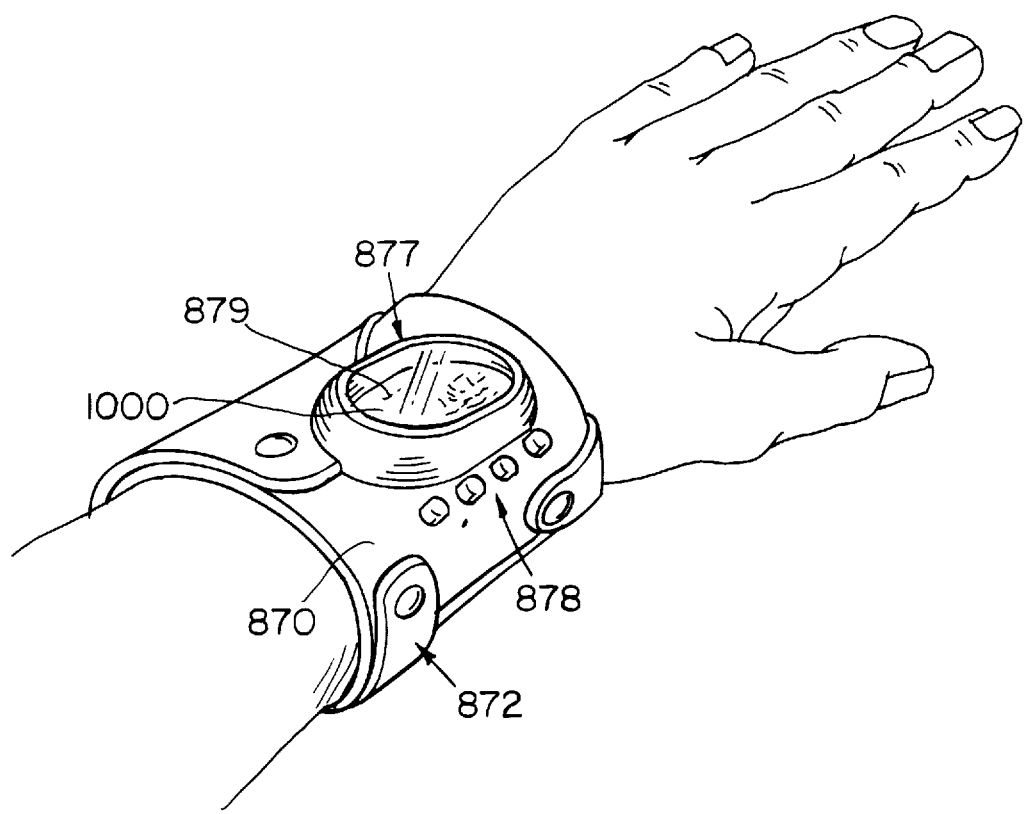
FIG. 51 is a perspective view of a wrist-mounted computer and display apparatus.

FIG. 51 is a perspective view of a wrist-mounted computer and display apparatus. The computer body 870 is secured to a wrist by a wristband 872. The computer body includes controls 878 and a display panel display housing 877. A display panel 1000 in the display housing 877 is viewed through a holographic lens 879.

Figure 52A:
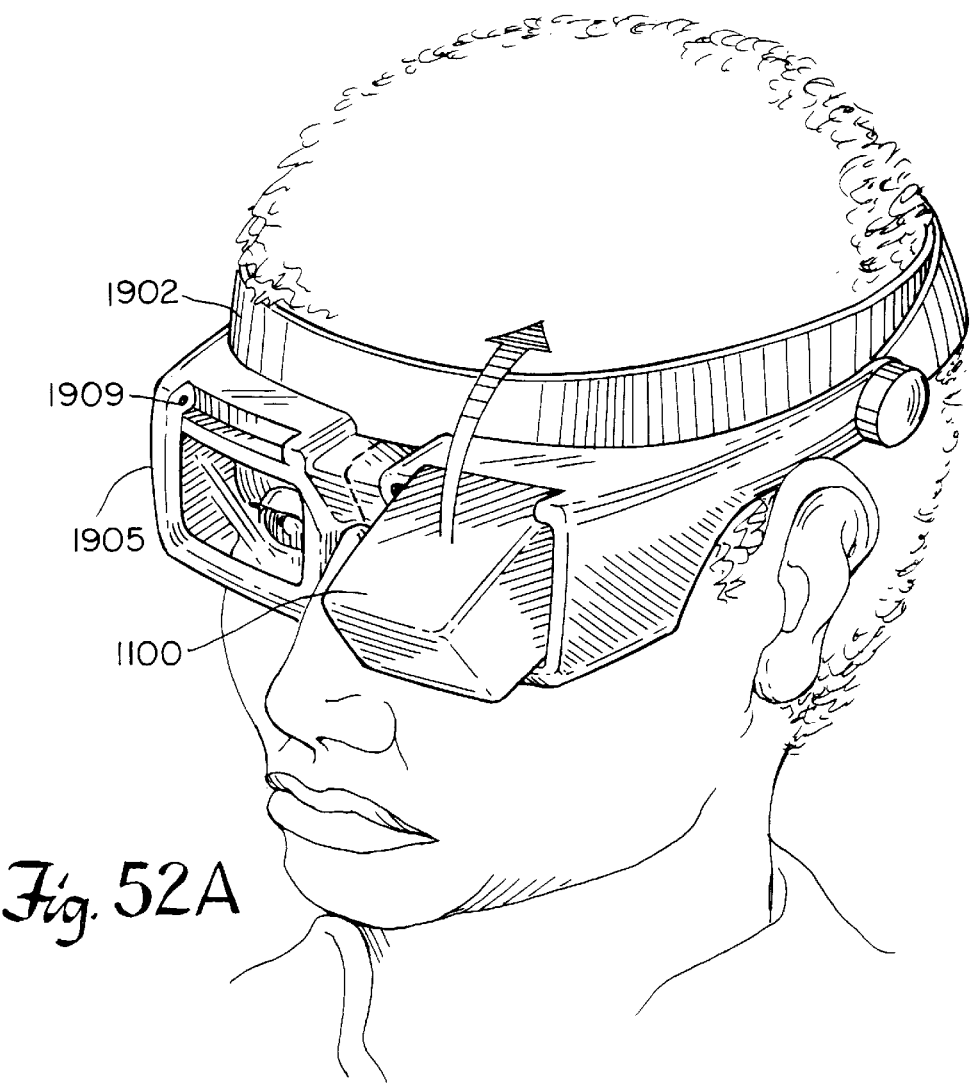
FIG. 52A is a perspective view of a person wearing magnifying glasses equipped with a display.

FIG. 52A is a perspective view of a person wearing magnifying glasses equipped with a display. The glasses 1905 are secured to the wearer's head by a headband 1902. The glasses 1905 include magnifying lenses 1907 and a hinge 1909 for receiving the display pod 1100.

Figure 52B:
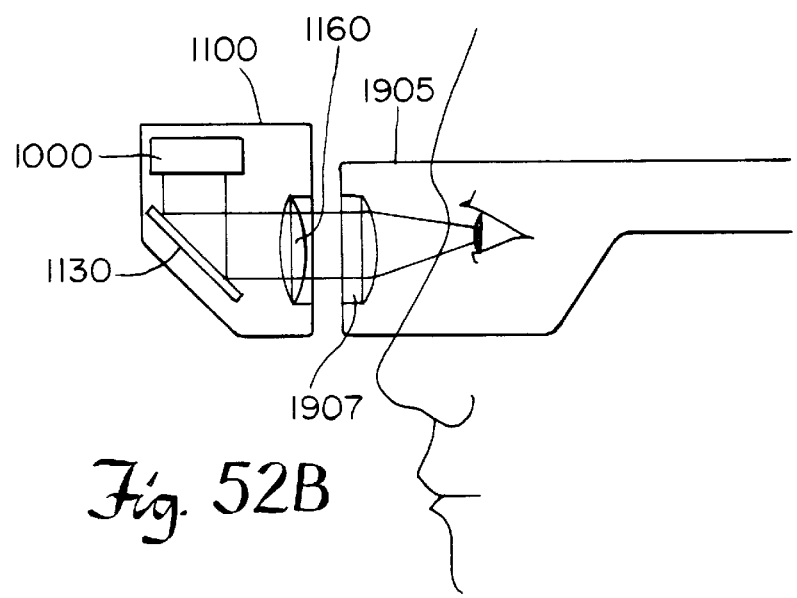
FIG. 52B is a schematic diagram of the optics of FIG. 52A.

FIG. 52B is a schematic diagram of the optics of FIG. 52A. Illustrated are the display pod 1100 and magnifying glasses 1905. In the display pod 1100 are a display panel 1000, a reflecting mirror 1130 and a viewing lens 1160. The light rays from the display panel 1000 are reflected off from the reflecting mirror 1130 and passed through the lens 1160. Because the glasses 1905 include a magnifying lens 1907, the display pod viewing lens 1160 is a reducing lens. The reducing lens 1160 and the magnifying lens 1907 cooperate to produce a durable image to the wearer.

Figure 53:
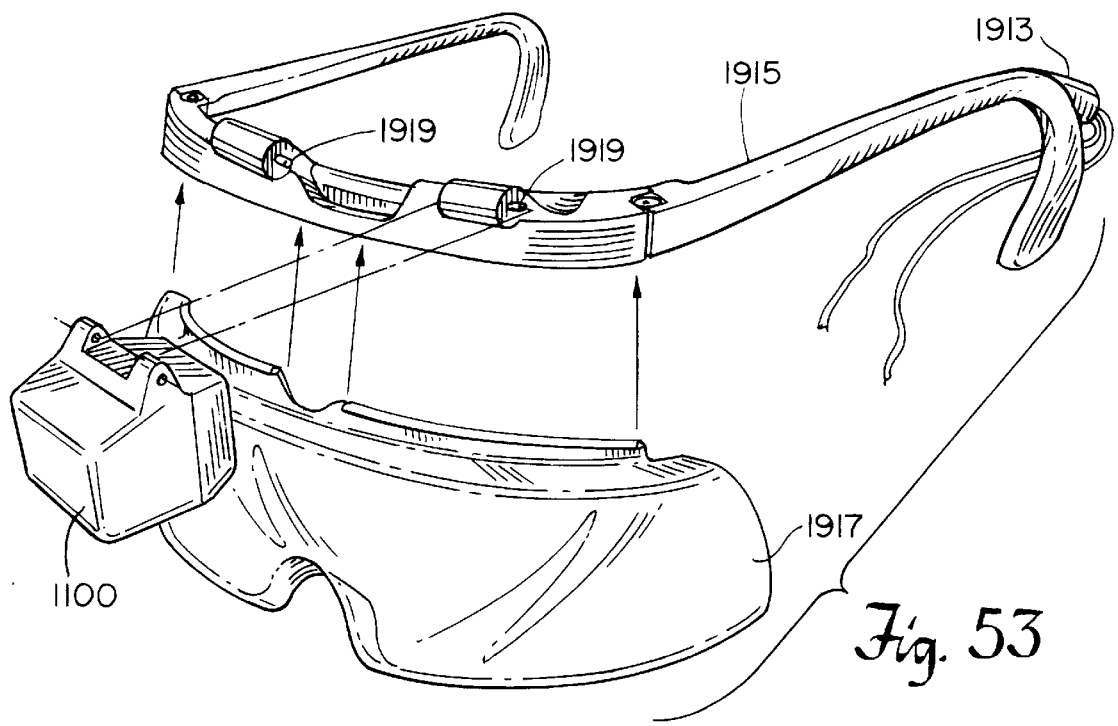
FIG. 53 is an exploded perspective view of a display mounted to a pair of safety glasses.

FIG. 53 is a perspective view of a display pod 1100 mounted to a pair of safety glasses with the display pod and safety glass shown exploded. The frame 1915 includes electrical coupling 1913 for interfacing with a display driver and mounting pins 1919. The display pod is coupled to the mounting pins 1919. Safety glass 1917 is positioned between the display pod 1100 and the wearer's eyes to protect the eyes from an impact with the display pod 1100. Preferably, the display pod 1100 is shock resistant. In addition, the mounting pins 1919 are designed to breakaway under stress so that if the display pod 1100 is subjected to an impact, the display pod 1100 will breakaway from the frame 1915.

Figure 54:
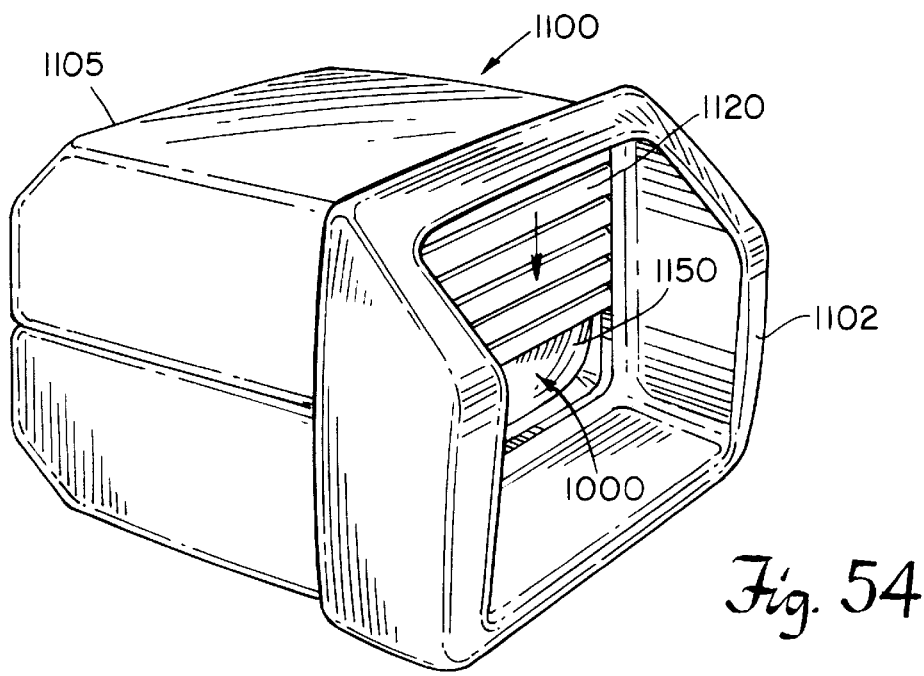
FIG. 54 is a perspective view of a display for industrial applications.

FIG. 54 is a perspective view of an industrial display. A display housing 1105 is preferably fabricated from impact resistant material. The eyecup 1102 is preferably fabricated from foam or another soft pliable material to protect the user's eye. A protective shade 1102 can be raised or lowered to protect the display panel 1000, the viewing lens 1150 and other internal components from damage.

Figure 55:
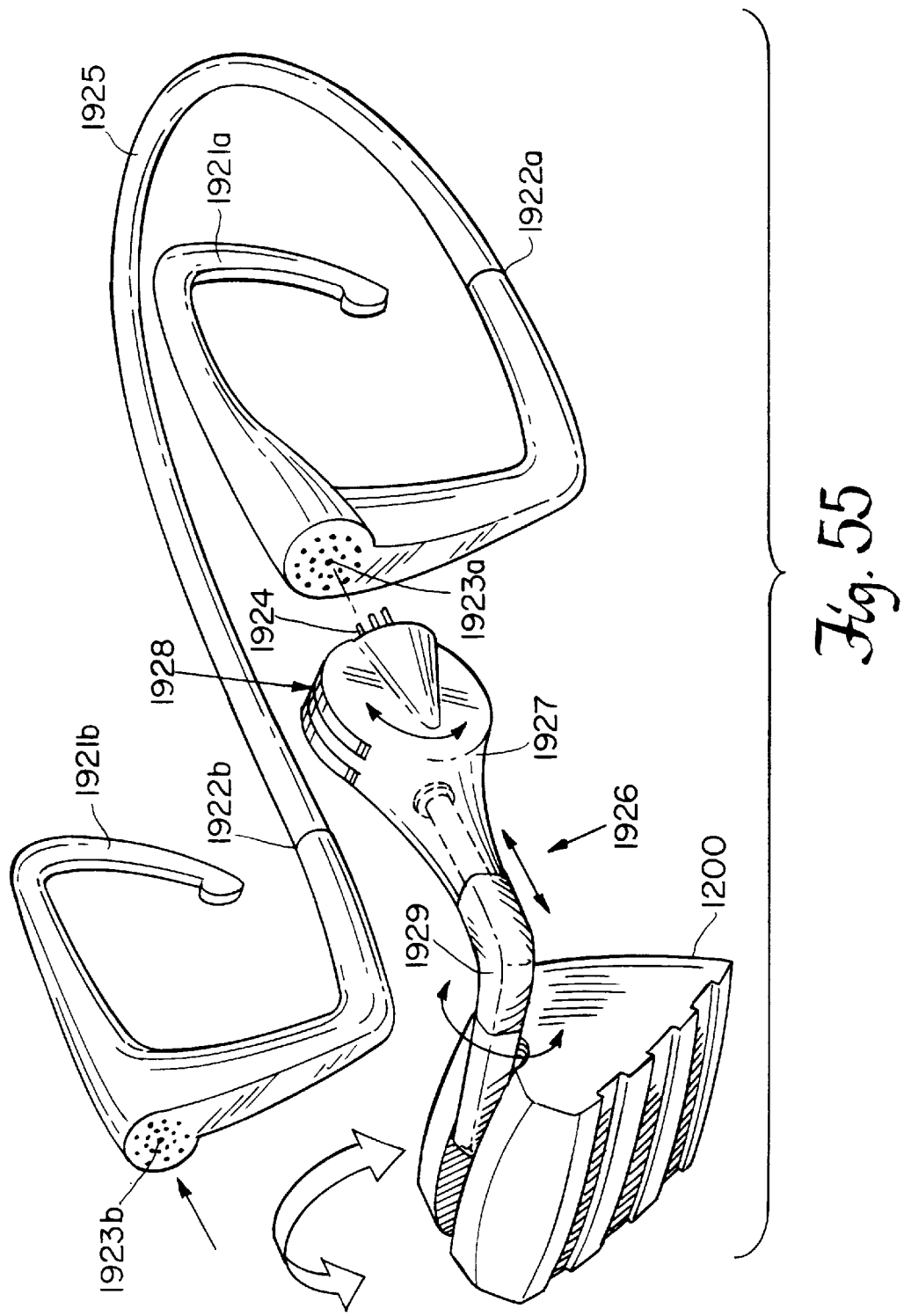
FIG. 55 is a perspective view of a monocular display in accordance with the invention.

FIG. 55 is a perspective view of a monocular display. The frame 1925 secures around the back of a wearer's head and earpieces 1921a, 1921b secure the frame 1925 to the user's head. Preferably, the frame 1925 is extendable from the earpieces 1921a, 1921b at joints 1922a, 1922b so the frame 1925 can accommodate various head sizes. The earpieces 1921a, 1921b have a respective socket coupling 1923a, 1923b. A display arm 1926 includes a bilaterally symmetrical plug 1924 that mates with either socket 1923a, 1923b.

The display arm 1926 includes a proximal section 1927 and a distal section 1929. The distal section 1929 can be telescoped away from the proximal section 1927. In addition, a pivot 1928 of the proximal section 1927 permits the display arm 1926 to be rotated upward or downward. A display pod 1200 is coupled to the distal section 1929. The display pod 1200 can be pivoted at various angles relative to the wearer's line of sight.

FIGS. 56A–56C are perspective views of another head-mounted display apparatus according to the invention. FIG. 56A illustrates a headband 1932, a mounting plate 1931 and a brim housing 1930. Pins 1936 on the headband 1932 are inserted into slots 1937 of the mounting plate 1931 to secure the mounting plate to a wearer's head. The brim housing 1930 is mated to tabs 1934 on the mounting plate 1931. A display housing 1300 is slidable along a rail 1933 on the brim housing 1930.

FIG. 56B is a rear perspective view of the brim housing 1930 of FIG. 56A. Shown is a channel 1935 which mates with the tabs 1934 of the mounting plate 1931. This mating process is illustrated in FIG. 56C. The brim housing 1930 is slid along the mounting plate 1931 registering the tabs 1934 with the channel 1935. FIG. 56D shows a more rigid plastic headband 1800 with manual adjustment 1810 to control the size.

Figure 57D:
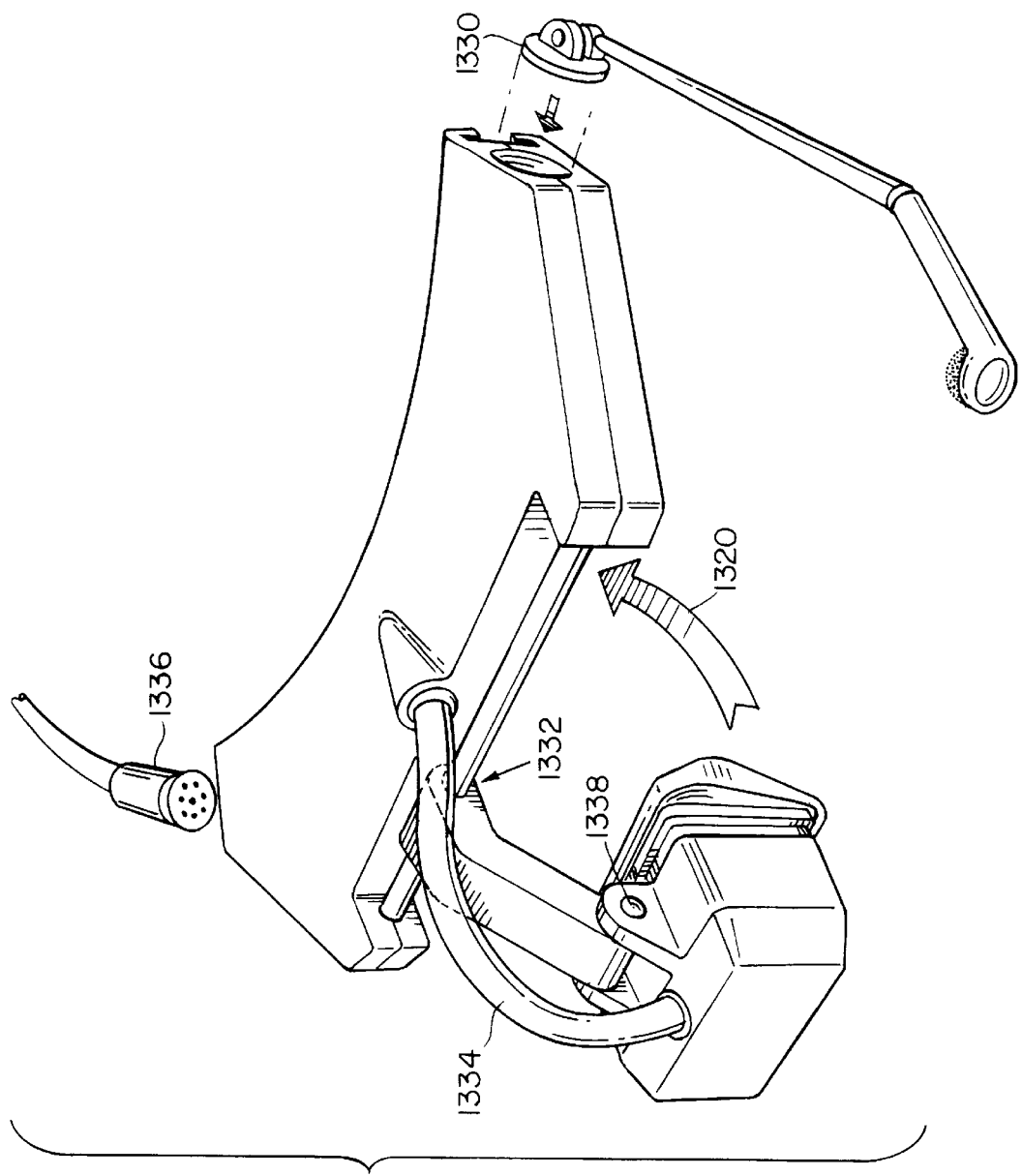
Figure 57G:
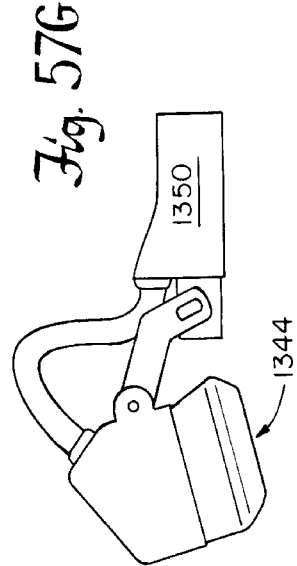
Figure 57H:
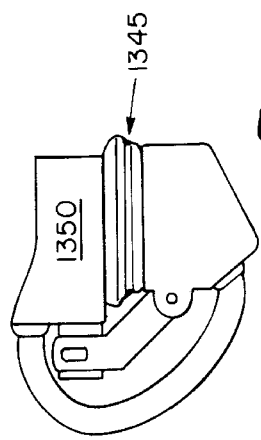
Figure 57E:
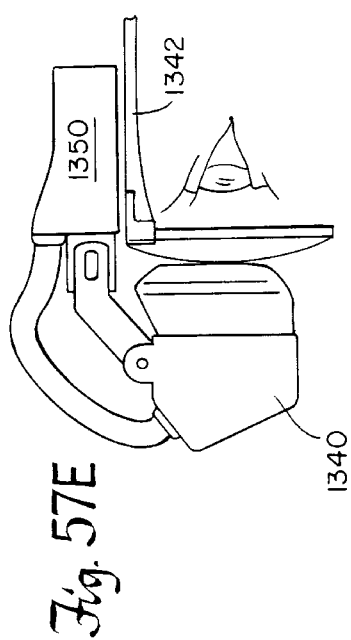
Figure 57F:
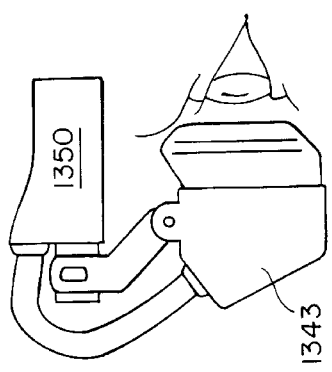

FIGS. 57A–57H show detailed perspective views of a particular preferred display of FIG. 56A. The display pod 1300 includes an eyecup 1302 that is fabricated from a pliable material. A first thumb screw 1310 can be turned by a wearer to adjust the vertical position of the display pod 1300 in the wearer's field of view. A second thumb screw 1320 is turned by the wearer to adjust the distance of the display pod 1300 from the wearer's eye. The display pod 1300 can be tilted up by the wearer out of the field of view. The visor 1930 as shown in FIGS. 57B and 57C can also house the circuit harness for the display which can be connected either through the arm 1332 suspending the pod at hinge 1338 or through cable 1334 as shown in FIG. 57D. A microphone can be connected to visor by connector 1330 and input cable 1336 can be connected on the opposite side.

FIGS. 57E, 57F, 57G and 57H illustrate various rotational positions of display pad including against the user's glasses 1342 at 1340, or against the eye 1343, or retracted above the eye at 1344, or closed against visor 1350 at 1345.

FIG. 58A is a perspective view of a wearer equipped with a preferred embodiment of a head-mounted display. A display pod 1400 is positioned within the wearer's field of view. Dual headbands 1942a, 1942b secure the display pod 1400 to the wearer's head. A connecting cable 1943 carries data signals to the display pod 1400.

FIG. 58B is a perspective view of the head-mounted display of FIG. 58A. The display pod 1400 is coupled to the dual headbands 1942a, 1942b by a telescoping arm assembly 1946 and a pair of ball joints 1945, 1440. The arm assembly 1946 includes a proximal arm section 447 which is coupled to the headbands 1942a, 1942b by a first balljoint 1945, which permits the arm assembly 1946 to be rotated in three dimensions relative to the headbands 1942a, 1942b. The arm assembly 1946 also includes a distal arm segment 1949 which telescopes from the proximal arm segment 1947. The distal arm segment 1949 is coupled to a balljoint 1440 of the display pod 1400. The second balljoint 1440 permits the display pod 1400 to be positioned in three dimensions relative to the display arm 1946. As illustrated, the display pod 1400 is positioned for viewing by a wearer's right eye. Illustrated in phantom is the positioning of the display pod 1400 for viewing by the wearer's left eye.

FIGS. 59A–59F are perspective views of a collapsible display according to a preferred embodiment of the invention.

FIG. 59A is a perspective view of a collapsible display pod 1500 in its working position. The display pod 1500 includes a top section 1510 and a bottom section 1590 that are rigid. The top section 1510 includes a mounting tab 1502 and a control tab 1504. The display pod 1500 includes a collapsible wall 1550 between the top section 1510 and the bottom section 1590. Also shown is a viewing lens 1560.

FIG. 59B is a schematic diagram of the optical components or the collapsible display pod 1500 of FIG. 59A in the working position. A mirror surface 1525 is joined to a first pivot 1524 and a second pivot 1526. The first pivot 1524 is coupled to the top housing section 1510 by an extension member 1522. The second pivot joint 1526 couples the mirror 1525 to the viewing lens 1560. The viewing lens 1560 is further coupled to a sliding member 1528.

FIG. 59C is a schematic diagram of the optics of FIG. 59D being partially collapsed. As illustrated, the mirror 1525 has been rotated toward the top housing section 1510 by pivoting on the first pivot 1524. The sliding member 1528 has slid toward the first pivot member 1524 along the upper housing segment 1510. Consequently, the second pivot 1526 has pivoted the viewing lens 1560 toward the mirror 1525.

FIG. 59D is a schematic diagram of the optics of FIGS. 59B and 59C in the collapsed position. As can be seen, the extension member 1522 is chosen to be of sufficient length so the viewing lens 1560 fits in the space between the folded mirror 1525 and the upper housing segment 1510.

FIG. 59E is a perspective view of the display pod 1500 in the collapsed position. The wall 1550 has folded like an accordion between the upper housing segment 1510 and the lower housing segment 1590. FIG. 59F is a perspective view of the collapsed display pod 1500 mounted to a representative frame 1950.

Figure 60:
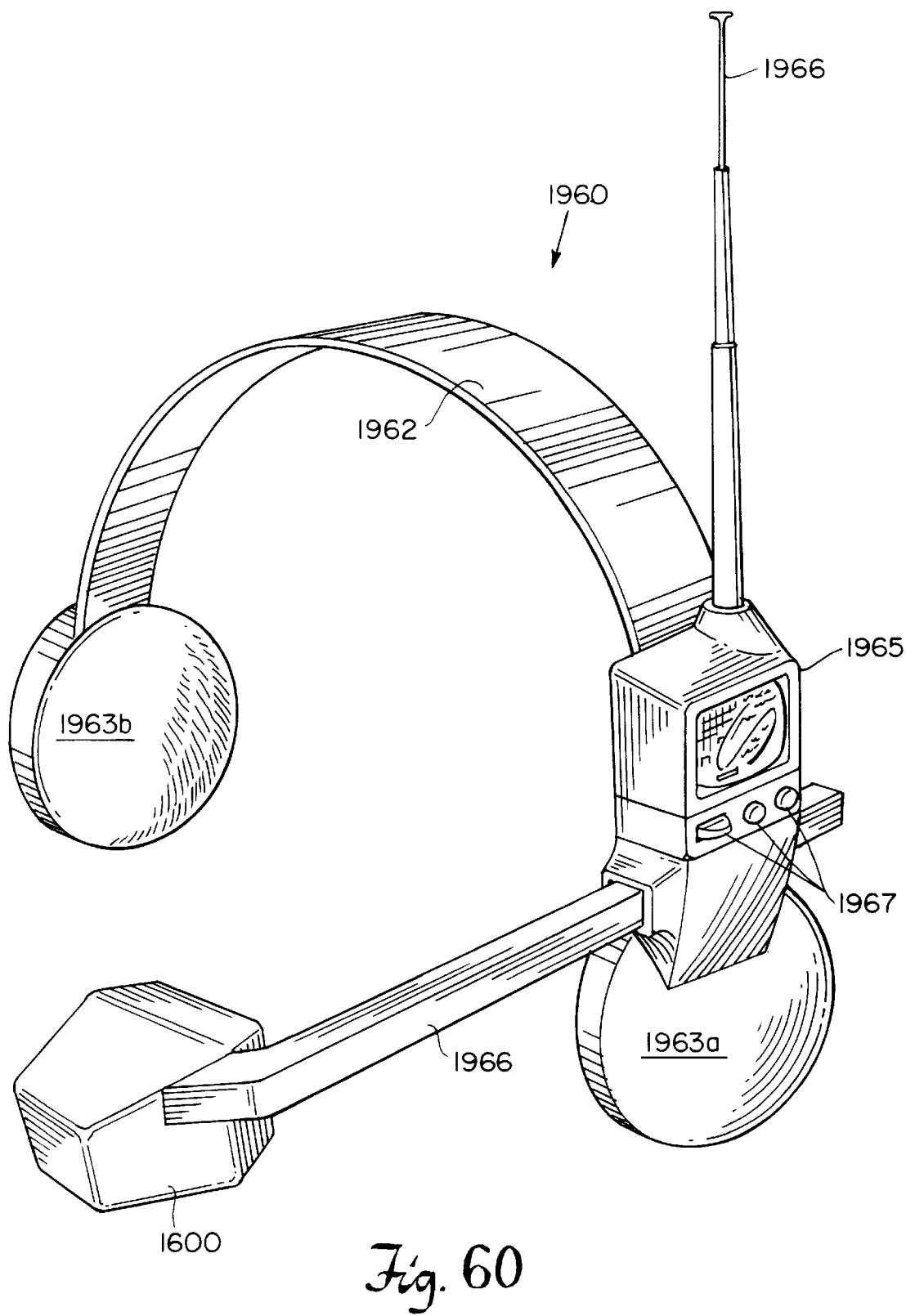
FIG. 60 is a perspective view of a head-mounted display integrated with a television tuner.

FIG. 60 is a perspective view of a head-mounted display integrated with a television tuner. The head-mounted display 1960 includes a headband 1962 with stereo headphones 1963a, 1963b. A television or radio receiver 1965 is integrated into the headband 1962. The receiver 1965 includes an antenna 1966 and controls 1967. The controls 1967 can include a tuning control a loudness control and a picture control. A display pod 1600 is connected to the headband 1962 by a display arm 1966. Preferably, a display arm 1966 can be adjusted by the wearer.

Equivalents

Those skilled in the art will know, or be able to ascertain using no more than routine experimentation, many equivalents to the specific embodiments of the invention described herein. These and all other equivalents are intended to be encompassed by the following claims.

We claim:

1. A head-mounted monocular display system comprising:
   a monocular display comprising a display housing, a liquid crystal matrix display mounted within the display housing, and an optical system mounted within the display housing to couple an image generated by the liquid crystal matrix display to a selected eye of a user;
   a circuit housing securable to the head of the user, the circuit housing comprising display circuitry mounted therein that operates the liquid crystal matrix display to generate an image; and
   a support track connected to the circuit housing, the monocular display being adjustably mounted to the support track relative to a selected eye of the user, the support track holding the display housing such that the monocular display housing can be moved relative to the support track and the circuit housing from a first position near one eye of the user to a second position near the other eye of the user while the circuit housing is secured to the head of the user.

2. The monocular display system of claim 1 wherein the display housing is mounted to the support track with a hinge.

3. The monocular display system of claim 1 wherein the monocular display is hingeably mounted to the support track such that the display housing rotates in a vertical plane.

4. The monocular display of claim 1 wherein the liquid crystal matrix display is mounted in the display housing in a plane orthogonal to a line-of-sight of the user.

5. The monocular display of claim 1 wherein the liquid crystal matrix display is mounted in a plane parallel to a line-of-sight of the user.

6. The monocular display of claim 1 further comprising a microphone attached to the display system.

7. The monocular display of claim 1 further comprising a microphone mounted to the display housing.

8. The monocular display system of claim 1 further comprising a sensor.

9. The monocular display of claim 1 further comprising a battery to provide power to the display.

10. A method of using a monocular display system adjacent the head of a user comprising the step of:
    providing a monocular display system having a display housing with an electronic liquid crystal display, a backlight and an optical lens system mounted within the display housing such that the backlight, the liquid crystal display and the optical lens system are aligned along a single axis;
    providing a circuit housing securable to a support frame positioned adjacent to the head of a user, the circuit housing having display circuitry mounted therein that operates the electronic display to generate an image;
    providing a support frame connected to the circuit housing, the support frame holding the display housing such that the display housing can be moved relative to the support frame and the circuit housing such that the display housing can be moved between a first position adjacent one eye of the user and a second position adjacent a second eye of the user while the circuit housing is secured to the support frame;
    positioning the display housing along the support frame relative to the first eye or the second eye of the user; and
    receiving image data with a wireless receiver.

11. The method of claim 10 further comprising the step of providing a hinge for mounting the electronic display to the support frame such that the electronic display can be moved from a position outside a field of view of the user to a position within the field of view of the user.

12. The method of claim 11 wherein the hinged electronic display rotates in a vertical plane within the field of view.

13. The method of claim 10 further comprising the step of providing a microphone attached to the monocular display system.

14. The method of claim 10 further comprising the step of sensing an environmental characteristic with a sensor mounted on the display system.

15. The method of claim 10 further comprising the step of connecting the electronic display to an external source of information to be displayed with a wireless communications module coupled to the electronic display, the communications module and electronic display being powered by a battery.

16. A monocular liquid crystal head mounted display system comprising:
    a monocular display comprising a display housing, an active matrix liquid crystal display mounted within the display housing, and an optical system mounted within the display housing to couple an image generated by the matrix display to a selected eye of a user;
    a circuit housing securable to the head of the user, the circuit housing comprising drive circuitry mounted therein for driving the matrix display to generate an image;
    a support track connected to the circuit housing on which the monocular display is adjustably mounted relative to a selected eye of the user, the support track holding the display housing such that the display housing can be moved relative to the support track and the circuit housing between a first position near one eye of the user and a second position near the other eye of the user while the circuit housing is secured to the head of the user; and a frame movably mounted to the support track, the frame having the display housing mounted thereon such that the matrix display can be moved from a viewing position within a field of view of the user to a retracted position outside the field of view of the user.

17. The monocular liquid crystal head mounted display of claim 16 further comprising a microphone mounted to the display system, a sensor, a wireless communications module and a battery.

18. The monocular liquid crystal head mounted display of claim 16 wherein the matrix display rotates in a vertical plane in the field of view.

19. The monocular liquid crystal head mounted display of claim 16 further comprising a flexible cable extending from the circuit housing to the display housing for connecting the drive circuitry with the matrix display.

20. The monocular liquid crystal head mounted display of claim 16 wherein the frame is a hinged arm member.

21. The monocular liquid crystal head mounted display of claim 16 wherein the frame is slidable along the support track lateral to the user's field of view.

22. The monocular liquid crystal head mounted display of claim 16 wherein the matrix display is mounted in the display housing along the optical axis of the user's eye to provide for direct viewing of the generated image.

23. The monocular liquid crystal head mounted display of claim 16 wherein the display housing further comprises at least one mirror mounted therein for reflecting the generated image from the matrix display to the optical axis of the user's eye.

24. The monocular liquid crystal head mounted display of claim 16 wherein the matrix display is mounted in the display housing in a plane orthogonal to a line-of-sight of the user.

25. The monocular liquid crystal head mounted display of claim 16 wherein the matrix display is mounted in the display housing in a plane parallel to a line-of-sight of the user.

26. The monocular liquid crystal head mounted display of claim 16 wherein the support track is attached at both ends to the circuit housing.

27. The monocular liquid crystal head mounted display of claim 26 wherein the frame is slideable along the support track.

* * * * *